(12) United States Patent  
Manesis et al.

(10) Patent No.: US 9,044,897 B2  
(45) Date of Patent: Jun. 2, 2015

(54) POROUS MATERIALS, METHODS OF MAKING AND USES

(75) Inventors: Nicholas J. Manesis, Summerland, CA (US); Futian Liu, Sunnyvale, CA (US)

(73) Assignee: Allergan, Inc., Irvine, CA (US)

( * ) Notice: Subject to any disclaimer, the term of this patent is extended or adjusted under 35 U.S.C. 154(b) by 645 days.

(21) Appl. No.: 13/247,535

(22) Filed: Sep. 28, 2011

(65) Prior Publication Data

US 2012/0077010 A1 Mar. 29, 2012

Related U.S. Application Data

(60) Provisional application No. 61/387,381, filed on Sep. 28, 2010, provisional application No. 61/387,115, filed on Sep. 28, 2010.

(51) Int. Cl.
*B29C 67/20* (2006.01)
*B32B 5/26* (2006.01)

(52) U.S. Cl.
CPC . *B29C 67/20* (2013.01); *B32B 5/26* (2013.01); *B32B 2262/02* (2013.01); *B32B 2305/026* (2013.01)

(58) Field of Classification Search
USPC .................. 264/413, 414, 48, 628, 629, 630, 264/634–637
See application file for complete search history.

(56) References Cited

U.S. PATENT DOCUMENTS

| | | |
|---|---|---|
| 2,324,735 A | 1/1941 | Spanel |
| 2,805,208 A | 9/1957 | Roche |
| 3,189,921 A | 6/1965 | Pangman |
| 3,293,663 A | 12/1966 | Cronin |
| 3,366,975 A | 2/1968 | Pangman |
| 3,559,214 A | 2/1971 | Pangman |
| 3,600,718 A | 8/1971 | Boone |
| 3,665,520 A | 5/1972 | Perras |
| 3,700,380 A | 10/1972 | Kitrilakis |
| 3,852,832 A | 12/1974 | McGhan |
| 3,934,274 A | 1/1976 | Hartley, Jr. |
| 4,034,751 A | 7/1977 | Hung |
| 4,157,085 A | 6/1979 | Austad |
| 4,231,979 A | 11/1980 | White |
| 4,237,237 A | 12/1980 | Jarre et al. |
| 4,264,990 A | 5/1981 | Hamas |
| 4,298,997 A | 11/1981 | Rybka |
| 4,298,998 A | 11/1981 | Naficy |
| 4,329,385 A | 5/1982 | Banks |

(Continued)

FOREIGN PATENT DOCUMENTS

| | | |
|---|---|---|
| EP | 0230672 | 8/1987 |
| EP | 0315814 | 5/1989 |

(Continued)

OTHER PUBLICATIONS

Alvarez, Sonia et al., "Synthesis of Macro/Mesoporous Silica and Carbon Monoliths by Using a Commercial Polyurethane Foam as Sacrificial Template", Materials Letters, 61, 2378-2381 (2007).

(Continued)

*Primary Examiner* — Stella Yi
(74) *Attorney, Agent, or Firm* — Linda Allyson Nassif

(57) ABSTRACT

The present specification discloses porous materials, methods of forming such porous materials, materials and devices comprising such porous materials, and methods of making such materials and devices.

10 Claims, 12 Drawing Sheets

(56) References Cited

U.S. PATENT DOCUMENTS

| | | |
|---|---|---|
| 4,428,082 A | 1/1984 | Naficy |
| 4,433,440 A | 2/1984 | Cohen |
| 4,470,160 A | 9/1984 | Cavon |
| 4,482,577 A | 11/1984 | Goldstein |
| 4,499,211 A | 2/1985 | Walch |
| 4,531,244 A | 7/1985 | Hamas |
| 4,573,999 A | 3/1986 | Netto |
| 4,584,324 A | 4/1986 | Baumann et al. |
| 4,592,755 A | 6/1986 | Penton |
| 4,608,396 A | 8/1986 | Baumann et al. |
| 4,610,690 A | 9/1986 | Tiffany |
| 4,636,213 A | 1/1987 | Pakiam |
| 4,643,733 A | 2/1987 | Becker |
| 4,647,618 A | 3/1987 | Baumann et al. |
| 4,648,880 A | 3/1987 | Brauman |
| 4,650,487 A | 3/1987 | Chaglassian |
| 4,651,717 A | 3/1987 | Jakubczak |
| 4,681,587 A | 7/1987 | Eberl |
| 4,740,208 A | 4/1988 | Cavon |
| 4,772,285 A | 9/1988 | Ksander |
| 4,773,908 A | 9/1988 | Becker |
| 4,773,909 A | 9/1988 | Chaglassian |
| 4,790,848 A | 12/1988 | Cronin |
| 4,795,464 A | 1/1989 | Eberl |
| 4,803,025 A | 2/1989 | Brockmeyer |
| 4,828,560 A | 5/1989 | Heyler |
| 4,840,628 A | 6/1989 | Cavon |
| 4,841,992 A | 6/1989 | Sasaki |
| 4,859,383 A | 8/1989 | Dillon |
| 4,859,712 A | 8/1989 | Cox |
| 4,889,744 A | 12/1989 | Quaid |
| 4,899,764 A | 2/1990 | Gauger |
| 4,902,294 A | 2/1990 | Gosserez |
| 4,906,423 A | 3/1990 | Frisch |
| 4,936,858 A | 6/1990 | O'Keeffe |
| 4,944,749 A | 7/1990 | Becker |
| 4,944,750 A | 7/1990 | Cox, Jr. |
| 4,950,292 A | 8/1990 | Audretsch |
| 4,955,907 A | 9/1990 | Ledergerber |
| 4,955,909 A | 9/1990 | Ersek |
| 4,960,425 A | 10/1990 | Yan |
| 4,965,430 A | 10/1990 | Curtis |
| 4,969,899 A | 11/1990 | Cox, Jr. |
| 5,002,572 A | 3/1991 | Picha |
| 5,007,929 A | 4/1991 | Quaid |
| 5,007,940 A | 4/1991 | Berg |
| 5,011,494 A | 4/1991 | von Recum et al. |
| 5,022,942 A | 6/1991 | Yan |
| 5,026,394 A | 6/1991 | Baker |
| 5,034,422 A | 7/1991 | Triolo |
| 5,035,249 A | 7/1991 | Sasaki |
| 5,092,348 A | 3/1992 | Dubrul |
| 5,092,882 A | 3/1992 | Lynn |
| 5,104,409 A | 4/1992 | Baker |
| 5,116,387 A | 5/1992 | Berg |
| 5,128,088 A | 7/1992 | Shirmomura et al. |
| 5,135,959 A | 8/1992 | Hill |
| 5,146,933 A | 9/1992 | Boyd |
| 5,147,398 A | 9/1992 | Lynn |
| 5,158,571 A | 10/1992 | Picha |
| 5,158,573 A | 10/1992 | Berg |
| 5,171,269 A | 12/1992 | Bark |
| 5,185,297 A | 2/1993 | Park |
| 5,207,709 A | 5/1993 | Picha |
| 5,219,361 A | 6/1993 | von Recum et al. |
| 5,236,453 A | 8/1993 | Picha |
| 5,236,454 A | 8/1993 | Miller |
| 5,236,457 A | 8/1993 | Devanathan |
| 5,246,454 A | 9/1993 | Peterson |
| 5,282,856 A | 2/1994 | Ledergerber |
| 5,296,069 A | 3/1994 | Robert |
| 5,348,788 A | 9/1994 | White |
| 5,354,338 A | 10/1994 | Ledergerber |
| 5,358,521 A | 10/1994 | Shane |
| 5,376,117 A | 12/1994 | Pinchuk |
| 5,383,929 A | 1/1995 | Ledergerber |
| 5,437,824 A | 8/1995 | Carlisle |
| 5,441,919 A | 8/1995 | Park |
| 5,447,535 A | 9/1995 | Muller |
| 5,455,100 A | 10/1995 | White |
| 5,480,430 A | 1/1996 | Carlisle |
| 5,496,367 A | 3/1996 | Fisher |
| 5,496,370 A | 3/1996 | Hamas |
| 5,507,808 A | 4/1996 | Becker |
| 5,522,896 A | 6/1996 | Prescott |
| 5,525,275 A | 6/1996 | Iversen |
| 5,534,023 A | 7/1996 | Henley |
| 5,545,217 A | 8/1996 | Offray |
| 5,545,220 A | 8/1996 | Andrews |
| 5,549,671 A | 8/1996 | Waybright |
| 5,571,179 A | 11/1996 | Manders |
| RE35,391 E | 12/1996 | Brauman |
| 5,589,176 A | 12/1996 | Seare |
| 5,605,693 A | 2/1997 | Seare |
| 5,607,473 A | 3/1997 | Weber-Unger |
| 5,624,674 A | 4/1997 | Seare, Jr. |
| 5,630,843 A | 5/1997 | Rosenberg |
| 5,630,844 A | 5/1997 | Dogan |
| 5,653,755 A | 8/1997 | Ledergerber |
| 5,658,330 A | 8/1997 | Carlisle |
| 5,674,285 A | 10/1997 | Quaid |
| 5,681,572 A * | 10/1997 | Seare, Jr. ..................... 424/400 |
| 5,779,734 A | 7/1998 | Ledergerber |
| 5,798,065 A | 8/1998 | Picha |
| 5,824,081 A | 10/1998 | Knapp |
| 5,843,189 A | 12/1998 | Perouse |
| 5,855,588 A | 1/1999 | Young |
| 5,871,497 A | 2/1999 | Young |
| 5,895,423 A | 4/1999 | Becker |
| 5,935,164 A | 8/1999 | Iversen |
| 5,961,552 A | 10/1999 | Iversen |
| 5,964,803 A | 10/1999 | Iversen |
| 5,965,076 A | 10/1999 | Banks |
| 5,984,943 A | 11/1999 | Young |
| 5,993,716 A | 11/1999 | Draenert |
| 6,071,309 A | 6/2000 | Knowlton |
| 6,074,421 A | 6/2000 | Murphy |
| 6,083,262 A | 7/2000 | Caravel |
| 6,099,565 A | 8/2000 | Sakura |
| 6,113,634 A | 9/2000 | Weber-Unger |
| 6,146,418 A | 11/2000 | Berman |
| 6,183,514 B1 | 2/2001 | Becker |
| 6,187,043 B1 | 2/2001 | Ledergerber |
| 6,203,570 B1 | 3/2001 | Baeke |
| 6,206,930 B1 | 3/2001 | Burg |
| 6,214,045 B1 | 4/2001 | Corbitt, Jr. |
| 6,214,926 B1 | 4/2001 | Winn |
| 6,315,796 B1 | 11/2001 | Eaton |
| 6,340,648 B1 | 1/2002 | Imura et al. |
| 6,387,133 B1 | 5/2002 | Perouse |
| 6,432,138 B1 | 8/2002 | Offray |
| 6,464,726 B1 | 10/2002 | Heljenek |
| 6,520,989 B1 | 2/2003 | Eaton |
| 6,531,523 B1 | 3/2003 | Davankov |
| 6,544,287 B1 | 4/2003 | Johnson |
| 6,602,452 B2 | 8/2003 | Schuessler |
| 6,605,116 B2 | 8/2003 | Falcon |
| 6,638,308 B2 | 10/2003 | Corbitt, Jr. |
| 6,673,285 B2 | 1/2004 | Ma |
| 6,692,527 B1 | 2/2004 | Bellin |
| 6,755,861 B2 | 6/2004 | Nakao |
| 6,802,861 B1 | 10/2004 | Hamas |
| 6,811,570 B1 | 11/2004 | Gehl |
| 6,818,673 B2 | 11/2004 | Ferguson |
| 6,875,233 B1 | 4/2005 | Turner |
| 6,881,226 B2 | 4/2005 | Corbitt, Jr. |
| 6,900,055 B1 | 5/2005 | Fuller |
| 6,913,626 B2 | 7/2005 | McGhan |
| 6,916,339 B1 | 7/2005 | Missana |
| 6,921,418 B2 | 7/2005 | Ledergerber |
| 6,932,840 B1 | 8/2005 | Bretz |
| 7,081,135 B2 | 7/2006 | Smith et al. |
| 7,081,136 B1 | 7/2006 | Becker |
| 7,105,116 B2 | 9/2006 | Bellin |

(56) References Cited

U.S. PATENT DOCUMENTS

| | | |
|---|---|---|
| 7,169,180 B2 | 1/2007 | Brennan |
| 7,192,450 B2 | 3/2007 | Brauker |
| 7,244,270 B2 | 7/2007 | Lesh |
| 7,323,208 B2 | 1/2008 | Ma |
| 7,476,249 B2 | 1/2009 | Frank |
| 7,520,896 B2 | 4/2009 | Benslimane |
| 7,547,393 B2 | 6/2009 | Ramaswamy |
| 7,625,405 B2 | 12/2009 | Purkait |
| 7,632,228 B2 | 12/2009 | Brauker |
| 7,632,291 B2 | 12/2009 | Stephens |
| 7,641,688 B2 | 1/2010 | Lesh |
| 7,645,475 B2 | 1/2010 | Prewett |
| 8,202,317 B2 | 6/2012 | Becker |
| 8,313,527 B2 | 11/2012 | Powell et al. |
| 8,487,012 B2 | 7/2013 | Goraltchouk et al. |
| 8,506,627 B2 | 8/2013 | Van Epps et al. |
| 8,546,458 B2 | 10/2013 | Thompson et al. |
| 2002/0038147 A1 | 3/2002 | Miller |
| 2002/0193885 A1 | 12/2002 | Legeay |
| 2003/0036803 A1 | 2/2003 | McGhan |
| 2003/0093151 A1 | 5/2003 | Zhang |
| 2003/0105469 A1 | 6/2003 | Karmon |
| 2003/0205846 A1 | 11/2003 | Bellin |
| 2003/0208269 A1 | 11/2003 | Eaton |
| 2004/0010225 A1 | 1/2004 | Schuessler |
| 2004/0115241 A1 | 6/2004 | Calhoun |
| 2004/0127985 A1 | 7/2004 | Bellin |
| 2004/0143327 A1 | 7/2004 | Ku |
| 2004/0148024 A1 | 7/2004 | Williams |
| 2004/0153151 A1 | 8/2004 | Gonzales de Vicente |
| 2004/0176493 A1 | 9/2004 | Ferguson |
| 2004/0213986 A1 | 10/2004 | Kim |
| 2005/0055093 A1 | 3/2005 | Brennan |
| 2005/0070124 A1 | 3/2005 | Miller |
| 2005/0112169 A1 | 5/2005 | Brauker |
| 2005/0118236 A1* | 6/2005 | Qiu et al. ............... 424/443 |
| 2005/0122169 A1 | 6/2005 | Watanabe |
| 2005/0196452 A1 | 9/2005 | Boyan et al. |
| 2005/0216094 A1 | 9/2005 | Prewett |
| 2005/0251083 A1 | 11/2005 | Carr-Brendel et al. |
| 2006/0002810 A1 | 1/2006 | Grohowski |
| 2006/0036266 A1 | 2/2006 | Sulamanidze et al. |
| 2006/0036320 A1 | 2/2006 | Job |
| 2006/0136056 A1 | 6/2006 | Wohl |
| 2006/0224239 A1 | 10/2006 | Tiahrt |
| 2006/0229721 A1 | 10/2006 | Ku |
| 2006/0235094 A1 | 10/2006 | Habibi-Naini |
| 2006/0246121 A1 | 11/2006 | Ma |
| 2006/0287730 A1* | 12/2006 | Segal et al. ............ 623/17.16 |
| 2007/0093911 A1 | 4/2007 | Fricke |
| 2007/0104693 A1 | 5/2007 | Quijano |
| 2007/0104695 A1 | 5/2007 | Quijano |
| 2007/0116735 A1 | 5/2007 | Calhoun |
| 2007/0135916 A1 | 6/2007 | Maxwell |
| 2007/0154525 A1 | 7/2007 | Calhoun |
| 2007/0190108 A1 | 8/2007 | Datta et al. |
| 2007/0198085 A1 | 8/2007 | Benslimane |
| 2008/0009830 A1 | 1/2008 | Fujimoto |
| 2008/0071371 A1 | 3/2008 | Elshout |
| 2008/0075752 A1 | 3/2008 | Ratner |
| 2008/0154366 A1 | 6/2008 | Frank |
| 2008/0174043 A1* | 7/2008 | Denoziere et al. ............ 264/232 |
| 2008/0241212 A1 | 10/2008 | Moses |
| 2008/0268019 A1 | 10/2008 | Badylak |
| 2008/0312739 A1 | 12/2008 | Agerup |
| 2009/0045166 A1 | 2/2009 | Li |
| 2009/0082864 A1 | 3/2009 | Chen |
| 2009/0087641 A1 | 4/2009 | Favis |
| 2009/0093878 A1 | 4/2009 | Glicksman |
| 2009/0118829 A1 | 5/2009 | Powell |
| 2009/0125107 A1 | 5/2009 | Maxwell |
| 2009/0169716 A1 | 7/2009 | Linhardt |
| 2009/0198331 A1 | 8/2009 | Kesten et al. |
| 2009/0198332 A1 | 8/2009 | Becker |
| 2009/0198333 A1 | 8/2009 | Becker |
| 2010/0042211 A1 | 2/2010 | Van Epps et al. |
| 2010/0292790 A1 | 11/2010 | Stroumpoulis et al. |
| 2011/0035004 A1 | 2/2011 | Maxwell |
| 2011/0054605 A1 | 3/2011 | Becker |
| 2011/0093069 A1 | 4/2011 | Goraltchouk et al. |
| 2011/0106249 A1 | 5/2011 | Becker |
| 2011/0117267 A1 | 5/2011 | Powell et al. |
| 2011/0196488 A1 | 8/2011 | Goraltchouk et al. |
| 2011/0196489 A1 | 8/2011 | Van Epps et al. |
| 2011/0276133 A1 | 11/2011 | Liu et al. |
| 2011/0276134 A1 | 11/2011 | Manesis et al. |
| 2011/0278755 A1 | 11/2011 | Liu et al. |
| 2011/0282444 A1 | 11/2011 | Liu et al. |
| 2011/0309541 A1 | 12/2011 | Thompson et al. |
| 2011/0313073 A1 | 12/2011 | Goraltchouk et al. |
| 2012/0004722 A1 | 1/2012 | Goraltchouk et al. |
| 2012/0041555 A1 | 2/2012 | Manesis et al. |
| 2012/0077010 A1 | 3/2012 | Manesis et al. |
| 2012/0077012 A1 | 3/2012 | Liu et al. |
| 2012/0077891 A1 | 3/2012 | Liu et al. |
| 2012/0101574 A1 | 4/2012 | Goraltchouk et al. |
| 2012/0245685 A1 | 9/2012 | Yu |
| 2012/0321777 A1 | 12/2012 | Stroumpoulis et al. |
| 2013/0013062 A1 | 1/2013 | Thompson et al. |
| 2013/0023987 A1 | 1/2013 | Liu et al. |
| 2013/0032962 A1 | 2/2013 | Liu et al. |
| 2013/0053956 A1 | 2/2013 | Powell et al. |
| 2013/0158657 A1 | 6/2013 | Nofrey et al. |
| 2013/0209661 A1 | 8/2013 | Goraltchouk et al. |
| 2013/0245148 A1 | 9/2013 | Thompson et al. |
| 2013/0295379 A1 | 11/2013 | Goraltchouk et al. |
| 2013/0302511 A1 | 11/2013 | Goraltchouk et al. |
| 2013/0310934 A1 | 11/2013 | Van Epps et al. |
| 2014/0005783 A1 | 1/2014 | Van Epps et al. |

FOREIGN PATENT DOCUMENTS

| | | |
|---|---|---|
| EP | 0522585 | 1/1993 |
| EP | 0522585 | 5/2005 |
| EP | 1532942 | 5/2005 |
| FR | 2840617 | 12/2003 |
| JP | 2003-062062 | 4/2003 |
| JP | 2007-029717 | 8/2007 |
| WO | WO 98/10803 | 3/1998 |
| WO | WO 00/24437 | 5/2000 |
| WO | WO 2004/037318 | 5/2004 |
| WO | WO 2004/062531 | 7/2004 |
| WO | 2006133366 | 12/2006 |
| WO | WO 2009/061672 | 5/2009 |
| WO | WO 2009/110917 | 9/2009 |
| WO | WO 2011/094155 | 8/2011 |
| WO | WO 2011/097499 | 8/2011 |

OTHER PUBLICATIONS

Barr, S. et al., "Current Implant Surface Technology: An Examination of Their Nanostructure and Their Influence on Fibroblast Alignment and Biocompatibility", Elastic, 2009, 9, 198-217.

Barnsley, Philip et al., "Textured Surface Breast Implants in the Prevention of Capsular Contracture Among Breast Augmentation Patients: A Meta-Analysis of Randomized Controlled Trials", Plastic and Reconstructive Surgery, 2006, 117(7), 2182-2190.

Inamed Aesthetics Brochure, Directions for Use Style 410 Silicone-Filled Breast Implants (2003).

Ma, Peter, "Scaffolds for tissue fabrication", Materials Today, 2004, 7, 30-40.

Mikes, Antonius et al., "Formation of Highly Porous Biodegradable Scaffolds for Tissue Engineering", Electronic Journal of Biotechnology, 2000, 3(2), 114-119.

Minami, Eliza et al., "The Composition and Behavior of Capsules Around Smooth and Textured Breast Implants in Pigs", Plastic and Reconstructive Surgery, 2006, 118940, 874-884.

Murphy, William et al.. "Salt Fusion: An Approach to Improve Pore Interconnectivity Within Tissue Engineering Scaffolds", Tissue Engineering, vol. 8, Iss. 1, 2004.

Wei, Guobao et al., "Macroporous and Nanofibers Polymer Scaffolds and Polymer/bone-like Apatite Composite Scaffolds Generated by Sugar Spheres", Journal of Biomedical Materials Research Part A, 2006, 306-315.

(56) References Cited

OTHER PUBLICATIONS

Zhang, Yuan et al., "Macroporous Alumina Monoliths Prepared by Filling Polymer Foams With Alumina Hydrosols", J. Mater Sci., 44, 931-938 (2009).

Brauker et al., "Neovascularization of synthetic membranes directed by membrane microarchitecture", Journal of Biomedical Materials Research, 1995, pp. 1517-1524, vol. 29, John Wiley & Sons, Inc.

Brohim et al., "Early Tissue Reaction to Textured Breast Implant Surfaces", Anals of Plastic Surgery, 28(4): 354-362, Year: 1992.

Sharkawy et al. "Engineering the tissue which encapsulates subcutaneous implants", II. Plasma—tissue exchange properties, 1998, pp. 586-597, John Wiley & Sons, Inc.

* cited by examiner

POROUS MATERIALS, METHODS OF MAKING AND USES

This application claims priority to U.S. Patent Application No. 61/387,381, filed Sep. 28, 2010, and U.S. Patent Application No. 61/387,115, filed Sep. 28, 2010, the entirety of each disclosure of which is incorporated herein by this reference.

General purpose foams have conventionally been manufactured from polyurethane. Polyurethane foams are widely used in industrial applications and everyday life. The porous geometry of polyurethane foams makes them ideal candidates as the geometry result in both strong and flexible material. Example uses include high resiliency flexible foam seating, rigid foam insulation panels, microcellular foam seals, and carpet underlay.

However, foams made substantially of polyurethane generally have very low acid and base resistance, swell readily in a large range of solvents (N-methylpyrrolidone, dimethyl sulfoxide, ethyl acetate, methyl ethyl ketone, dichloromethane, and swell somewhat in an even broader range of solvents (xylene, hexane, dioxane, acetone) depending on its formulation. Additionally, polyurethane foams generally have a low resistance to oxidation and ultraviolet light (UV), are not degradable in a controlled manner, and are not readily made environmentally friendly (quickly break down into unsafe components).

Such properties make them less than ideal for many general purpose applications for which substantially opposite properties are desired. All of these properties have an impact on performance range, for example use in filtration with solvents, use in filtration with acids and bases, use in insulation with solvents, acids, and bases, use in oxidative environments, use in environments with metal salts, use in environments with high UV or radiation exposure, hydrolytic degradation in cushioning, and the like.

As such, there is a need in the art for general purpose foams with the broad applications of commonly used porous polyurethane foam materials but without the drawbacks described above. The present disclosure remedies this need in the art by providing foam-like materials and methods of making the same that provide desired properties.

Polyurethanes are a class of compounds formed by reacting a polyol with a diisocyanate or a polymeric isocyanate in the presence of suitable catalysts and additives. The structural geometry enables this highly durable material to be produced with varying density (such as, e.g., 6 kg/m3 to about 1,200 kg/m3) and flexible (flexible, semi-rigid and rigid), making polyurethane foam an ideal candidate for a wide variety of uses in both industrial and household applications. For example, flexible polyurethane foam may be produced in a variety of shapes and firmnesses useful as cushion underlay for carpets; as upholstery padding for furniture and vehicle interior components like seats, headrests, armrests, roof liners, dashboards, and instrument panels; as material for pillows, mattress bedding, toppers, and cores; as sponges; as mid- and outsoles of footwear; as vehicle fascia and other exterior parts; as fabric coatings as synthetic fibers; as packaging material; as integral skin form for vehicle interiors; and as sound-deadening material. As another example, polyurethane foam may be produced as a rigid and light weight material useful in the manufacturing of insulating material such as, e.g., panel or spray insulation in buildings, water heaters, refrigerated transport, and commercial and residential refrigeration. Rigid polyurethane foams are also used in the manufacture of structural components, simulated wood, and flotation devices like boats, surfboards and life preservers. As yet another example, polyurethane foam may be produced having a wide variety of pore sizes useful in the manufacture of cleaning material such as, e.g., wipes, swabs, and abrasives; and filtration materials for air and/or liquid filtration.

Despite its immense versatility, there are several disadvantages associated with polyurethane foams that limit the scope of its applicability and usefulness. For example, polyurethane is unstable in the presence of chemicals (like acids, bases, and metal salts), oxidation, UV light, thermal, radiation, and. In addition, depending on its formulation, polyurethane absorbs a large range of organic solvents (like NMP, DMSO, DCM, xylene, hexane, dioxane, and acetone) causing deformation of its structure due to swelling. Further, degradation of polyurethane produces toxic byproducts that are harmful to organisms and the environment.

All of these disadvantages have an impact on polyurethane's performance range, for example, its use as filtration materials in applications involving solvents, acids, bases, and/or metal salts; its use as insulation materials in applications that also comprise solvents, acids, and/or bases; its use as materials in environmentally harsh applications where there is exposure to oxidation, metal salts, high UV, and/or radiation; it use as biomedical materials, like a component of a medical device, scaffolds (templates) for tissue engineering/regeneration, wound dressings, drug release matrixes, membranes for separations and filtration, sterile filters, artificial kidneys, absorbents, hemostatic devices, where biocompatibility and resistance to biodegradation are important.

SUMMARY

Accordingly, novel porous materials with improved acid stability/resistance, base stability/resistance, chemical stability/resistance, thermal stability/resistance, oxidation stability/resistance, UV light stability/resistance, biocompatibility, biodegradation resistance, increased gas permeability, and/or increased range of mechanical properties are provided. The presently disclosed porous materials are not only useful in all applications currently fulfilled by polyurethane-based materials, but also in many additional applications not suitable for polyurethane-based materials. For example, the porous materials disclosed herein can be used in a filter for separating or cleaning material present in a chemically aggressive environment, as a medical device, or component of a medical device, where biocompatibility and/or biostability are desired, as a material, or component thereof, exposed to chemical, oxidative, UV light, thermal and/or radiation environment that would destabilize and/or degrade a polyurethane-based material.

Aspects of the present specification disclose a novel porous material comprising a matrix defining an array of interconnected tunnels and channels. The matrix material can be a thermoset polymer, a thermoplastic polymer, an elastomer or a thermoplastic elastomer.

Other aspects of the present specification disclose a method of forming a porous material, the method comprising the steps of: a) adding a matrix material base to a mold; b) pressing a plurality of polymer fibers at least partially into the matrix material base; c) treating the matrix material-coated polymer fibers mixture to cure or harden the matrix material base; and d) removing the polymer fibers, wherein polymer fiber removal results in a porous material, the porous material comprising a matrix defining an array of interconnected tunnels and channels as disclosed herein. Method steps (a) through (c) may be repeated a plurality of times until the desired thickness of the material layer is achieved.

Yet other aspects of the present specification disclose a method of forming a porous material, the method comprising the steps of: a) coating a mandrel with a matrix material base; b) pressing a plurality of polymer fibers at least partially into the matrix material base; c) treating the matrix material-coated polymer fibers mixture to cure or harden the matrix material base; and d) removing the polymer fibers, wherein polymer fiber removal results in a porous material, the porous material comprising a matrix defining an array of interconnected tunnels and channels as disclosed herein. Method steps (a) through (c) may be repeated a plurality of times until the desired thickness of the material layer is achieved.

Still other aspects of the present specification disclose a biocompatible implantable device comprising a layer of porous material comprising a matrix defining an array of interconnected tunnels and channels as disclosed herein. The porous material can be made by a method disclosed herein.

Further aspects of the present specification disclose methods of making a article or device having a textured surface, the methods generally comprising the steps of: a) preparing the surface of a device to receive a porous material as disclosed herein; b) attaching a porous material to the prepared surface of the device. The porous material may be made by a method disclosed herein.

Further aspects of the present specification disclose a method for making molded articles or devices having porous surfaces, the methods generally comprising the steps of: a) coating a mandrel with a matrix material base; b) curing the matrix material base to form a base layer; c) coating the cured base layer with a matrix material base; d) pressing a plurality of polymer fibers at least partially into the matrix material base; e) treating the matrix material-coated polymer fibers mixture to cure or harden the matrix material base; and f) removing the polymer fibers, wherein polymer fiber removal results in a porous material, the porous material comprising a matrix defining an array of interconnected tunnels and channels as disclosed herein. In this method steps (c) and (d) can be repeated multiple times until the desired thickness of the material layer is achieved before performing step (e).

Porous materials of the present invention can be used in numerous and varied applications. In the biomedical field, porous materials of the invention can be used as a matrix for tissue engineering/regeneration, wound dressings, drug release matrices, membranes for separations and filtration, sterile filters, artificial kidneys, absorbents, hemostatic devices, and the like. In various industrial and household applications, porous materials of the invention can be used as insulating materials, packaging materials, impact absorbers, liquid or gas absorbents, wound dressings, personal hygiene products, such as but not limited to, cleaning and cleansing pads, wipes and swabs, deodorant, disposable towels, dry shampoo, facial tissues, handkerchiefs, hygiene wipes, paper towels, shaving brushes, tampons, towels, underarm liners, washing mitts, and wet wipes, membranes, filters and so forth.

BRIEF DESCRIPTION OF THE DRAWINGS

The present disclosure will be more readily understood from a detailed description of example embodiments taken in conjunction with the following figures.

DETAILED DESCRIPTION

Figure 1C:
FIG. 1C is a scanning electron microscope (SEM) image of the silicone elastomer in accordance with the invention.

The present specification discloses, in part, a porous material, for example, a silicone elastomer having a porous or foam-like texture. A porous material disclosed herein can be formed of or comprise any suitable matrix material, including thermoset polymers, thermoplastic polymers, elastomers, thermoplastic elastomers, or combinations thereof. The matrix material may comprise homopolymers or copolymers that are degradable, substantially non-degradable, or non-degradable. The matrix material useful in making the porous material disclosed herein may comprise block copolymers, random copolymers, alternating copolymers, graft copolymers, and/or mixtures thereof of thermoset polymers, thermoplastic polymers, elastomers, thermoplastic elastomers having an isotactic, syndiotactic or atactic organization. Isotactic polymers have all substituents located on the same side of the polymer backbone; the polymer comprises 100% meso diads. Syndiotactic polymers or syntactic polymers comprise have substituents in alternate positions along the chain; the polymer comprises 100% of racemo diads. Atactic polymers have substituents placed randomly along the chain; the polymer comprises between 1 and 99% meso diads. Such matrix materials include, for example carbon-based polymers, fluorocarbon-based polymers, and silicone-based polymers, including, without limitation, polyolefins, polyacrylates, fluoropolymers, polysiloxanes, polyesters, polyethers, polycarbonates, polyamides, polyanhydrides, polyorthoesters, polyurethanes, polyureas, polysaccharides, polyalkanes, polyalkenes, polyalkynes, nitriles, and fluorosilicones.

The present specification discloses, in part, a thermoset polymer. As used herein, the term "thermoset" or "thermoset polymer" refers to a material that irreversibly hardens (i.e., sets) into a given shape, generally through a curing process. A thermoset polymer may comprise homopolymers or copolymers that are degradable, substantially non-degradable, or non-degradable. A thermoset polymer useful in making the porous material disclosed herein may comprise block copolymers, random copolymers, alternating copolymers, graft copolymers, and/or mixtures thereof. Thermoset polymers outperform other materials (such as thermoplastics, see below) in a number of areas, including mechanical properties, chemical resistance, thermal stability, and overall durability. Thermoplastics include, without limitation, thermoset elastomers including carbon-based thermoset elastomers, fluorocarbon-based thermoset elastomers and silicone-based thermoset elastomers; formaldehyde-based thermoset polymers like phenol-formaldehyde, urea-formaldehyde, melamine formaldehyde; poly(ester)-based thermoset polymers; poly (epoxide)-based thermoset polymers; poly(imide)-based thermoset polymers; and poly(cyanurate)-based thermoset polymers.

The present specification discloses, in part, a thermoplastic polymer. As used herein, the term "thermoplastic", "thermoplastic polymer", or "thermosoftening plastic" refers to a material that softens and becomes fluid when heated and which hardens or freezes to a very glassy state when cooled sufficiently. Thermoplastics are elastic and flexible above a glass transition temperature Tg, the midpoint of a temperature range. Below a second, higher melting temperature, Tm, also the midpoint of a range, most thermoplastics have crystalline regions alternating with amorphous regions in which the chains approximate random coils. The amorphous regions contribute elasticity and the crystalline regions contribute strength and rigidity. Above Tm all crystalline structure disappears and the chains become randomly inter dispersed. As the temperature increases above Tm, viscosity gradually decreases without any distinct phase change. During processing, thermoplastic pellets are heated to a fluid state that allows the material to be injected under pressure from a heated cavity into a cool mold. As the material cools, the thermoplastic will harden in the shape of the mold. However, no cross-links are formed as with a thermoset polymer (i.e., no curing). Thermoplastic polymers differ from thermosetting polymers in that the changes seen are purely physical and, with the reapplication of heat, wholly reversible. As such, thermoplastics can be reprocessed many times through a cycle of remelting and remoulding. Most thermoplastics are high-molecular-weight polymers whose chains associate through weak Van der Waals forces; stronger dipole-dipole interactions and hydrogen bonding; or even stacking of aromatic rings. Thermoplastics include, e.g., amorphous thermoplastics, semi-crystalline thermoplastics, crystalline thermoplastics, and elastomeric and include, without limitation, poly(aryletherketone) (PAEK), poly(butylene terephthalate) (PBT), poly (butyrate), poly(ether ether ketone) (PEEK), poly(etherimide) (PEI), poly(2-hydroxyethyl methacrylate) (pHEMA), poly(isocyanurate) (PIR), poly(methyl methacrylate) (PMMA), poly(oxymethylene) (POM); poly(phenylsulfone) (PPSF), poly(styrene) (PS), poly(trimethylene terephthalate) (PTT), poly(urea) (PU); poly(amide)-based thermoplastics like aliphatic poly(amides), poly(phthalamides) (PPA), and aram ides (aromatic poly(am ides)); poly(carbonate)-based thermoplastics; poly(ester)-based thermoplastics like poly (ethylene)naphthalate (PEN), and poly(ethylene terephthalate) (PET); poly(olefin)-based thermoplastics like poly(ethylene) (PE), poly(propylene) (PP), poly(propylene carbonate) (PPC), poly(methylpentene) (PMP), and poly (butene-1) (PB-1); poly(stannane)-based thermoplastics; poly(sulfone)-based thermoplastics; poly(vinyl)-based thermoplastics like poly(vinyl chloride) (PVC), poly(vinylidene fluoride) (PVDF), poly(vinyl fluoride) (PVF), poly(vinyl nitrate) (PVN), and poly-(4-vinylphenol) (PVP); and cellulose-based thermoplastic like cellulose ester-based thermoplastics and cellulose ether-based thermoplastics.

The present specification discloses, in part, a fluoropolymer. As used herein, the term "fluoropolymer" refers to a fluorocarbon-based polymer with multiple strong carbon-fluorine bonds characterized by a high resistance to solvents, acids, and bases. Fluoropolymers include, without limitation, poly(vinyl fluoride) (PVF), poly(vinylidene fluoride) (PVDF), poly(tetrafluoroethylene) (PTFE), poly(chlorotrifluoroethylene) (PCTFE), perfluoroalkoxy (PFA), fluorinated ethylene-propylene (FEP), polyethylenetetrafluoroethylene (ETFE), poly(ethylenechlorotrifluoroethylene) (ECTFE), perfluoropolyether (PFPE) and fluoroelastomers.

The present specification discloses, in part, an elastomer. As used herein, the term "elastomer" or "elastic polymer" is synonymous with "thermoset elastomer" refers to an amorphous polymer that exists above its glass transition temperature ($T_g$) at ambient temperatures, thereby conferring the property of viscoelasticity so that considerable segmental motion is possible. Elastomers include, without limitation, carbon-based elastomers, silicone-based elastomers, thermoset elastomers, and thermoplastic elastomers. As used herein, the term "ambient temperature" refers to a temperature of about 18° C. to about 22° C. Elastomers, either naturally-occurring or synthetically-made, comprise monomers commonly made of carbon, hydrogen, oxygen, and/or silicone which are linked together to form long polymer chains. Elastomers are typically covalently cross-linked to one another, although non-covalently cross-linked elastomers are known. An elastomer may comprise homopolymers or copolymers that are degradable, substantially non-degradable, or non-degradable. An elastomer useful in making the porous material disclosed herein may comprise block copolymers, random copolymers, alternating copolymers, graft copolymers, and/or mixtures thereof. Unlike other polymers classes, an elastomer can be stretched many times its original length without breaking by reconfiguring themselves to distribute an applied stress, and the cross-linkages ensure that the elastomers will return to their original configuration when the stress is removed. Elastomers can be a non-medical grade elastomer or a medical grade elastomer. Medical grade elastomers are typically divided into three categories: non implantable, short term implantable and long-term implantable. Exemplary elastomers include, without limitation, bromo isobutylene isoprene (BIIR), polybutadiene (BR), chloro isobutylene isoprene (CIIR), polychloroprene (CR), chlorosulphonated polyethylene (CSM), diphenylsiloxane (DPS), ethylene propylene (EP), ethylene propylene diene monomer (EPDM), fluorinated hydrocarbon (FKM), fluoro silicone (FVQM), hydrogenated nitrile butadiene (HNBR), polyisoprene (IR), isobutylene isoprene butyl (IIR), methyl vinyl silicone (MVQ), nitrile, acrylonitrile butadiene (NBR), polyurethane (PU), styrene butadiene (SBR), styrene ethylene/butylene styrene (SEBS), polydimethylsiloxane (PDMS), polysiloxane (SI), acrylonitrile butadiene carboxy monomer (XNBR), and polyolefin elastomers like polyisobutylene (PIB), ethylene propylene rubber (EPR), ethylene propylene diene monomer (EPDM).

The present specification discloses, in part, an elastomer that is a fluorocarbon-based elastomer. As used herein, the tem term "fluorocarbon-based elastomer" refers to any fluorocarbon containing elastomer, such as, e.g., fluoro-elastomers (FKM), perfluoro elastomers (FFKM) and tetrafluoro-ethylene/propylene elastomers (FEPM).

The present specification discloses, in part, an elastomer that is a silicone-based elastomer. As used herein, the term "silicone-based elastomer" refers to any silicone containing elastomer, such as, e.g., methyl vinyl silicone, polydimethylsiloxane, or polysiloxane. A silicone-based elastomer can be a high temperature vulcanization (HTV) silicone or a room temperature vulcanization (RTV). A silicone-based elastomer can be a non-medical grade silicone-based elastomer or a medical grade silicone-based elastomer. As used herein, the term "medical grade silicone-based elastomer" refers to a silicone-based elastomer approved by the U.S. Pharmacopeia (USP) as at least Class V. Medical grade silicone-based elastomers are typically divided into three categories: non implantable, short term implantable and long-term implantable.

Thus, in an embodiment, an elastomer is a medical grade elastomer. In aspects of this embodiment, a medical grade elastomer is, e.g., a medical grade carbon-based elastomer, a medical grade silicone-based elastomer, a medical grade thermoset elastomer, or a medical grade thermoplastic elastomer. In other aspects of this embodiment, an elastomer is, e.g., a medical grade, long-term implantable, carbon-based elastomer, a medical grade, long-term implantable, silicone-based elastomer, a medical grade, long-term implantable, thermoset elastomer, or a medical grade, long-term implantable, thermoplastic elastomer. In still other aspects, a medical grade elastomer is, e.g., a medical grade bromo isobutylene isoprene, a medical grade polybutadiene, a medical grade chloro isobutylene isoprene, a medical grade polychloroprene, a medical grade chlorosulphonated polyethylene, a medical grade ethylene propylene, a medical grade ethylene propylene diene monomer, a medical grade fluorinated hydrocarbon, a medical grade fluoro silicone, a medical grade hydrogenated nitrile butadiene, a medical grade polyisoprene, a medical grade isobutylene isoprene butyl, a medical grade methyl vinyl silicone, a medical grade acrylonitrile butadiene, a medical grade polyurethane, a medical grade styrene butadiene, a medical grade styrene ethylene/butylene styrene, a medical grade polydimethylsiloxane, a medical grade polysiloxane, or a medical grade acrylonitrile butadiene carboxy monomer.

In another embodiment, an elastomer is a silicone-based elastomer. In an aspect of this embodiment, a silicone-based elastomer is a medical grade silicone-based elastomer. In aspects of this embodiment, a medical grade silicone-based elastomer is, e.g., at least a USP Class V silicone-based elastomer, at least a USP Class VI silicone-based elastomer, or USP Class VII silicone-based elastomer. In yet other aspects, a medical grade silicone-based elastomer is a long-term implantable silicone-based elastomer. In yet other aspects, a medical grade silicone-based elastomer is, e.g., a medical grade, long-term implantable, methyl vinyl silicone, a medical grade, long-term implantable, polydimethylsiloxane, or a medical grade, long-term implantable, polysiloxane.

The present specification discloses, in part, a thermoplastic elastomer. As used herein, the term "thermoplastic elastomer" or "thermoplastic rubber" refers to a material comprising a class of copolymers or a physical mix of polymers of a plastic and an elastomer that exhibit both thermoplastic and elastomeric properties. The principal difference between thermoset elastomers and thermoplastic elastomers is the type of crosslinking bond in their structures. In fact, crosslinking is a critical structural factor that contributes to impart high elastic properties. The crosslink in thermoset polymers is a covalent bond created during the vulcanization process. On the other hand, the crosslink in thermoplastic elastomer polymers is a weaker dipole or hydrogen bond or takes place in one of the phases of the material. A thermoplastic elastomer combines the elastomer-like properties of a thermoset elastomer and the processing characteristics of a thermoplastic. The TPE achieves this blend because it is composed of two regions (or phases): soft phases (cured thermoset rubber particles) dispersed within hard phases (the thermoplastic portion). Be aware that the physical, chemical, and thermal limits of both phases will determine the overall limits for the TPE. Because it is a blended material, a TPE is also considerably more expensive than a simpler thermoset material. Thermoplastic elastomers include, without limitation, styrenic block copolymers, elastomeric alloys, thermoplastic polyurethanes, thermoplastic polyester elastomers copolymers, polyolefin blends, thermoplastic polyester blends, and thermoplastic polyamides blends. Non-limiting examples, include, ethylene-vinyl acetate (EVA), copolymers of polypropylene and ethylene propylene diene monomer (EPDM) elastomer, copolymers of polystyrene and polybutadiene, and copolymers of polystyrene and polyisoprene.

Elastomers have the property of viscoelasticity. Viscoelasticity is the property of materials that exhibit both viscous and elastic characteristics when undergoing deformation. Viscous materials resist shear flow and strain linearly with time when a stress is applied. Elastic materials strain instantaneously when stretched and just as quickly return to their original state once the stress is removed. Viscoelastic materials have elements of both of these properties and, as such, exhibit time dependent strain. A viscoelastic material has the following properties: 1) hysteresis, or memory, is seen in the stress-strain curve; 2) stress relaxation occurs: step constant strain causes decreasing stress; and 3) creep occurs: step constant stress causes increasing strain. The viscoelasticity of elastomers confer a unique set of properties involving elongation, tensile strength, shear strength compressive modulus, and hardness that distinguish elastomers from other classes of polymers.

Selection of a particular matrix material is within the knowledge level of a person of ordinary skill and will depend on the specific properties and characteristics desired of the porous material. For example, where the porous material is a component of an implantable medical device, the porous material will typically comprise a biocompatible, substantially non-degradable silicone-based elastomer. As another example, where the porous material is used as a component of an insulating application, the porous material will typically comprise a poly(styrene)-based low thermal conductivity thermoset polymer. As yet another example, where the porous material is a component of a filtration device for chemically aggressive or harsh applications, the porous material will typically comprise a fluoropolymer thermoset. As yet another example, where the porous material is a component of a light weight armor, the porous material will typically comprise a silicone-based elastomer, a fluorosilicone-based elastomer, or a fluoropolymer thermoset.

The present specification discloses, in part, a porous material comprising a matrix defining an array of interconnected tunnels and channels. As used herein, the term "matrix defining an array of interconnected tunnels and channels" or "matrix material defining an array of interconnected tunnels and channels" is synonymous with "cured matrix" or "cured matrix material" and refers to a three-dimensional structural framework of tunnels and channels composed of a material, such as, e.g. a thermoset polymer, an elastomer, or a thermoplastic elastomer in its cured state or a material, such as, e.g., a thermoplastic polymer in its harden or solid state.

The present specification discloses, in part, an array of interconnected tunnels and channels. As used herein, the term "tunnel" refers to a passageway that runs internally within a porous material, and as such, forms a tube with a lumen. As used herein, the term "channel" refers to a passageway that runs on the surface of a porous material, and as such forms a channel with a furrow. Tunnels and channels are interconnected in that they may form a continuous network. As such, a channel running along the surface of the porous material can travel internally into the matrix material, thereby forming a tunnel. Similarly, one or a plurality of tunnels can intersect with one or a plurality of different tunnels forming interconnected tunnels. Likewise, one or a plurality of channels can intersect with one or a plurality of different channels forming interconnected channels.

A porous material comprising a matrix defining an array of interconnected tunnels and channels may exhibit high resistance to deformation. Resistance to deformation is the ability of a material to maintain its original form after being exposed to stress, and can be calculated as the original form of the material ($L_O$), divided by the form of the material after it is released from a stress ($L_R$), and then multiplied by 100.

In an embodiment, a porous material comprising a matrix defining an array of interconnected tunnels and channels exhibits high resistance to deformation. In aspects of this embodiment, a porous material disclosed herein exhibits resistance to deformation of, e.g., about 100%, about 99%, about 98%, about 97%, about 96%, about 95%, about 94%, about 93%, about 92%, about 91%, about 90%, about 89%, about 88%, about 87%, about 86%, or about 85%. In other aspects of this embodiment, a porous material disclosed herein exhibits resistance to deformation of, e.g., at least 99%, at least 98%, at least 97%, at least 96%, at least 95%, at least 94%, at least 93%, at least 92%, at least 91%, at least 90%, at least 89%, at least 88%, at least 87%, at least 86%, or at least 85%. In yet other aspects of this embodiment, a porous material disclosed herein exhibits resistance to deformation of, e.g., at most 99%, at most 98%, at most 97%, at most 96%, at most 95%, at most 94%, at most 93%, at most 92%, at most 91%, at most 90%, at most 89%, at most 88%, at most 87%, at most 86%, or at most 85%. In still aspects of this embodiment, a porous material disclosed herein exhibits resistance to deformation of, e.g., about 85% to about 100%, about 87% to about 100%, about 90% to about 100%, about 93% to about 100%, about 95% to about 100%, or about 97% to about 100%.

A porous material comprising a matrix defining an array of interconnected tunnels and channels may exhibit high elastic elongation. Elongation is a type of deformation caused when a material stretches under a tensile stress. Deformation is simply a change in shape that anything undergoes under stress. The elongation property of a material can be expressed as percent elongation, which is calculated as the length of a material after it is stretched (L), divided by the original length of the material ($L_O$), and then multiplied by 100. In addition, this elastic elongation may be reversible. Reversible elongation is the ability of a material to return to its original length after being release for a tensile stress, and can be calculated as the original length of the material ($L_O$), divided by the length of the material after it is released from a tensile stress ($L_R$), and then multiplied by 100.

In an embodiment, a porous material comprising a matrix defining an array of interconnected tunnels and channels exhibits high elastic elongation. In aspects of this embodiment, a porous material disclosed herein exhibits an elastic elongation of, e.g., about 50%, about 80%, about 100%, about 200%, about 300%, about 400%, about 500%, about 600%, about 700%, about 800%, about 900%, about 1000%, about 1100%, about 1200%, about 1300%, about 1400%, about 1500%, about 1600%, about 1700%, about 1800%, about 1900%, or about 2000%. In other aspects of this embodiment, a porous material disclosed herein exhibits an elastic elongation of, e.g., at least 50%, at least 80%, at least 100%, at least 200%, at least 300%, at least 400%, at least 500%, at least 600%, at least 700%, at least 800%, at least 900%, at least 1000%, at least 1100%, at least 1200%, at least 1300%, at least 1400%, at least 1500%, at least 1600%, at least 1700%, at least 1800%, at least 1900%, or at least 2000%. In yet other aspects of this embodiment, a porous material disclosed herein exhibits an elastic elongation of, e.g., at most 50%, at most 80%, at most 100%, at most 200%, at most 300%, at most 400%, at most 500%, at most 600%, at most 700%, at most 800%, at most 900%, at most 1000%, at most 1100%, at most 1200%, at most 1300%, at most 1400%, at most 1500%, at most 1600%, at most 1700%, at most 1800%, at most 1900%, or at most 2000%. In still aspects of this embodiment, a porous material disclosed herein exhibits an elastic elongation of, e.g., about 50% to about 600%, about 50% to about 700%, about 50% to about 800%, about 50% to about 900%, about 50% to about 1000%, about 80% to about 600%, about 80% to about 700%, about 80% to about 800%, about 80% to about 900%, about 80% to about 1000%, about 100% to about 600%, about 100% to about 700%, about 100% to about 800%, about 100% to about 900%, about 100% to about 1000%, about 200% to about 600%, about 200% to about 700%, about 200% to about 800%, about 200% to about 900%, or about 200% to about 1000%.

In another embodiment, a porous material comprising a matrix defining an array of interconnected tunnels and channels exhibits reversible elongation. In aspects of this embodiment, a porous material disclosed herein exhibits a reversible elastic elongation of, e.g., about 100%, about 99%, about 98%, about 97%, about 96%, about 95%, about 94%, about 93%, about 92%, about 91%, about 90%, about 89%, about 88%, about 87%, about 86%, or about 85%. In other aspects of this embodiment, a porous material disclosed herein exhibits a reversible elastic elongation of, e.g., at least 99%, at least 98%, at least 97%, at least 96%, at least 95%, at least 94%, at least 93%, at least 92%, at least 91%, at least 90%, at least 89%, at least 88%, at least 87%, at least 86%, or at least 85%. In yet other aspects of this embodiment, a porous material disclosed herein exhibits a reversible elastic elongation of, e.g., at most 99%, at most 98%, at most 97%, at most 96%, at most 95%, at most 94%, at most 93%, at most 92%, at most 91%, at most 90%, at most 89%, at most 88%, at most 87%, at most 86%, or at most 85%. In still aspects of this embodiment, a porous material disclosed herein exhibits a reversible elastic elongation of, e.g., about 85% to about 100%, about 87% to about 100%, about 90% to about 100%, about 93% to about 100%, about 95% to about 100%, or about 97% to about 100%.

A porous material comprising a matrix defining an array of interconnected tunnels and channels may exhibit low elastic modulus. Elastic modulus, or modulus of elasticity, refers to the ability of a material to resists deformation, or, conversely, an object's tendency to be non-permanently deformed when a force is applied to it. The elastic modulus of an object is defined as the slope of its stress-strain curve in the elastic deformation region: $\lambda$=stress/strain, where $\lambda$ is the elastic modulus in Pascal's; stress is the force causing the deformation divided by the area to which the force is applied; and strain is the ratio of the change caused by the stress to the original state of the object. Specifying how stresses are to be measured, including directions, allows for many types of elastic moduli to be defined. The three primary elastic moduli are tensile modulus, shear modulus, and bulk modulus.

Tensile modulus (E) or Young's modulus is an objects response to linear strain, or the tendency of an object to deform along an axis when opposing forces are applied along that axis. It is defined as the ratio of tensile stress to tensile strain. It is often referred to simply as the elastic modulus. The shear modulus or modulus of rigidity refers to an object's tendency to shear (the deformation of shape at constant volume) when acted upon by opposing forces. It is defined as shear stress over shear strain. The shear modulus is part of the derivation of viscosity. The shear modulus is concerned with the deformation of a solid when it experiences a force parallel to one of its surfaces while its opposite face experiences an opposing force (such as friction). The bulk modulus (K) describes volumetric elasticity or an object's resistance to uniform compression, and is the tendency of an object to deform in all directions when uniformly loaded in all directions. It is defined as volumetric stress over volumetric strain, and is the inverse of compressibility. The bulk modulus is an extension of Young's modulus to three dimensions.

In another embodiment, a porous material comprising a matrix defining an array of interconnected tunnels and channels exhibits low tensile modulus. In aspects of this embodiment, a porous material disclosed herein exhibits a tensile modulus of, e.g., about 0.01 MPa, about 0.02 MPa, about 0.03 MPa, about 0.04 MPa, about 0.05 MPa, about 0.06 MPa, about 0.07 MPa, about 0.08 MPa, about 0.09 MPa, about 0.1 MPa, about 0.15 MPa, about 0.2 MPa, about 0.25 MPa, about 0.3 MPa, about 0.35 MPa, about 0.4 MPa, about 0.45 MPa, about 0.5 MPa, about 0.55 MPa, about 0.6 MPa, about 0.65 MPa, or about 0.7 MPa. In other aspects of this embodiment, a porous material disclosed herein exhibits a tensile modulus of, e.g., at most 0.01 MPa, at most 0.02 MPa, at most 0.03 MPa, at most 0.04 MPa, at most 0.05 MPa, at most 0.06 MPa, at most 0.07 MPa, at most 0.08 MPa, at most 0.09 MPa, at most 0.1 MPa, at most 0.15 MPa, at most 0.2 MPa, at most 0.25 MPa, at most 0.3 MPa, at most 0.35 MPa, at most 0.4 MPa, at most 0.45 MPa, at most 0.5 MPa, at most 0.55 MPa, at most 0.6 MPa, at most 0.65 MPa, or at most 0.7 MPa. In yet other aspects of this embodiment, a porous material disclosed herein exhibits a tensile modulus of, e.g., about 0.01 MPa to about 0.1 MPa, about 0.01 MPa to about 0.2 MPa, about 0.01 MPa to about 0.3 MPa, about 0.01 MPa to about 0.4 MPa, about 0.01 MPa to about 0.5 MPa, about 0.01 MPa to about 0.6 MPa, or about 0.01 MPa to about 0.7 MPa.

In another embodiment, a porous material comprising a matrix defining an array of interconnected tunnels and channels exhibits low shear modulus. In aspects of this embodiment, a porous material disclosed herein exhibits a shear modulus of, e.g., about 0.1 MPa, about 0.2 MPa, about 0.3 MPa, about 0.4 MPa, about 0.5 MPa, about 0.6 MPa, about 0.7 MPa, about 0.8 MPa, about 0.9 MPa, about 1 MPa, about 1.5 MPa, about 2 MPa, about 2.5 MPa, or about 3 MPa. In other aspects of this embodiment, a porous material disclosed herein exhibits a shear modulus of, e.g., at most 0.1 MPa, at most 0.2 MPa, at most 0.3 MPa, at most 0.4 MPa, at most 0.5 MPa, at most 0.6 MPa, at most 0.7 MPa, at most 0.8 MPa, at most 0.9 MPa, at most 1 MPa, at most 1.5 MPa, at most 2 MPa, at most 2.5 MPa, or at most 3 MPa. In yet other aspects of this embodiment, a porous material disclosed herein exhibits a shear modulus of, e.g., about 0.1 MPa to about 1 MPa, about 0.1 MPa to about 1.5 MPa, about 0.1 MPa to about 2 MPa, about 0.1 MPa to about 2.5 MPa, or about 0.1 MPa to about 3 MPa.

In another embodiment, a porous material comprising a matrix defining an array of interconnected tunnels and channels exhibits low bulk modulus. In aspects of this embodiment, a porous material disclosed herein exhibits a bulk modulus of, e.g., about 0.5 GPa, about 0.6 GPa, about 0.7 GPa, about 0.8 GPa, about 0.9 GPa, about 1 GPa, about 1.5 GPa, about 2 GPa, about 2.5 GPa, about 3 GPa, about 3.5 GPa, about 4 GPa, about 4.5 GPa, or about 5 GPa. In other aspects of this embodiment, a porous material disclosed herein exhibits a bulk modulus of, e.g., at most 0.5 GPa, at most 0.6 GPa, at most 0.7 GPa, at most 0.8 GPa, at most 0.9 GPa, at most 1 GPa, at most 1.5 GPa, at most 2 GPa, at most 2.5 GPa, at most 3 GPa, at most 3.5 GPa, at most 4 GPa, at most 4.5 GPa, or at most 5 GPa. In yet other aspects of this embodiment, a porous material disclosed herein exhibits a bulk modulus of, e.g., about 0.5 GPa to about 5 GPa, about 0.5 GPa to about 1 GPa, or about 1 GPa to about 5 GPa.

A porous material comprising a matrix material defining an array of interconnected tunnels and channels may exhibit high tensile strength. Tensile strength has three different definitional points of stress maxima. Yield strength refers to the stress at which material strain changes from elastic deformation to plastic deformation, causing it to deform permanently. Ultimate strength refers to the maximum stress a material can withstand when subjected to tension, compression or shearing. It is the maximum stress on the stress-strain curve. Breaking strength refers to the stress coordinate on the stress-strain curve at the point of rupture, or when the material pulls apart.

In another embodiment, a porous material comprising a matrix defining an array of interconnected tunnels and channels exhibits high yield strength. In aspects of this embodiment, a porous material disclosed herein exhibits a yield strength of, e.g., about 1 MPa, about 5 MPa, about 10 MPa, about 20 MPa, about 30 MPa, about 40 MPa, about 50 MPa, about 60 MPa, about 70 MPa, about 80 MPa, about 90 MPa, about 100 MPa, about 200 MPa, about 300 MPa, about 400 MPa, about 500 MPa, about 600 MPa, about 700 MPa, about 800 MPa, about 900 MPa, about 1000 MPa, about 1500 MPa, or about 2000 MPa. In other aspects of this embodiment, a porous material disclosed herein exhibits a yield strength of, e.g., at least 1 MPa, at least 5 MPa, at least 10 MPa, at least 20 MPa, at least 30 MPa, at least 40 MPa, at least 50 MPa, at least 60 MPa, at least 70 MPa, at least 80 MPa, at least 90 MPa, at least 100 MPa, at least 200 MPa, at least 300 MPa, at least 400 MPa, at least 500 MPa, at least 600 MPa, at least 700 MPa, at least 800 MPa, at least 900 MPa, at least 1000 MPa, at least 1500 MPa, or at least 2000 MPa. In yet other aspects of this embodiment, a porous material disclosed herein exhibits a yield strength of, e.g., at most 1 MPa, at most 5 MPa, at most 10 MPa, at most 20 MPa, at most 30 MPa, at most 40 MPa, at most 50 MPa, at most 60 MPa, at most 70 MPa, at most 80 MPa, at most 90 MPa, at most 100 MPa, at most 200 MPa, at most 300 MPa, at most 400 MPa, at most 500 MPa, at most 600 MPa, at most 700 MPa, at most 800 MPa, at most 900 MPa, at most 1000 MPa, at most 1500 MPa, or at most 2000 MPa. In still other aspects of this embodiment, a porous material disclosed herein exhibits a yield strength of, e.g., about 1 MPa to about 50 MPa, about 1 MPa to about 60 MPa, about 1 MPa to about 70 MPa, about 1 MPa to about 80 MPa, about 1 MPa to about 90 MPa, about 1 MPa to about 100 MPa, about 10 MPa to about 50 MPa, about 10 MPa to about 60 MPa, about 10 MPa to about 70 MPa, about 10 MPa to about 80 MPa, about 10 MPa to about 90 MPa, about 10 MPa to about 100 MPa, about 100 MPa to about 500 MPA, about 300 MPa to about 500 MPA, about 300 MPa to about 1000 MPa, about 500 MPa to about 1000 MPa, about 700 MPa to about 1000 MPa, about 700 MPa to about 1500 MPa, about 1000 MPa to about 1500 MPa, or about 1200 MPa to about 1500 MPa.

In another embodiment, a porous material comprising a matrix defining an array of interconnected tunnels and channels exhibits high ultimate strength relative to other polymer classes. In aspects of this embodiment, a porous material disclosed herein exhibits an ultimate strength of, e.g., about 1 MPa, about 5 MPa, about 10 MPa, about 20 MPa, about 30 MPa, about 40 MPa, about 50 MPa, about 60 MPa, about 70 MPa, about 80 MPa, about 90 MPa, about 100 MPa, about 200 MPa, about 300 MPa, about 400 MPa, about 500 MPa, about 600 MPa, about 700 MPa, about 800 MPa, about 900 MPa, about 1000 MPa, about 1500 MPa, or about 2000 MPa. In other aspects of this embodiment, a porous material disclosed herein exhibits an ultimate strength of, e.g., at least 1 MPa, at least 5 MPa, at least 10 MPa, at least 20 MPa, at least 30 MPa, at least 40 MPa, at least 50 MPa, at least 60 MPa, at least 70 MPa, at least 80 MPa, at least 90 MPa, at least 100 MPa, at least 200 MPa, at least 300 MPa, at least 400 MPa, at least 500 MPa, at least 600 MPa, at least 700 MPa, at least 800 MPa, at least 900 MPa, at least 1000 MPa, at least 1500 MPa, or at least 2000 MPa. In yet other aspects of this embodiment, a porous material disclosed herein exhibits an ultimate strength of, e.g., at most 1 MPa, at most 5 MPa, at most 10 MPa, at most 20 MPa, at most 30 MPa, at most 40 MPa, at most 50 MPa, at most 60 MPa, at most 70 MPa, at most 80 MPa, at most 90 MPa, at most 100 MPa, at most 200 MPa, at most 300 MPa, at most 400 MPa, at most 500 MPa, at most 600 MPa, at most 700 MPa, at most 800 MPa, at most 900 MPa, at most 1000 MPa, at most 1500 MPa, or at most 2000 MPa. In still other aspects of this embodiment, a porous material disclosed herein exhibits an ultimate strength of, e.g., about 1 MPa to about 50 MPa, about 1 MPa to about 60 MPa, about 1 MPa to about 70 MPa, about 1 MPa to about 80 MPa, about 1 MPa to about 90 MPa, about 1 MPa to about 100 MPa, about 10 MPa to about 50 MPa, about 10 MPa to about 60 MPa, about 10 MPa to about 70 MPa, about 10 MPa to about 80 MPa, about 10 MPa to about 90 MPa, about 10 MPa to about 100 MPa, about 100 MPa to about 500 MPA, about 300 MPa to about 500 MPA, about 300 MPa to about 1000 MPa, about 500 MPa to about 1000 MPa, about 700 MPa to about 1000 MPa, about 700 MPa to about 1500 MPa, about 1000 MPa to about 1500 MPa, or about 1200 MPa to about 1500 MPa.

In another embodiment, a porous material comprising a matrix defining an array of interconnected tunnels and channels exhibits high breaking strength. In aspects of this embodiment, a porous material disclosed herein exhibits a breaking strength of, e.g., about 1 MPa, about 5 MPa, about 10 MPa, about 20 MPa, about 30 MPa, about 40 MPa, about 50 MPa, about 60 MPa, about 70 MPa, about 80 MPa, about 90 MPa, about 100 MPa, about 200 MPa, about 300 MPa, about 400 MPa, about 500 MPa, about 600 MPa, about 700 MPa, about 800 MPa, about 900 MPa, about 1000 MPa, about 1500 MPa, or about 2000 MPa. In other aspects of this embodiment, a porous material disclosed herein exhibits a breaking strength of, e.g., at least 1 MPa, at least 5 MPa, at least 10 MPa, at least 20 MPa, at least 30 MPa, at least 40 MPa, at least 50 MPa, at least 60 MPa, at least 70 MPa, at least 80 MPa, at least 90 MPa, at least 100 MPa, at least 200 MPa, at least 300 MPa, at least 400 MPa, at least 500 MPa, at least 600 MPa, at least 700 MPa, at least 800 MPa, at least 900 MPa, at least 1000 MPa, at least 1500 MPa, or at least 2000 MPa. In yet other aspects of this embodiment, a porous material disclosed herein exhibits a breaking strength of, e.g., at most 1 MPa, at most 5 MPa, at most 10 MPa, at most 20 MPa, at most 30 MPa, at most 40 MPa, at most 50 MPa, at most 60 MPa, at most 70 MPa, at most 80 MPa, at most 90 MPa, at most 100 MPa, at most 200 MPa, at most 300 MPa, at most 400 MPa, at most 500 MPa, at most 600 MPa, at most 700 MPa, at most 800 MPa, at most 900 MPa, at most 1000 MPa, at most 1500 MPa, or at most 2000 MPa. In still other aspects of this embodiment, a porous material disclosed herein exhibits a breaking strength of, e.g., about 1 MPa to about 50 MPa, about 1 MPa to about 60 MPa, about 1 MPa to about 70 MPa, about 1 MPa to about 80 MPa, about 1 MPa to about 90 MPa, about 1 MPa to about 100 MPa, about 10 MPa to about 50 MPa, about 10 MPa to about 60 MPa, about 10 MPa to about 70 MPa, about 10 MPa to about 80 MPa, about 10 MPa to about 90 MPa, about 10 MPa to about 100 MPa, about 100 MPa to about 500 MPA, about 300 MPa to about 500 MPA, about 300 MPa to about 1000 MPa, about 500 MPa to about 1000 MPa, about 700 MPa to about 1000 MPa, about 700 MPa to about 1500 MPa, about 1000 MPa to about 1500 MPa, or about 1200 MPa to about 1500 MPa.

A porous material comprising a matrix defining an array of interconnected tunnels and channels may exhibit low flexural strength. Flexural strength, also known as bend strength or modulus of rupture, refers to an object's ability to resist deformation under load and represents the highest stress experienced within the object at its moment of rupture. It is measured in terms of stress.

In an embodiment, a porous material comprising a matrix defining an array of interconnected tunnels and channels exhibits low flexural strength. In aspects of this embodiment, a porous material disclosed herein exhibits a flexural strength of, e.g., about 1 MPa, about 5 MPa, about 10 MPa, about 20 MPa, about 30 MPa, about 40 MPa, about 50 MPa, about 60 MPa, about 70 MPa, about 80 MPa, about 90 MPa, about 100 MPa, about 200 MPa, about 300 MPa, about 400 MPa, about 500 MPa, about 600 MPa, about 700 MPa, about 800 MPa, about 900 MPa, about 1000 MPa, about 1500 MPa, or about 2000 MPa. In other aspects of this embodiment, a porous material disclosed herein exhibits a flexural strength of, e.g., at least 1 MPa, at least 5 MPa, at least 10 MPa, at least 20 MPa, at least 30 MPa, at least 40 MPa, at least 50 MPa, at least 60 MPa, at least 70 MPa, at least 80 MPa, at least 90 MPa, at least 100 MPa, at least 200 MPa, at least 300 MPa, at least 400 MPa, at least 500 MPa, at least 600 MPa, at least 700 MPa, at least 800 MPa, at least 900 MPa, at least 1000 MPa, at least 1500 MPa, or at least 2000 MPa. In yet other aspects of this embodiment, a porous material disclosed herein exhibits a flexural strength of, e.g., at most 1 MPa, at most 5 MPa, at most 10 MPa, at most 20 MPa, at most 30 MPa, at most 40 MPa, at most 50 MPa, at most 60 MPa, at most 70 MPa, at most 80 MPa, at most 90 MPa, at most 100 MPa, at most 200 MPa, at most 300 MPa, at most 400 MPa, at most 500 MPa, at most 600 MPa, at most 700 MPa, at most 800 MPa, at most 900 MPa, at most 1000 MPa, at most 1500 MPa, or at most 2000 MPa. In still other aspects of this embodiment, a porous material disclosed herein exhibits a flexural strength of, e.g., about 1 MPa to about 50 MPa, about 1 MPa to about 60 MPa, about 1 MPa to about 70 MPa, about 1 MPa to about 80 MPa, about 1 MPa to about 90 MPa, about 1 MPa to about 100 MPa, about 10 MPa to about 50 MPa, about 10 MPa to about 60 MPa, about 10 MPa to about 70 MPa, about 10 MPa to about 80 MPa, about 10 MPa to about 90 MPa, about 10 MPa to about 100 MPa, about 100 MPa to about 500 MPA, about 300 MPa to about 500 MPA, about 300 MPa to about 1000 MPa, about 500 MPa to about 1000 MPa, about 700 MPa to about 1000 MPa, about 700 MPa to about 1500 MPa, about 1000 MPa to about 1500 MPa, or about 1200 MPa to about 1500 MPa.

A porous material comprising a matrix defining an array of interconnected tunnels and channels may exhibit high compressibility. Compressibility refers to the relative volume change in response to a pressure (or mean stress) change, and is the reciprocal of the bulk modulus.

In an embodiment, a porous material comprising a matrix defining an array of interconnected tunnels and channels exhibits high compressibility. In aspects of this embodiment, a porous material disclosed herein exhibits a compressibility of, e.g., about 0.1 kPa, about 0.5 kPa, about 1 kPa, about 5 kPa, about 10 kPa, about 15 kPa, about 20 kPa, about 30 kPa, about 40 kPa, about 50 kPa, about 60 kPa, about 70 kPa, about 80 kPa, about 90 kPa, or about 100 kPa. In other aspects of this embodiment, a porous material disclosed herein exhibits a compressibility of, e.g., at least 0.1 kPa, at least 0.5 kPa, at least 1 kPa, at least 5 kPa, at least 10 kPa, at least 15 kPa, at least 20 kPa, at least 30 kPa, at least 40 kPa, at least 50 kPa, at least 60 kPa, at least 70 kPa, at least 80 kPa, at least 90 kPa, or at least 100 kPa. In yet other aspects of this embodiment, a porous material disclosed herein exhibits a compressibility of, e.g., at most 0.1 kPa, at most 0.5 kPa, at most 1 kPa, at most 5 kPa, at most 10 kPa, at most 15 kPa, at most 20 kPa, at most 30 kPa, at most 40 kPa, at most 50 kPa, at most 60 kPa, at most 70 kPa, at most 80 kPa, at most 90 kPa, or at most 100 kPa. In still other aspects of this embodiment, a porous material disclosed herein exhibits a compressibility of, e.g., about 0.1 kPa to about 100 kPa, about 0.5 kPa to about 100 kPa, about 1 kPa to about 100 kPa, about 5 kPa to about 100 kPa, about 10 kPa to about 100 kPa, about 1 kPa to about 30 kPa, about 1 kPa to about 40 kPa, about 1 kPa to about 50 kPa, or about 1 kPa to about 60 kPa.

A porous material comprising a matrix defining an array of interconnected tunnels and channels may exhibit low hardness. Hardness refers to various properties of an object in the solid phase that gives it high resistance to various kinds of shape change when force is applied. Hardness can be measured using a durometer and expressed using a Shore A scale, a unitless value that ranges from zero to 100.

In an embodiment, a porous material comprising a matrix defining an array of interconnected tunnels and channels exhibits low hardness. In aspects of this embodiment, a porous material disclosed herein exhibits a Shore A hardness of, e.g., about 5, about 10, about 15, about 20, about 25, about 30, about 35, about 40, about 45, about 50, about 55, or about 60. In other aspects of this embodiment, a porous material disclosed herein exhibits a Shore A hardness of, e.g., at least 5, at least 10, at least 15, at least 20, at least 25, at least 30, at least 35, at least 40, at least 45, at least 50, at least 55, or at least 60. In yet other aspects of this embodiment, a porous material disclosed herein exhibits a Shore A hardness of, e.g., at most 5, at most 10, at most 15, at most 20, at most 25, at most 30, at most 35, at most 40, at most 45, at most 50, at most 55, or at most 60. In still other aspects of this embodiment, a porous material disclosed herein exhibits a Shore A hardness of, e.g., about 5 to about 60, about 10 to about 50, about 15 to about 45, about 20 to about 40, or about 25 to about 35.

A porous material comprising a matrix defining an array of interconnected tunnels and channels may exhibit low thermal conductivity. Thermal conductivity, k, refers to the property of a material that indicates its ability to conduct heat and is measured in watts per Kelvin per meter ($W·K^{-1}·m^{-1}$). Multiplied by a temperature difference (in K) and an area (in $m^2$), and divided by a thickness (in m) the thermal conductivity predicts the energy loss (in W) through a piece of material. The reciprocal of thermal conductivity is thermal resistivity, and is measured in Kelvin-meters per watt ($K·m·W^{-1}$). Thermal conductance refers to the quantity of heat that passes in unit time through a plate of particular area and thickness when its opposite faces differ in temperature by one Kelvin. For a plate of thermal conductivity k, area A and thickness L this is kA/L, measured in $W·K^{-1}$ (equivalent to: W/° C.). The reciprocal of thermal conductance is thermal resistance [L/(kA)], and is measured in $K·W^{-1}$ (equivalent to: ° C./W). Heat transfer coefficient (k/L), also known as thermal admittance, refers to the quantity of heat that passes in unit time through unit area of a plate of particular thickness when its opposite faces differ in temperature by one Kelvin, and is measured in $W·K^{-1}\ m^{-2}$. The reciprocal of heat transfer coefficient is thermal insulation (L/k), and is measured in $K·m^2W^{-1}$.

In an embodiment, a porous material comprising a matrix defining an array of interconnected tunnels and channels exhibits low thermal conductivity. In aspects of this embodiment, a porous material disclosed herein exhibits a thermal conductivity of, e.g., about 0.010 $Wm^{-1}K^{-1}$, about 0.025 $Wm^{-1}K^{-1}$, about 0.050 $Wm^{-1}K^{-1}$, about 0.075 $Wm^{-1}K^{-1}$, about 0.10 $Wm^{-1}K^{-1}$, about 0.25 $Wm^{-1}K^{-1}$, about 0.50 $Wm^{-1}K^{-1}$, about 0.75 $Wm^{-1}K^{-1}$, about 1.0 $Wm^{-1}K^{-1}$, about 2.5 $Wm^{-1}K^{-1}$, about 5.0 $Wm^{-1}K^{-1}$, about 7.5 $Wm^{-1}K^{-1}$, or about 10 $Wm^{-1}K^{-1}$. In other aspects of this embodiment, a porous material disclosed herein exhibits a thermal conductivity of, e.g., at most 0.010 $Wm^{-1}K^{-1}$, at most 0.025 $Wm^{-1}K^{-1}$, at most 0.050 $Wm^{-1}K^{-1}$, at most 0.075 $Wm^{-1}K^{-1}$, at most 0.10 $Wm^{-1}K^{-1}$, at most 0.25 $Wm^{-1}K^{-1}$, at most 0.50 $Wm^{-1}K^{-1}$, at most 0.75 $Wm^{-1}K^{-1}$, at most 1.0 $Wm^{-1}K^{-1}$, at most 2.5 $Wm^{-1}K^{-1}$, at most 5.0 $Wm^{-1}K^{-1}$, at most 7.5 $Wm^{-1}K^{-1}$, or at most 10 $Wm^{-1}K^{-1}$. In yet other aspects of this embodiment, a porous material disclosed herein exhibits a thermal conductivity of, e.g., about 0.010 $Wm^{-1}K^{-1}$ to about 0.10 $Wm^{-1}K^{-1}$, about 0.010 $Wm^{-1}K^{-1}$ to about 1.0 $Wm^{-1}K^{-1}$, about 0.010 $Wm^{-1}K^{-1}$ to about 10 $Wm^{-1}K^{-1}$, about 0.050 $Wm^{-1}K^{-1}$ to about 0.50 $Wm^{-1}K^{-1}$, about 0.050 $Wm^{-1}K^{-1}$ to about 5.0 $Wm^{-1}K^{-1}$, about 0.010 $Wm^{-1}K^{-1}$ to about 0.050 $Wm^{-1}K^{-1}$, about 0.025 $Wm^{-1}K^{-1}$ to about 0.075 $Wm^{-1}K^{-1}$, about 0.050 $Wm^{-1}K^{-1}$ to about 0.10 $Wm^{-1}K^{-1}$, about 0.075 $Wm^{-1}K^{-1}$ to about 0.25 $Wm^{-1}K^{-1}$, about 0.10 $Wm^{-1}K^{-1}$ to about 0.50 $Wm^{-1}K^{-1}$, about 0.25 $Wm^{-1}K^{-1}$ to about 0.75 $Wm^{-1}K^{-1}$, about 0.50 $Wm^{-1}K^{-1}$ to about 1.0 $Wm^{-1}K^{-1}$, about 0.75 $Wm^{-1}K^{-1}$ to about 2.5 $Wm^{-1}K^{-1}$, about 1.0 $Wm^{-1}K^{-1}$ to about 5.0 $Wm^{-1}K^{-1}$, about 2.5 $Wm^{-1}K^{-1}$ to about 7.5 $Wm^{-1}K^{-1}$, or about 5.0 $Wm^{-1}K^{-1}$ to about 10 $Wm^{-1}K^{-1}$.

The tunnels and channels comprising the matrix have a shape sufficient to enable the desired function of the porous material. Useful tunnels and channels shapes include, without limitation, roughly cylindrical, perfectly cylindrical, roughly rectangular, and perfectly rectangular. For example, in certain biomedical applications, tunnel and channel shape should be in a form sufficient to support aspects tissue growth into the array of interconnected tunnels and channels, thereby supporting aspects of tissue growth such as, e.g., cell migration, cell proliferation, cell differentiation, nutrient exchange, and/or waste removal. As another example, in filtration applications, tunnel and channel shape should be in a form that facilitates removal unwanted substances from the filtered material.

A porous material comprising a matrix defining an array of interconnected tunnels and channels may be formed in such a manner that substantially all the tunnel lumens and/or channel furrows in the matrix have a similar diameter. As used herein, the term "substantially", when used to describe tunnel lumens and/or channel furrows, refers to at least 90% of the tunnel lumens and/or channel furrows within the matrix such as, e.g., at least 95% or at least 97% of the lumen and/or furrow. As used herein, the term "similar diameter", when used to describe tunnel lumens and/or channel furrows, refers to a difference in the diameters of the two tunnel lumens and/or channel furrows that is less than about 20% of the larger diameter. As used herein, the term "diameter", when used to describe tunnel lumens and/or channel furrows, refers to the longest line segment that can be drawn that connects two points within the tunnel lumens and/or channel furrows, regardless of whether the line passes outside the boundary of the tunnel lumens and/or channel furrows. For example, in certain biomedical applications, tunnel lumen and/or channel furrow diameter should be sufficient to support aspects tissue growth into the array of interconnected tunnels and channels, thereby supporting aspects of tissue growth such as, e.g., cell migration, cell proliferation, cell differentiation, nutrient exchange, and/or waste removal. As another example, in filtration applications, tunnel lumen and/or channel furrow diameter should be sufficient to facilitate removal unwanted substances from the filtered material.

A porous material comprising a matrix is formed in such a manner that the diameter of the connections between tunnel lumens and/or channel furrows is sufficient to enable the desired function of the porous material. As used herein, the term "diameter", when describing the connection between tunnel lumens and/or channel furrows, refers to the diameter of the cross-section of the connection between two tunnel lumens and/or channel furrows in the plane normal to the line connecting the centroids of the two tunnel lumens and/or channel furrows, where the plane is chosen so that the area of the cross-section of the connection is at its minimum value. As used herein, the term "diameter of a cross-section of a connection" refers to the average length of a straight line segment that passes through the center, or centroid (in the case of a connection having a cross-section that lacks a center), of the cross-section of a connection and terminates at the periphery of the cross-section. As used herein, the term "substantially", when used to describe the connections between tunnel lumens and/or channel furrows refers to at least 90% of the connections made between each tunnel lumen and/or channel furrow comprising the matrix, such as, e.g., at least 95% or at least 97% of the connections. For example, in certain biomedical applications, the diameter of the connections between tunnel lumens and/or channel furrows should be sufficient to support aspects tissue growth into the array of interconnected tunnels and channels, thereby supporting aspects of tissue growth such as, e.g., cell migration, cell proliferation, cell differentiation, nutrient exchange, and/or waste removal. As another example, in filtration applications, the diameter of the connections between tunnel lumens and/ or channel furrows should be sufficient to facilitate removal unwanted substances from the filtered material.

In another embodiment, a porous material comprising a matrix defining an array of tunnels and channels includes tunnel lumens and/or channel furrows having a mean diameter sufficient to enable the desired function of the porous material. In aspects of this embodiment, a porous material disclosed herein includes tunnel and/or channel having a mean lumen or furrow diameter of, e.g., about 50 µm, about 75 µm, about 100 µm, about 150 µm, about 200 µm, about 250 µm, about 300 µm, about 350 µm, about 400 µm, about 450 µm, or about 500 µm. In other aspects, a porous material disclosed herein includes tunnel and/or channel having a mean lumen or furrow diameter of, e.g., about 500 µm, about 600 µm, about 700 µm, about 800 µm, about 900 µm, about 1000 µm, about 1500 µm, about 2000 µm, about 2500 µm, or about 3000 µm. In yet other aspects of this embodiment, a porous material disclosed herein includes tunnel and/or channel having a mean lumen or furrow diameter of, e.g., at least 50 µm, at least 75 µm, at least 100 µm, at least 150 µm, at least 200 µm, at least 250 µm, at least 300 µm, at least 350 µm, at least 400 µm, at least 450 µm, or at least 500 µm. In still other aspects, a porous material disclosed herein includes tunnel and/or channel having a mean lumen or furrow diameter of, e.g., at least 500 µm, at least 600 µm, at least 700 µm, at least 800 µm, at least 900 µm, at least 1000 µm, at least 1500 µm, at least 2000 µm, at least 2500 µm, or at least 3000 µm. In further aspects of this embodiment, a porous material disclosed herein includes tunnel and/or channel having a mean lumen or furrow diameter of, e.g., at most 50 µm, at most 75 µm, at most 100 µm, at most 150 µm, at most 200 µm, at most 250 µm, at most 300 µm, at most 350 µm, at most 400 µm, at most 450 µm, or at most 500 µm. In yet further aspects of this embodiment, a porous material disclosed herein includes tunnel and/or channel having a mean lumen or furrow diameter of, e.g., at most 500 µm, at most 600 µm, at most 700 µm, at most 800 µm, at most 900 µm, at most 1000 µm, at most 1500 µm, at most 2000 µm, at most 2500 µm, or at most 3000 µm. In still further aspects of this embodiment, a porous material disclosed herein includes tunnel and/or channel having a mean lumen or furrow diameter in a range from, e.g., about 300 µm to about 600 µm, about 200 µm to about 700 µm, about 100 µm to about 800 µm, about 500 µm to about 800 µm, about 50 µm to about 500 µm, about 75 µm to about 500 µm, about 100 µm to about 500 µm, about 200 µm to about 500 µm, about 300 µm to about 500 µm, about 50 µm to about 1000 µm, about 75 µm to about 1000 µm, about 100 µm to about 1000 µm, about 200 µm to about 1000 µm, about 300 µm to about 1000 µm, about 50 µm to about 1000 µm, about 75 µm to about 3000 µm, about 100 µm to about 3000 µm, about 200 µm to about 3000 µm, or about 300 µm to about 3000 µm.

In another embodiment, a porous material comprising a matrix defining an array of tunnels and channels includes tunnels and/or channels having a mean matrix strut thickness sufficient to enable the desired function of the porous material. In aspects of this embodiment, a porous material disclosed herein includes tunnels and/or channels having a mean matrix strut thickness of, e.g., about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, or about 200 µm. In other aspects of this embodiment, a porous material disclosed herein includes tunnels and/or channels having a mean matrix strut thickness of, e.g., at least 10 µm, at least 20 µm, at least 30 µm, at least 40 µm, at least 50 µm, at least 60 µm, at least 70 µm, at least 80 µm, at least 90 µm, at least 100 µm, at least 110 µm, at least 120 µm, at least 130 µm, at least 140 µm, at least 150 µm, at least 160 µm, at least 170 µm, at least 180 µm, at least 190 µm, or at least 200 µm. In yet other aspects of this embodiment, a porous material disclosed herein includes tunnels and/or channels having a mean matrix strut thickness of, e.g., at most 10 µm, at most 20 µm, at most 30 µm, at most 40 µm, at most 50 µm, at most 60 µm, at most 70 µm, at most 80 µm, at most 90 µm, at most 100 µm, at most 110 µm, at most 120 µm, at most 130 µm, at most 140 µm, at most 150 µm, at most 160 µm, at most 170 µm, at most 180 µm, at most 190 µm, or at most 200 µm. In still aspects of this embodiment, a porous material disclosed herein includes tunnels and/or channels having a mean matrix strut thickness of, e.g., about 50 µm to about 110 µm, about 50 µm to about 120 µm, about 50 µm to about 130 µm, about 50 µm to about 140 µm, about 50 µm to about 150 µm, about 60 µm to about 110 µm, about 60 µm to about 120 µm, about 60 µm to about 130 µm, about 60 µm to about 140 µm, about 70 µm to about 110 µm, about 70 µm to about 120 µm, about 70 µm to about 130 µm, or about 70 µm to about 140 µm.

In another embodiment, a porous material comprising a matrix defining an array of tunnels and channels includes tunnels and/or channels connected to a plurality of other tunnels and/or channels. In aspects of this embodiment, a porous material disclosed herein comprises a mean tunnel and/or channel connectivity, e.g., about two other tunnels and/or channels, about three other tunnels and/or channels, about four other tunnels and/or channels, about five other tunnels and/or channels, about six other tunnels and/or channels, about seven other tunnels and/or channels, about eight other tunnels and/or channels, about nine other tunnels and/or channels, about ten other tunnels and/or channels, about 11 other tunnels and/or channels, or about 12 other tunnels and/ or channels. In other aspects of this embodiment, a porous material disclosed herein comprises a mean tunnel and/or channel connectivity, e.g., at least two other tunnels and/or channels, at least three other tunnels and/or channels, at least four other tunnels and/or channels, at least five other tunnels and/or channels, at least six other tunnels and/or channels, at least seven other tunnels and/or channels, at least eight other tunnels and/or channels, at least nine other tunnels and/or channels, at least ten other tunnels and/or channels, at least 11 other tunnels and/or channels, or at least 12 other tunnels and/or channels. In yet other aspects of this embodiment, a porous material disclosed herein comprises a mean tunnel and/or channel connectivity, e.g., at most two other tunnels and/or channels, at most three other tunnels and/or channels, at most four other tunnels and/or channels, at most five other tunnels and/or channels, at most six other tunnels and/or channels, at most seven other tunnels and/or channels, at most eight other tunnels and/or channels, at most nine other tunnels and/or channels, at most ten other tunnels and/or channels, at most 11 other tunnels and/or channels, or at most 12 other tunnels and/or channels.

In still other aspects of this embodiment, a porous material comprising a matrix defining an array of tunnels and channels includes tunnels and/or channels connected to, e.g., about two other tunnels and/or channels to about 12 other tunnels and/or channels, about two other tunnels and/or channels to about 11 other tunnels and/or channels, about two other tunnels and/or channels to about ten other tunnels and/or channels, about two other tunnels and/or channels to about nine other tunnels and/or channels, about two other tunnels and/or channels to about eight other tunnels and/or channels, about two other tunnels and/or channels to about seven other tunnels and/or channels, about two other tunnels and/or channels to about six other tunnels and/or channels, about two other tunnels and/or channels to about five other tunnels and/or channels, about three other tunnels and/or channels to about 12 other tunnels and/or channels, about three other tunnels and/or channels to about 11 other tunnels and/or channels, about three other tunnels and/or channels to about ten other tunnels and/or channels, about three other tunnels and/or channels to about nine other tunnels and/or channels, about three other tunnels and/or channels to about eight other tunnels and/or channels, about three other tunnels and/or channels to about seven other tunnels and/or channels, about three other tunnels and/or channels to about six other tunnels and/or channels, about three other tunnels and/or channels to about five other tunnels and/or channels, about four other tunnels and/or channels to about 12 other tunnels and/or channels, about four other tunnels and/or channels to about 11 other tunnels and/or channels, about four other tunnels and/or channels to about ten other tunnels and/or channels, about four other tunnels and/or channels to about nine other tunnels and/or channels, about four other tunnels and/or channels to about eight other tunnels and/or channels, about four other tunnels and/or channels to about seven other tunnels and/or channels, about four other tunnels and/or channels to about six other tunnels and/or channels, about four other tunnels and/or channels to about five other tunnels and/or channels, about five other tunnels and/or channels to about 12 other tunnels and/or channels, about five other tunnels and/or channels to about 11 other tunnels and/or channels, about five other tunnels and/or channels to about ten other tunnels and/or channels, about five other tunnels and/or channels to about nine other tunnels and/or channels, about five other tunnels and/or channels to about eight other tunnels and/or channels, about five other tunnels and/or channels to about seven other tunnels and/or channels, or about five other tunnels and/or channels to about six other tunnels and/or channels.

In another embodiment, a porous material comprising a matrix defining an array of tunnels and channels includes tunnels and/or channels where the diameter of the connections between tunnel lumens and/or channel furrows is sufficient to enable the desired function of the porous material. In aspects of this embodiment, a porous material disclosed herein includes tunnels and/or channels where the diameter of the connections between tunnel lumens and/or channel furrows is, e.g., about 10% the mean lumen and/or furrow diameter, about 20% the mean lumen and/or furrow diameter, about 30% the mean lumen and/or furrow diameter, about 40% the mean lumen and/or furrow diameter, about 50% the mean lumen and/or furrow diameter, about 60% the mean lumen and/or furrow diameter, about 70% the mean lumen and/or furrow diameter, about 80% the mean lumen and/or furrow diameter, or about 90% the mean lumen and/or furrow diameter. In other aspects of this embodiment, a porous material disclosed herein includes tunnels and/or channels where the diameter of the connections between tunnel lumens and/or channel furrows is, e.g., at least 10% the mean lumen and/or furrow diameter, at least 20% the mean lumen and/or furrow diameter, at least 30% the mean lumen and/or furrow diameter, at least 40% the mean lumen and/or furrow diameter, at least 50% the mean lumen and/or furrow diameter, at least 60% the mean lumen and/or furrow diameter, at least 70% the mean lumen and/or furrow diameter, at least 80% the mean lumen and/or furrow diameter, or at least 90% the mean lumen and/or furrow diameter. In yet other aspects of this embodiment, a porous material disclosed herein includes tunnels and/or channels where the diameter of the connections between tunnel lumens and/or channel furrows is, e.g., at most 10% the mean lumen and/or furrow diameter, at most 20% the mean lumen and/or furrow diameter, at most 30% the mean lumen and/or furrow diameter, at most 40% the mean lumen and/or furrow diameter, at most 50% the mean lumen and/or furrow diameter, at most 60% the mean lumen and/or furrow diameter, at most 70% the mean lumen and/or furrow diameter, at most 80% the mean lumen and/or furrow diameter, or at most 90% the mean lumen and/or furrow diameter.

In still other aspects of this embodiment, a porous material comprising a matrix defining an array of tunnels and channels includes tunnels and/or channels where the diameter of the connections between tunnel lumens and/or channel furrows is, e.g., about 10% to about 90% the mean lumen and/or furrow diameter, about 15% to about 90% the mean lumen and/or furrow diameter, about 20% to about 90% the mean lumen and/or furrow diameter, about 25% to about 90% the mean lumen and/or furrow diameter, about 30% to about 90% the mean lumen and/or furrow diameter, about 35% to about 90% the mean lumen and/or furrow diameter, about 40% to about 90% the mean lumen and/or furrow diameter, about 10% to about 80% the mean lumen and/or furrow diameter, about 15% to about 80% the mean lumen and/or furrow diameter, about 20% to about 80% the mean lumen and/or furrow diameter, about 25% to about 80% the mean lumen and/or furrow diameter, about 30% to about 80% the mean lumen and/or furrow diameter, about 35% to about 80% the mean lumen and/or furrow diameter, about 40% to about 80% the mean lumen and/or furrow diameter, about 10% to about 70% the mean lumen and/or furrow diameter, about 15% to about 70% the mean lumen and/or furrow diameter, about 20% to about 70% the mean lumen and/or furrow diameter, about 25% to about 70% the mean lumen and/or furrow diameter, about 30% to about 70% the mean lumen and/or furrow diameter, about 35% to about 70% the mean lumen and/or furrow diameter, about 40% to about 70% the mean lumen and/or furrow diameter, about 10% to about 60% the mean lumen and/or furrow diameter, about 15% to about 60% the mean lumen and/or furrow diameter, about 20% to about 60% the mean lumen and/or furrow diameter, about 25% to about 60% the mean lumen and/or furrow diameter, about 30% to about 60% the mean lumen and/or furrow diameter, about 35% to about 60% the mean lumen and/or furrow diameter, about 40% to about 60% the mean lumen and/or furrow diameter, about 10% to about 50% the mean lumen and/or furrow diameter, about 15% to about 50% the mean lumen and/or furrow diameter, about 20% to about 50% the mean lumen and/or furrow diameter, about 25% to about 50% the mean lumen and/or furrow diameter, about 30% to about 50% the mean lumen and/or furrow diameter, about 10% to about 40% the mean lumen and/or furrow diameter, about 15% to about 40% the mean lumen and/or furrow diameter, about 20% to about 40% the mean lumen and/or furrow diameter, about 25% to about 40% the mean lumen and/or furrow diameter, or about 30% to about 40% the mean lumen and/or furrow diameter.

The present specification discloses, in part, a porous material comprising a matrix defining an array of interconnected tunnels and channels having a porosity sufficient to enable the desired function of the porous material. As used herein, the term "porosity" refers to the amount of void space in a porous material as disclosed herein. As such, the total volume of a porous material disclosed herein is based upon the matrix space and the void space.

Thus, in an embodiment, a porous material comprising a matrix defining an array of interconnected tunnels and channels has a porosity sufficient to enable the desired function of the porous material. In aspects of this embodiment, a porous material disclosed herein comprises a porosity of, e.g., about 40% of the total volume of a matrix, about 50% of the total volume of a matrix, about 60% of the total volume of a matrix, about 70% of the total volume of a matrix, about 80% of the total volume of a matrix, about 90% of the total volume of a matrix, about 95% of the total volume of a matrix, or about 97% of the total volume of a matrix. In other aspects of this embodiment, a porous material disclosed herein comprises a porosity of, e.g., at least 40% of the total volume of a matrix, at least 50% of the total volume of a matrix, at least 60% of the total volume of a matrix, at least 70% of the total volume of a matrix, at least 80% of the total volume of a matrix, at least 90% of the total volume of a matrix, at least 95% of the total volume of a matrix, or at least 97% of the total volume of a matrix. In yet other aspects of this embodiment, a porous material disclosed herein comprises a porosity of, e.g., at most 40% of the total volume of a matrix, at most 50% of the total volume of a matrix, at most 60% of the total volume of a matrix, at most 70% of the total volume of a matrix, at most 80% of the total volume of a matrix, at most 90% of the total volume of a matrix, at most 95% of the total volume of a matrix, or at most 97% of the total volume of a matrix. In yet other aspects of this embodiment, a porous material disclosed herein comprises a porosity of, e.g., about 40% to about 97% of the total volume of a matrix, about 50% to about 97% of the total volume of a matrix, about 60% to about 97% of the total volume of a matrix, about 70% to about 97% of the total volume of a matrix, about 80% to about 97% of the total volume of a matrix, about 90% to about 97% of the total volume of a matrix, about 40% to about 95% of the total volume of a matrix, about 50% to about 95% of the total volume of a matrix, about 60% to about 95% of the total volume of a matrix, about 70% to about 95% of the total volume of a matrix, about 80% to about 95% of the total volume of a matrix, about 90% to about 95% of the total volume of a matrix, about 40% to about 90% of the total volume of a matrix, about 50% to about 90% of the total volume of a matrix, about 60% to about 90% of the total volume of a matrix, about 70% to about 90% of the total volume of a matrix, or about 80% to about 90% of the total volume of a matrix.

The present specification discloses, in part, a porous material comprising a matrix defining an array of interconnected tunnels and channels having a mean open lumen or furrow value and/or a mean closed lumen or furrow value sufficient to enable the desired function of the porous material. As used herein, the term "mean open lumen or furrow value" or "mean open lumen or furrow" refers to the average number of lumen and/or furrow that are connected to at least one other lumen or furrow present in the matrix. As used herein, the term "mean closed lumen or furrow value" or "mean closed lumen or furrow" refers to the average number of lumens and/or furrows that are not connected to any other lumen or furrow present in the matrix. For example, in certain biomedical applications, the array of interconnected tunnels and channels should have a mean open lumen or furrow value and/or a mean closed lumen or furrow value sufficient to support aspects tissue growth into the array of interconnected tunnels and/or channels, thereby supporting aspects of tissue growth such as, e.g., cell migration, cell proliferation, cell differentiation, nutrient exchange, and/or waste removal. As another example, in filtration applications, the array of interconnected tunnels and channels should have a mean open lumen or furrow value and/or a mean closed lumen or furrow value sufficient to facilitate removal unwanted substances from the filtered material.

In aspects of this embodiment, a porous material comprising a matrix defining an array of interconnected tunnels and channels has a mean open lumen or furrow value of, e.g., about 70%, about 75%, about 80%, about 85%, about 90%, about 95%, or about 97%. In other aspects of this embodiment, a porous material disclosed herein has a mean open lumen or furrow value of, e.g., at least 70%, at least 75%, at least 80%, at least 85%, at least 90%, at least 95%, or at least 97%. In yet other aspects of this embodiment, a porous material disclosed herein has a mean open lumen or furrow value of, e.g., at most 70%, at most 75%, at most 80%, at most 85%, at most 90%, at most 95%, or at most 97%. In still aspects of this embodiment, a porous material disclosed herein has a mean open lumen or furrow value of, e.g., about 70% to about 90%, about 75% to about 90%, about 80% to about 90%, about 85% to about 90%, about 70% to about 95%, about 75% to about 95%, about 80% to about 95%, about 85% to about 95%, about 90% to about 95%, about 70% to about 97%, about 75% to about 97%, about 80% to about 97%, about 85% to about 97%, or about 90% to about 97%.

In aspects of this embodiment, a porous material comprising a matrix defining an array of interconnected tunnels and channels has a mean closed lumen or furrow value of, e.g., about 5%, about 10%, about 15%, or about 20%. In other aspects of this embodiment, a porous material disclosed herein has a mean closed lumen or furrow value of, e.g., about 5% or less, about 10% or less, about 15% or less, or about 20% or less. In yet other aspects of this embodiment, a porous material disclosed herein has a mean closed pore value of, e.g., about 5% to about 10%, about 5% to about 15%, or about 5% to about 20%.

The present specification discloses, in part, a porous material comprising a matrix defining an array of interconnected tunnels and channels having a void space sufficient to enable the desired function of the porous material. As used herein, the term "void space" refers to actual or physical space in a porous material comprising a matrix. As such, the total volume of a porous material comprising a matrix disclosed herein is based upon the matrix space and the void space. For example, in certain biomedical applications, the void space should be sufficient to support aspects tissue growth into the array of interconnected tunnels and channels, thereby supporting aspects of tissue growth such as, e.g., cell migration, cell proliferation, cell differentiation, nutrient exchange, and/or waste removal. As another example, in filtration applications, the void space should be sufficient to facilitate removal unwanted substances from the filtered material.

In aspects of this embodiment, a porous material comprising a matrix defining an array of interconnected tunnels and channels has a void space of, e.g., about 50% of the total volume of a matrix, about 60% of the total volume of a matrix, about 70% of the total volume of a matrix, about 80% of the total volume of a matrix, about 90% of the total volume of a matrix, about 95% of the total volume of a matrix, or about 97% of the total volume of a matrix. In other aspects of this embodiment, a porous material comprising a matrix defining an array of interconnected tunnels and channels has a void space of, e.g., at least 50% of the total volume of a matrix, at least 60% of the total volume of a matrix, at least 70% of the total volume of a matrix, at least 80% of the total volume of a matrix, at least 90% of the total volume of a matrix, at least 95% of the total volume of a matrix, or at least 97% of the total volume of a matrix. In yet other aspects of this embodiment, a porous material comprising a matrix defining an array of interconnected tunnels and channels has a void space of, e.g., at most 50% of the total volume of a matrix, at most 60% of the total volume of a matrix, at most 70% of the total volume of a matrix, at most 80% of the total volume of a matrix, at most 90% of the total volume of a matrix, at most 95% of the total volume of a matrix, or at most 97% of the total volume of a matrix. In yet other aspects of this embodiment, a porous material comprising a matrix defining an array of interconnected tunnels and channels has a void space of, e.g., about 50% to about 97% of the total volume of a matrix, about 60% to about 97% of the total volume of a matrix, about 70% to about 97% of the total volume of a matrix, about 80% to about 97% of the total volume of a matrix, about 90% to about 97% of the total volume of a matrix, about 50% to about 95% of the total volume of a matrix, about 60% to about 95% of the total volume of a matrix, about 70% to about 95% of the total volume of a matrix, about 80% to about 95% of the total volume of a matrix, about 90% to about 95% of the total volume of a matrix, about 50% to about 90% of the total volume of a matrix, about 60% to about 90% of the total volume of a matrix, about 70% to about 90% of the total volume of a matrix, or about 80% to about 90% of the total volume of a matrix.

A porous material comprising a matrix material may have a low level of microporosity. As used herein, the term "microporosity" refers to a measure of the presence of small micropores within a porous material comprising a matrix itself (as opposed to the tunnel lumens and channel furrows defined by a matrix). In some embodiments, all or substantially all of the micropores in a porous material comprising a matrix defining an array of interconnected tunnels and channels are between about 0.1 μm and about 5 μm, such as between about 0.1 μm and about 3 μm or between about 0.1 μm and about 2 μm. The term "low level of microporosity" means that micropores represent less than 2% of the volume of a porous material comprising a matrix, as measured by measuring the percentage void space in a cross-section through a matrix.

The disclosed porous materials are not only useful in all applications currently fulfilled by polyurethane-based materials, but also in many additional applications not suitable for polyurethane-based materials. Non-limiting examples of applications for the porous materials disclosed herein include cushion underlay for carpets; upholstery padding for furniture and vehicle interior components like seats, headrests, armrests, roof liners, dashboards, and instrument panels; material for pillows, mattress bedding, toppers, and cores; sponges; mid- and outsoles of footwear; vehicle fascia and other exterior parts; fabric coatings as synthetic fibers; packaging material; integral skin form for vehicle interiors; sound-deadening material; insulating material such as, e.g., panel or spray insulation in buildings, water heaters, refrigerated transport, and commercial and residential refrigeration; structural components; simulated wood; personal feminine hygiene products such as tampons and sanitary napkins, cleaning materials such as, e.g., wipes, swabs, and abrasives; and filtration materials for air and/or liquid filtration; filters for separating or cleaning material present in a chemically aggressive environment; and light weight armor material.

The present specification discloses, in part, a porous material comprising a matrix defining an array of interconnected tunnels and channels having a low thermal conductivity and/or high acoustic absorption. Such a porous material is useful in insulation materials such as, e.g., panel or spray insulation in buildings, water heaters, refrigerated transport, and commercial and residential refrigeration. Additionally, such a porous material may be insoluble or substantially insoluble in solvents, acids, and/or bases used during the application of the insulating material or exposed to once installed. An insulating material useful for thermal insulation will typically be made from a thermoplastic polymer, such as, e.g., polystyrene. The porous material may be made in sheet form typically from about 0.5 cm to about 10 cm in thickness with a porosity of about 70 to about 95% with interconnection diameter from approximately 1.0 μm to approximately 150 μm and a mean lumen and/or channel size of about 50 μm to about 800 μm.

The present specification discloses, in part, a porous material comprising a matrix defining an array of interconnected tunnels and channels useful in the manufacturing of cleaning materials, such as, e.g., wipes, swabs, and abrasives. Such porous cleaning materials are typically designed for particular applications by optimizing the affinity of the polymer and porosity of the matrix for the material to be cleaned. For instance, acidic aqueous solutions may be cleaned with a porous material comprising a lightly crosslinked polymer having basic functionalities on the backbone or pendants, such as lightly crosslinked chitosan or poly(ethyleneamine), which would swell in the acidic medium. Likewise basic aqueous spills can be best cleaned by a porous material comprising a lightly crosslinked poly(acrylic acid). In addition, amphiphilic aqueous spills can be best cleaned by a porous material comprising a lightly crosslinked poly(ethyleneglycol), which readily absorbs both water and some organic solvents such as, e.g., dioxane and dichloromethane. Lastly, hydrophobic spills can be cleaned using polymers that readily swell in and absorb hydrophobic materials, yet are not dissolved by them.

The present specification discloses, in part, a porous material comprising a matrix defining an array of interconnected tunnels and channels useful as filtration materials for air and/or liquid filtration. Such porous filtration materials have porosities for filters may vary from about 80% to approximately 99.9% and a mean lumen and/or channel size can vary from about 1 μm to about 2000 μm. The porous material must be predominantly open celled and with interconnection diameters varying from about 1 μm to about 1800 μm. Such porous filtration materials are typically designed for particular applications by optimizing the affinity of the polymer and porosity of the matrix for the material to be filtration. For example, hydrophilic filtration materials, such as, e.g., filtration materials comprising a matrix composed of fluoropolymer thermosets or poly(vinyl)-based thermoplastics, are readily wetted with aqueous solutions. Hydrophobic filters materials, such as, e.g., filtration materials comprising a matrix composed of cellulose-based thermoplastics or poly(vinyl)-based thermoplastics, are readily wet in low surface-tension liquids, such as organic solvents and silicone oil and are best suited for gas filtration and venting applications. In venting applications, air can pass through these filters without allowing the passage of water. Other filtration applications include the filtering of low surface tension and high surface tension solutions, as well as separation of low surface tension from high surface tension mediums.

The present specification discloses, in part, a porous material comprising a matrix defining an array of interconnected tunnels and channels useful as filtration materials in a chemically aggressive environment. Such porous filtration materials have porosities for filters may vary from about 80% to approximately 99.9% and a mean lumen and/or furrow size can vary from about 300 μm to about 5000 μm. The porous material must be predominantly open celled and with interconnection diameters varying from about 300 μm to about 5,000 μm. Such porous filtration materials are typically designed for particular applications by optimizing the affinity of the polymer and porosity of the matrix for the material to be filtration. For example, such filtration materials comprising a matrix composed of fluoropolymer thermosets.

The present specification discloses, in part, a porous material comprising a matrix defining an array of interconnected tunnels and channels having thermally stability. Such a porous material is useful in light weight armor materials like a component of a flak jacket, bullet-proof vest, or armor panels for a vehicle. A porous filtration material suitable as light weight armor material typically comprises low carbon content materials or other non-combustible materials, such as, e.g., silicone-based elastomers, fluorosilicone-based elastomers, and/or fluoropolymer thermosets. The addition of certain ceramic nanopowders can help retard the projectile or shrapnel with aid of high density high yield strength particulate.

The present specification discloses, in part, a porous material comprising a substantially non-degradable, biocompatible matrix defining an array of interconnected tunnels and channels. Such a porous material is useful in biomedical materials like a component of a medical device, scaffolds (templates) for tissue engineering/regeneration, wound dressings, drug release matrixes, membranes for separations and filtration, sterile filters, artificial kidneys, absorbents, hemostatic devices, where biocompatibility and resistance to biodegradation are important. For example, the disclosed porous material comprising a substantially non-degradable, biocompatible, matrix has high porosity and interconnected lumens and/or furrows that favor biomedical applications desiring tissue growth into the porous material, such as, e.g., by facilitating cell migration, cell proliferation, cell differentiation, nutrient exchange, and/or waste removal.

As another example, the disclosed porous material comprising a substantially non-degradable, biocompatible, matrix may be used to form other devices, or components of such devices, such as, e.g., pacemakers, artificial joint implants, implants for use in surgical reconstructive surgery, heart valves, coverings for implanted devices, insulation for implanted electrical elements such as pacemaker leads, graft points for implantable devices, etc. In addition, the substantially non-degradable, biocompatible porous materials disclosed herein may be used to create other devices for medical or non-medical purposes, such as, e.g., balloon catheters, tubing, ear plugs and hearing aids.

As used herein, the term "non-degradable" refers to a material that is not prone to degrading, decomposing, or breaking down to any substantial or significant degree while implanted in the host. Non-limiting examples of substantial non-degradation include less than 10% degradation of a porous material over a time period measured, less than 5% degradation of a porous material over a time period measured, less than 3% degradation of a porous material over a time period measured, less than 1% degradation of a porous material over a time period measured. As used herein, the term "biocompatible" refers to a material's ability to perform its intended function, with a desired degree of incorporation in the host, without eliciting any undesirable local or systemic effects in that host.

In an embodiment, a porous material comprising a matrix defining an array of interconnected tunnels and channels may, or may not be, substantially non-degradable. In aspects of this embodiment, a porous material disclosed herein is substantially non-degradable for, e.g., about five years, about ten years, about 15 years, about 20 years, about 25 years, about 30 years, about 35 years, about 40 years, about 45 years, or about 50 years. In other aspects of this embodiment, a porous material disclosed herein is substantially non-degradable for, e.g., at least five years, at least ten years, at least 15 years, at least 20 years, at least 25 years, at least 30 years, at least 35 years, at least 40 years, at least 45 years, or at least 50 years. In yet other aspects of this embodiment, a porous material disclosed herein exhibits less than 5% degradation, less than 3% degradation, or less than 1% degradation over for, e.g., about five years, about ten years, about 15 years, about 20 years, about 25 years, about 30 years, about 35 years, about 40 years, about 45 years, or about 50 years. In still other aspects of this embodiment, a porous material disclosed herein exhibits less than 5% degradation, less than 3% degradation, or less than 1% degradation over for, e.g., at least five years, at least ten years, at least 15 years, at least 20 years, at least 25 years, at least 30 years, at least 35 years, at least 40 years, at least 45 years, or at least 50 years.

In another embodiment, a porous material comprising a matrix defining an array of interconnected tunnels and channels may, or may not be, substantially biocompatible. In aspects of this embodiment, a porous material disclosed herein is substantially biocompatible for, e.g., at least five years, at least ten years, at least 15 years, at least 20 years, at least 25 years, at least 30 years, at least 35 years, at least 40 years, at least 45 years, or at least 50 years.

The present specification discloses in part, methods of making a porous material disclosed herein. The porous materials disclosed herein can be formed as a separate component or can be integrated into a base material.

In one aspect of the invention, an article of manufacture is provided, which generally comprises an elastomeric porous material made by the methods disclosed herein. The article may be any porous material, for example, but not limited to, a silicone elastomer, that can be made in accordance with the present methods. For example, the porous materials of the invention can be used as insulating materials, packaging materials, impact absorbers, liquid or gas absorbents, wound dressings, personal hygiene products, such as but not limited to, cleaning and cleansing pads, wipes and swabs, deodorant, disposable towels, dry shampoo, facial tissues, handkerchiefs, hygiene wipes, paper towels, shaving brushes, tampons, towels, underarm liners, washing mitts, and wet wipes, membranes, filters and so forth. In particularly useful embodiments of the invention, the article comprises a silicone-based elastomeric porous material, which forms at least a component of a personal hygiene product.

In one aspect, a method of making a porous material comprises the steps of: a) adding a matrix material base to a mold; b) pressing a plurality of polymer fibers at least partially into the matrix material base; c) treating the matrix material-coated polymer fiber mixture to cure or harden the matrix material base; and d) removing the polymer fibers, wherein polymer fiber removal results in a porous material, the porous material comprising a matrix defining an array of interconnected tunnels and channels as disclosed herein. Method steps (a) through (c) may be repeated a plurality of times until the desired thickness of the material layer is achieved.

In another aspect, a method of making a porous material comprises the steps of: a) coating a mandrel with a matrix material base; b) pressing a plurality of polymer fibers at least partially into the matrix material base; c) treating the matrix material-coated polymer fibers mixture to cure or harden the matrix material base; and d) removing the polymer fibers, wherein polymer fiber removal results in a porous material, the porous material comprising a matrix defining an array of interconnected tunnels and channels as disclosed herein. Method steps (a) through (c) may be repeated a plurality of times until the desired thickness of the material layer is achieved.

As used herein, the term "matrix material base" is synonymous with "matrix base", "material base", "uncured matrix material", "uncured matrix" and "uncured material" and refers to a material disclosed herein, such as, e.g., a thermoset polymer, an elastomer, or a thermoplastic elastomer, that is in its uncured state; or a material disclosed herein, such as, e.g., a thermoplastic polymer, that is in its fluid or soft state.

The present specification discloses, in part, adding a matrix material base to a mold. Any mold shape may be used to contain a matrix material base. As a non-limiting example, a mold shape can be a shell that outlines the contours an implantable device, such as, e.g., a shell for a breast implant, or a shell for a muscle implant. As another non-limiting example, the mold shape can be one that forms sheets. Such sheets can be made in a wide variety or proportions based on the needed application. For example, the sheets can be made in a size slightly bigger that an implantable medical device so that there is sufficient material to cover the device and allow for trimming of the excess. As another example, the sheets can be produced as a continuous roll that allows a person skilled in the art to take only the desired amount for an application, such as, e.g., creating strips having a textured surface for control of scar formation. As yet another non-limiting example, a mold shape can be a three-dimensional form that represents the final shape of the porous material, such as, e.g., a filter, an insulating material, a light weight armor panel. The matrix material base is added into a mold using ultrasonic agitation, mechanical agitation, or any other suitable method for obtaining a mold appropriately filled with matrix material base will minimizing air bubbles or other gaseous chambers.

The present specification discloses, in part, coating a mandrel with a matrix material base. Suitable matrix material bases are as described above. As used herein, the term "mandrel" refers to a shaped object that will form the internal shape of a dip molded part. Coating a mandrel with a matrix material base can be accomplished by any suitable technique, including, without limitation, mechanical application such as, e.g., dipping, spraying, knifing, curtaining, brushing, or vapor deposition, thermal application, adhering application, chemical bonding, self-assembling, molecular entrapment, and/or any combination thereof. The matrix material base is applied to a mandrel in such a manner as to coat the mandrel with the desired thickness of the matrix material. Removal of excess matrix material can be accomplished by any suitable technique, including, without limitation, gravity-based filtering or sieving, vacuum-based filtering or sieving, blowing, and/or any combination thereof.

Thus, in an embodiment, a mandrel is coated with a matrix material base to a thickness sufficient to serve as a base layer. In aspects of this embodiment, a mandrel is coated with a matrix material base to a thickness of, e.g., about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, or about 100 µm. In other aspects of this embodiment, a mandrel is coated with a matrix material base to a thickness of, e.g., at least 1 µm, at least 2 µm, at least 3 µm, at least 4 µm, at least 5 µm, at least 6 µm, at least 7 µm, at least 8 µm, at least 9 µm, at least 10 µm, at least 20 µm, at least 30 µm, at least 40 µm, at least 50 µm, at least 60 µm, at least 70 µm, a mandrel is porogens are coated with a matrix material base to a thickness of, e.g., at most 1 µm, at most 2 µm, at most 3 µm, at most 4 µm, at most 5 µm, at most 6 µm, at most 7 µm, at most 8 µm, at most 9 µm, at most 10 µm, at most 20 µm, at most 30 µm, at most 40 µm, at most 50 µm, at most 60 µm, at most 70 µm, at most 80 µm, at most 90 µm, or at most 100 µm. In still other aspects of this embodiment, a mandrel is coated with a matrix material base to a thickness of, e.g., about 1 µm to about 5 µm, about 1 µm to about 10 µm, about 5 µm to about 10 µm, about 5 µm to about 25 µm, about 5 µm to about 50 µm, about 10 µm to about 50 µm, about 10 µm to about 75 µm, about 10 µm to about 100 µm, about 25 µm to about 100 µm, or about 50 µm to about 100 µm.

The present specification discloses, in part, pressing a plurality of polymer fibers at least partially into the matrix material base. Polymer fibers serve as a negative template of the interconnected array of tunnels and channels subsequently formed after polymer fiber removal. As used herein, the term "polymer fiber" or "fiber" refers to either a single strand or filament of a polymer, or to multiple strands or filaments that are braided, coiled, twisted, or otherwise formed into an elongated structure. Polymer fibers may be employed individually in an organized pattern or random manner, or such fibers may be employed as an assemblage of polymer fibers where the fibers are organized pattern or random manner. The assemblage of polymer fibers may be formed in any reasonable manner including processes that leave the polymer fibers unattached to one another and processes that attach or secure polymer fibers to one another. Attachment of polymer fibers to one another can be accomplished by any suitable technique including, e.g., pressure, heat, gluing, or stitching. For example, one or more polymer fibers may be twisted, weaved, or knitted together using traditional methods to form a loosely or tightly woven material with attached or unattached fibers, such as, e.g., a mesh, cloth, or other woven structure. In other example, attached or unattached polymer fibers may be bundled and pressed together using traditional methods to form a felt or mat. As yet another example, an assemblage of attached or unattached polymer fibers may be randomly formed into a tangle or other randomly organized fiber assemblage. Any other combination of fibers may also be used, whether having an intentional structure, or a structure randomly formed. In addition, employment of polymer fibers need not be formed into an assemblage before use; such an assemblage may be formed while polymer fibers are being pressed into the matrix material base, or after such pressing has occurred.

Polymer fibers can be of any shape and thickness with the proviso that the shape and thickness of the polymer fibers is sufficient to enable the desired function of the porous material. The selection of polymer fiber shape and thickness may be determined based upon the desired application. Useful polymer fiber shape include, without limitation, roughly cylindrical, perfectly cylindrical, roughly rectangular, and perfectly rectangular. For example, in certain biomedical applications, polymer fiber shape should be in a form sufficient to create tunnels and channels that can support aspects tissue growth into the array of interconnected tunnels and/or channels, thereby supporting aspects of tissue growth such as, e.g., cell migration, cell proliferation, cell differentiation, nutrient exchange, and/or waste removal. As another example, in filtration applications, polymer fiber shape should be in a form sufficient to create tunnels and channels that can facilitates removal unwanted substances from the filtered material.

In another embodiment, a polymer fiber can have a mean diameter sufficient to create tunnel lumens and/or channel furrows sufficient to enable the desired function of the porous material. In aspects of this embodiment, a polymer fiber has a mean diameter of, e.g., about 50 µm, about 75 µm, about 100 µm, about 150 µm, about 200 µm, about 250 µm, about 300 µm, about 350 µm, about 400 µm, about 450 µm, or about 500 µm. In other aspects, a polymer fiber has a mean diameter of, e.g., about 500 µm, about 600 µm, about 700 µm, about 800 µm, about 900 µm, about 1000 µm, about 1500 µm, about 2000 µm, about 2500 µm, or about 3000 µm. In yet other aspects of this embodiment, a polymer fiber has a mean diameter of, e.g., at least 50 µm, at least 75 µm, at least 100 µm, at least 150 µm, at least 200 µm, at least 250 µm, at least 300 µm, at least 350 µm, at least 400 µm, at least 450 µm, or at least 500 µm. In still other aspects, a polymer fiber has a mean diameter of, e.g., at least 500 µm, at least 600 µm, at least 700 µm, at least 800 µm, at least 900 µm, at least 1000 µm, at least 1500 µm, at least 2000 µm, at least 2500 µm, or at least 3000 µm. In further aspects of this embodiment, a polymer fiber has a mean diameter of, e.g., at most 50 µm, at most 75 µm, at most 100 µm, at most 150 µm, at most 200 µm, at most 250 µm, at most 300 µm, at most 350 µm, at most 400 µm, at most 450 µm, or at most 500 µm. In yet further aspects of this embodiment, a polymer fiber has a mean diameter of, e.g., at most 500 µm, at most 600 µm, at most 700 µm, at most 800 µm, at most 900 µm, at most 1000 µm, at most 1500 µm, at most 2000 µm, at most 2500 µm, or at most 3000 µm. In still further aspects of this embodiment, a polymer fiber has a mean diameter in a range from, e.g., about 300 µm to about 600 µm, about 200 µm to about 700 µm, about 100 µm to about 800 µm, about 500 µm to about 800 µm, about 50 µm to about 500 µm, about 75 µm to about 500 µm, about 100 µm to about 500 µm, about 200 µm to about 500 µm, about 300 µm to about 500 µm, about 50 µm to about 1000 µm, about 75 µm to about 1000 µm, about 100 µm to about 1000 µm, about 200 µm to about 1000 µm, about 300 µm to about 1000 µm, about 50 µm to about 1000 µm, about 75 µm to about 3000 µm, about 100 µm to about 3000 µm, about 200 µm to about 3000 µm, or about 300 µm to about 3000 µm.

Fiber assemblages result in the formation of a plurality of spaces or "eyes." The shape and area of the plurality of eyes contribute to the space eventually occupied by the matrix material and, as such, has a direct bearing of the mechanical properties of the resulting porous material. Eyes can be of any shape and area with the proviso that the eye shape and area is sufficient to enable the desired function of the porous material. The selection of eye shape and area may be determined based upon the desired application of the porous material. Of course, the eyes may have any reasonable shape, and the values suggested represent areas rather than dimensions of the boundaries of the eyes. It is also noted that not all of the eyes need to have the same shape and/or area. Rather, the pattern of fiber assembles may form eyes of differing shapes and areas. When multiple layers of fiber assemblages are placed on top of one another the eyes form a three dimensional space that can be described in terms of volume that ultimately represent the matrix of the porous material.

In an embodiment, an eye from a fiber assemblage can have a mean diameter sufficient to create matrix struts and other components sufficient to enable the desired function of the porous material. In aspects of this embodiment, a fiber assemblage comprising eyes has a mean eye area, e.g., about 50 $\mu m^2$, about 75 $\mu m^2$, about 100 $\mu m^2$, about 150 $\mu m^2$, about 200 $\mu m^2$, about 250 $\mu m^2$, about 300 $\mu m^2$, about 350 $\mu m^2$, about 400 $\mu m^2$, about 450 $\mu m^2$, about 500 $\mu m^2$, about 600 $\mu m^2$, about 700 $\mu m^2$, about 800 $\mu m^2$, about 900 $\mu m^2$, about 1,000 $\mu m^2$, about 1,100 $\mu m^2$, about 1,200 $\mu m^2$, about 1,300 $\mu m^2$, about 1,4000 $\mu m^2$, about 1,500 $\mu m^2$, about 1,600 $\mu m^2$, about 1,700 $\mu m^2$, about 1,800 $\mu m^2$, about 1,9000 $\mu m^2$, or about 2,000 $\mu m^2$. In other aspects of this embodiment, a fiber assemblage comprising eyes has a mean eye area, e.g., at least 50 $\mu m^2$, at least 75 $\mu m^2$, at least 100 $\mu m^2$, at least 150 $\mu m^2$, at least 200 $\mu m^2$, at least 250 $\mu m^2$, at least 300 $\mu m^2$, at least 350 $\mu m^2$, at least 400 $\mu m^2$, at least 450 $\mu m^2$, at least 500 $\mu m^2$, at least 600 $\mu m^2$, at least 700 $\mu m^2$, at least 800 $\mu m^2$, at least 900 $\mu m^2$, at least 1,000 $\mu m^2$, at least 1,100 $\mu m^2$, at least 1,200 $\mu m^2$, at least 1,300 $\mu m^2$, at least 1,4000 $\mu m^2$, at least 1,500 $\mu m^2$, at least 1,600 $\mu m^2$, at least 1,700 $\mu m^2$, at least 1,800 $\mu m^2$, at least 1,9000 $\mu m^2$, or at least 2,000 $\mu m^2$. In yet other aspects of this embodiment, a fiber assemblage comprising eyes has a mean eye area of, e.g., at most 50 $\mu m^2$, at most 75 $\mu m^2$, at most 100 $\mu m^2$, at most 150 $\mu m^2$, at most 200 $\mu m^2$, at most 250 $\mu m^2$, at most 300 $\mu m^2$, at most 350 $\mu m^2$, at most 400 $\mu m^2$, at most 450 $\mu m^2$, at most 500 $\mu m^2$, at most 600 $\mu m^2$, at most 700 $\mu m^2$, at most 800 $\mu m^2$, at most 900 $\mu m^2$, at most 1,000 $\mu m^2$, at most 1,100 $\mu m^2$, at most 1,200 $\mu m^2$, at most 1,300 $\mu m^2$, at most 1,4000 $\mu m^2$, at most 1,500 $\mu m^2$, at most 1,600 $\mu m^2$, at most 1,700 $\mu m^2$, at most 1,800 $\mu m^2$, at most 1,9000 $\mu m^2$, or at most 2,000 $\mu m^2$. In still further aspects of this embodiment, a fiber assemblage comprising eyes has a mean eye area in a range from, e.g., about 300 $\mu m^2$ to about 600 $\mu m^2$, about 200 $\mu m^2$ to about 700 $\mu m^2$, about 100 $\mu m^2$ to about 800 $\mu m^2$, about 500 $\mu m^2$ to about 800 $\mu m^2$, about 50 $\mu m^2$ to about 500 $\mu m^2$, about 75 $\mu m^2$ to about 500 $\mu m^2$, about 100 $\mu m^2$ to about 500 $\mu m^2$, about 200 $\mu m^2$ to about 500 $\mu m^2$, about 300 $\mu m^2$ to about 500 $\mu m^2$, about 50 $\mu m^2$ to about 1000 $\mu m^2$, about 75 $\mu m^2$ to about 1000 $\mu m^2$, about 100 $\mu m^2$ to about 1000 $\mu m^2$, about 200 $\mu m^2$ to about 1000 $\mu m^2$, about 300 $\mu m^2$ to about 1000 $\mu m^2$, about 50 $\mu m^2$ to about 1000 $\mu m^2$, about 75 $\mu m^2$ to about 3000 $\mu m^2$, about 100 $\mu m^2$ to about 3000 $\mu m^2$, about 200 $\mu m^2$ to about 3000 $\mu m^2$, or about 300 $\mu m^2$ to about 3000 $\mu m^2$.

In one embodiment, only a single assemblage of polymer fibers is pressed into the matrix material base. In another embodiment, a plurality assemblage of polymer fibers are stacked together and pressed into the matrix material base. Multiple fiber assemblages may have the same characteristics as each other, or different fiber assemblages may have different characteristics. For example, a fiber assemblage comprising a woven mesh may be layer atop a fiber assemblage comprising a felt. In addition, the fiber assemblages may be applied in an overlapping or a non-overlapping manner. Where the fiber assemblages are applied in an overlapping manner, the fiber assemblages may be pressed into the matrix material base independently such that at least some of the fiber assemblages used partially overlap along an edge of other fiber assemblages (although the assemblages need not overlap at all). In such examples, the fiber assemblages may remain entirely distinct throughout the pressing process. In other examples, however, the overlapping sections of fiber assemblages may be joined together by applying, e.g., pressure, heat, an adhesive, or stitching.

In aspects of this embodiment, a fiber assemblage may be formed from, e.g., at least two fiber assemblage layers, at least three fiber assemblage layers, at least four fiber assemblage layers, at least five fiber assemblage layers, at least six fiber assemblage layers, at least seven fiber assemblage layers, at least eight fiber assemblage layers, at least nine fiber assemblage layers, or at least ten fiber assemblage layers. In other aspects of this embodiment, a fiber assemblage may be formed from, e.g., about two fiber assemblage layers to about five fiber assemblage layers, about four fiber assemblage layers to about seven fiber assemblage layers, about six fiber assemblage layers to about ten fiber assemblage layers, about nine fiber assemblage layers to about thirteen fiber assemblage layers, about twelve fiber assemblage layers to about fifteen fiber assemblage layers, about fourteen fiber assemblage layers to about nineteen fiber assemblage layers, or about twenty fiber assemblage layers to about twenty-five fiber assemblage layers.

Because the material matrix base is uncured, partially cured, soft, or is otherwise in a fluid or semi-fluid state, pressing the polymer fibers allows the fibers penetrate into the material matrix base. Pressing of the polymer fibers may be accomplished by any suitable technique that results in submersion of at least a portion of the polymer fibers, including, without limitation, passive or gravity-based pressing or active or external pressing, such as, e.g., physical pressure or force by an object or physical pressure or force by a gas. In order to form a porous material comprising surface channels, at least a portion of the polymer fibers are not submerged in the material matrix base. Rather, pressing of the polymer fibers is done in such a manner to ensure that at least a portion of the polymer fibers remain unsubmerged. By discontinuing the applied pressure before the polymer fibers settled entirely into the matrix material base, the process ensure that the final surface is textured with channels that are interconnected with tunnels and other channels. However, polymer fibers may be pressed entirely into the matrix material base. In such situations, the process of creating a texture may include removing a portion of the surface area of the matrix material after it has been treated in order to expose the submerged passageways created by the polymer fibers, thereby creating channels.

Polymer fibers may be constructed of any material with suitable mechanical strength and flexibility. In some example embodiments, the polymer employed may need to be relatively insoluble in either xylene or toluene, but may be soluble in other organic solvents such as methylene chloride and chloroform. Such biodegradable materials that can be used to form polymer fibers include, without limitation, poly(L-lactic acid-co-trimethylcarbonate), polycaprolactone, poly(methyl methacrylate), poly(L-lactic acid), poly(lactic-co-glycolic acid), poly(ethylene-vinyl acetate), poly(hydroxybutyrate-co-valerate), polydioxanone, polyorthoester, polyanhydride, poly(glycolic acid), poly(D, L-lactic acid), poly(glycolic acid-co-trimethylene carbonate), polyphosphoester, polyphosphoester urethane, poly (amino acids), cyanoacrylates, poly(trimethylene carbonate), poly(iminocarbonate), copoly(ether-esters) (e.g. PEO/PLA), polyalkylene oxalates, polyphosphazenes and biomolecules such as fibrin, fibrinogen, cellulose, starch, collagen and hyaluronic acid or combinations thereof.

The present specification discloses, in part, devolitalizing a matrix material base or matrix material-coated polymer fiber mixture. As used herein, the term "devolitalizing" or "devolitalization" refers to a process that removes volatile components from the matrix material base. Devolitalization of the matrix material base can be accomplished by any suitable means that removes substantially all the volatile components from the matrix material base. Non-limiting examples of devolitalizing procedures include evaporation, freeze-drying, sublimation, extraction, and/or any combination thereof.

In an embodiment, a matrix material base or matrix material-coated polymer fiber mixture is devolitalized at a single temperature for a time sufficient to allow the evaporation of substantially all volatile components from the matrix material base. In an aspect of this embodiment, a matrix material base or matrix material-coated polymer fiber mixture is devolitalized at ambient temperature for about 1 minute to about 5 minutes. In another aspect of this embodiment, a matrix material base or matrix material-coated polymer fiber mixture is devolitalized at ambient temperature for about 45 minutes to about 75 minutes. In yet another aspect of this embodiment, a matrix material base or matrix material-coated polymer fiber mixture is devolitalized at ambient temperature for about 90 minutes to about 150 minutes. In another aspect of this embodiment, a matrix material base or matrix material-coated polymer fiber mixture is devolitalized at about 18° C. to about 22° C. for about 1 minute to about 5 minutes. In yet another aspect of this embodiment, a matrix material base or matrix material-coated polymer fiber mixture is devolitalized at about 18° C. to about 22° C. for about 45 minutes to about 75 minutes. In still another aspect of this embodiment, a matrix material base or matrix material-coated polymer fiber mixture is devolitalized at about 18° C. to about 22° C. for about 90 minutes to about 150 minutes.

The present specification discloses, in part, treating the matrix material-coated polymer fiber mixture to cure or harden the matrix material base. As used herein, the term "treating" refers to a process that cures the matrix material base (e.g., a thermoset, an elastomer, a thermoplastic elastomer) to form a matrix as disclosed herein; or hardens the matrix material base (e.g., a thermoplastic) to form a matrix as disclosed herein. As used herein, the term "curing" is synonymous with "setting" or "vulcanizing" and refers to an irreversible process that exposes the chains of a polymer to a element which activates a phase change in the polymer to a more stable state, such as, e.g., by physically or chemically cross-linked polymer chains to one another. As used herein, the term "hardening" refers to a reversible process where the matrix material transitions from a fluid state to a solid state, as typified for a thermoplastic. Non-limiting examples of treating include thermal treating, chemical treating, catalyst treating, radiation treating, and physical treating. Treating the matrix material-coated polymer fiber mixture can be done under any condition for any length of time with the proviso that the treating cures or hardens the matrix material.

Because the polymer fibers are embedded in the matrix material during the treating process, upon curing or hardening, the matrix material accommodates the shape of the embedded polymer fibers. The matrix material may be treated until the matrix material is cured or hardened into its final form. Alternatively, the matrix material may be treated in a manner that results in a partially cured or partially hardened state. A partially cured or partially hardened matrix material may then repeat earlier steps in the process such as, e.g., applying of a matrix material base, pressing of polymer fibers, a treating the matrix material-coated polymer fibers before continuing the remainder of the method. Alternatively, a partially cured or partially hardened matrix material may directly proceed with the remainder of the method, without repeating any of the earlier steps.

In an aspect of this embodiment, matrix material-coated polymer fiber mixture is treated at a single time, where the time is sufficient to cure or harden the matrix material. In another aspect of this embodiment, matrix material-coated polymer fiber mixture is treated at a plurality of times, where the total time is sufficient to cure or harden the matrix material.

Thermal treating a matrix material-coated polymer fiber mixture to cure or harden the matrix material base can be at any temperature or temperatures for any length of time or times with the proviso that the thermal treatment cures or hardens the matrix material base As a non-limiting example, the thermal treatment can be from about 30° C. to about 250° C. Any time can be used in a thermal treatment with the proviso that the time is sufficient to cure or harden the matrix material base. Suitable times are generally from about 0.5 hours to about 48 hours. In general any temperature and time regime is suitable as long as a porous material as disclosed herein useful for its intended purpose is formed. As such, a temperature and time regime that destroys the polymer fibers in a manner resulting in improper formation of tunnels and channels that creates a porous material ineffective for its intended use would not be used.

In an aspect of this embodiment, matrix material-coated polymer fiber mixture is thermal treated at a single temperature for a single time, where the treating temperature and time is sufficient to cure or harden the matrix material base.

In another aspect of this embodiment, the thermal treatment comprises heating a matrix material-coated polymer fiber mixture to about 30° C. to about 130° C. for about 10 minutes to about 360 minutes, where the treating temperature and time is sufficient to cure or harden the matrix material base.

In yet another embodiment, a matrix material-coated polymer fiber mixture is thermal treated at a plurality of temperatures for a plurality of times, where the treating temperatures and times are sufficient to cure or harden the matrix material base. In an aspect of this embodiment, a matrix material-coated polymer fiber mixture is treated at a first temperature for a first time, and then a second temperature for a second time, where the treating temperatures and times are sufficient to cure or harden the matrix material base, and where the first and second temperatures are different.

In aspects of this embodiment, thermal treatment comprises heating a matrix material-coated polymer fiber mixture at a first temperature for a first time, and then heating the mixture at a second temperature for a second time, where the treating temperatures and times are sufficient to cure or harden the matrix material base, and where the first and second temperatures are different.

In other aspects of this embodiment, thermal treatment comprises heating a matrix material-coated polymer fiber mixture at a first temperature for a first time, heating the porogens at a second temperature for a second time, and then heating the porogens at a third temperature at a third time, where the treating temperatures and times are sufficient to cure or harden the matrix material base, and where the first temperature is different from the second temperature and the second temperature is different from the third temperature.

In still other aspect of this embodiment, a matrix material-coated polymer fiber mixture is treated at about 60° C. to about 75° C. for about 15 minutes to about 45 minutes, and then at about 120° C. to about 130° C. for about 60 minutes to about 90 minutes, where the treating temperatures and times is sufficient to cure or harden the matrix material base. In a further aspect of this embodiment, a matrix material-coated polymer fiber mixture is treated at about 60° to about 75° C. for about 15 minutes to about 45 minutes, then at about 135° C. to about 150° C. for about 90 minutes to about 150 minutes, and then at about 150° C. to about 165° C. for about 15 minutes to about 45 minutes.

The present specification discloses, in part, removing the polymer fibers. Polymer fiber removal results in porous material comprising a matrix defining an array of interconnected tunnels and channels is as described herein. Removal of polymer fibers can be accomplished by any suitable technique, with the proviso that the resulting porous material is not damage in such a way that it is useless for its intended purpose. The selection of a particular removal technique may depend on the choice of polymer fibers used. Non-limiting examples of polymer fiber removal include solvent extraction, thermal decomposition extraction, degradation extraction, mechanical extraction, and/or any combination thereof.

In solvent decomposition extraction, the solvent used in one where the polymer fibers is soluble or substantially soluble, while the matrix material is insoluble or substantially insoluble In extraction methods requiring exposure to another solution, such as, e.g., solvent extraction, the extraction can incorporate a plurality of solution changes over time to facilitate removal of the polymer fibers. Non-limiting examples of solvents useful for solvent extraction include water, methylene chloride, acetic acid, formic acid, pyridine, tetrahydrofuran, dimethylsulfoxide, dioxane, benzene, and/or mixtures thereof. A mixed solvent can be in a ratio of higher than about 1:1, first solvent to second solvent or lower than about 1:1, first solvent to second solvent. In degradation extraction, photosensitive polymer fibers may be used which undergo a change in the presence of light, or a particular wavelength of light, causing fiber degradation. Polymer fibers which degrade through other processes may also be used.

In thermal decomposition extraction, the temperature applied is one above a melting or sublimation point of the polymer fibers, but below a melting or sublimation point of the cured or harden matrix material, or a temperature that does not otherwise damage the matrix material. In physical extraction, a retracting force is applied is a manner that physically removes the polymer fibers from the matrix material.

In an embodiment, polymer fibers are removed by extraction, where the extraction removes substantially all the polymer fibers leaving a matrix defining an array of interconnected tunnels and channels as disclosed herein. In aspects of this embodiment, polymer fibers are removed by extraction, where the extraction removes, e.g., about 75% of the polymer fibers, about 80% of the polymer fibers, about 85% of the polymer fibers, about 90% of the polymer fibers, or about 95% of the polymer fibers. In other aspects of this embodiment, polymer fibers are removed by extraction, where the extraction removes, e.g., at least 75% of the polymer fibers, at least 80% of the polymer fibers, at least 85% of the polymer fibers, at least 90% of the polymer fibers, or at least 95% of the polymer fibers. In aspects of this embodiment, polymer fibers are removed by extraction, where the extraction removes, e.g., about 75% to about 90% of the polymer fibers, about 75% to about 95% of the polymer fibers, about 75% to about 100% of the polymer fibers, about 80% to about 90% of the polymer fibers, about 80% to about 95% of the polymer fibers, about 80% to about 100% of the polymer fibers, about 85% to about 90% of the polymer fibers, about 85% to about 95% of the polymer fibers, or about 85% to about 100% of the polymer fibers. In an aspect, polymer fibers are removed by a solvent extraction, a thermal decomposition extraction, a degradation extraction, a mechanical extraction, and/or any combination thereof.

In another embodiment, polymer fibers are removed by solvent extraction, where the extraction removes substantially all the polymer fibers leaving a matrix defining an array of interconnected tunnels and channels. In aspects of this embodiment, polymer fibers are removed by solvent extraction, where the extraction removes, e.g., about 75% of the polymer fibers, about 80% of the polymer fibers, about 85% of the polymer fibers, about 90% of the polymer fibers, or about 95% of the polymer fibers. In other aspects of this embodiment, polymer fibers are removed by solvent extraction, where the extraction removes, e.g., at least 75% of the polymer fibers, at least 80% of the polymer fibers, at least 85% of the polymer fibers, at least 90% of the polymer fibers, or at least 95% of the polymer fibers. In aspects of this embodiment, polymer fibers are removed by solvent extraction, where the extraction removes, e.g., about 75% to about 90% of the polymer fibers, about 75% to about 95% of the polymer fibers, about 75% to about 100% of the polymer fibers, about 80% to about 90% of the polymer fibers, about 80% to about 95% of the polymer fibers, about 80% to about 100% of the polymer fibers, about 85% to about 90% of the polymer fibers, about 85% to about 95% of the polymer fibers, or about 85% to about 100% of the polymer fibers.

In yet another embodiment, polymer fibers are removed by thermal decomposition extraction, where the extraction removes substantially all the polymer fibers leaving a matrix defining an array of interconnected tunnels and/or channels. In aspects of this embodiment, polymer fibers are removed by thermal extraction, where the extraction removes, e.g., about 75% of the polymer fibers, about 80% of the polymer fibers, about 85% of the polymer fibers, about 90% of the polymer fibers, or about 95% of the polymer fibers. In other aspects of this embodiment, polymer fibers are removed by thermal extraction, where the extraction removes, e.g., at least 75% of the polymer fibers, at least 80% of the polymer fibers, at least 85% of the polymer fibers, at least 90% of the polymer fibers, or at least 95% of the polymer fibers. In aspects of this embodiment, polymer fibers are removed by thermal extraction, where the extraction removes, e.g., about 75% to about 90% of the polymer fibers, about 75% to about 95% of the polymer fibers, about 75% to about 100% of the polymer fibers, about 80% to about 90% of the polymer fibers, about 80% to about 95% of the polymer fibers, about 80% to about 100% of the polymer fibers, about 85% to about 90% of the polymer fibers, about 85% to about 95% of the polymer fibers, or about 85% to about 100% of the polymer fibers.

In still another embodiment, polymer fibers are removed by degradation extraction, where the extraction removes substantially all the polymer fibers leaving a matrix defining an array of interconnected tunnels and/or channels. In aspects of this embodiment, polymer fibers are removed by degradation extraction, where the extraction removes, e.g., about 75% of the polymer fibers, about 80% of the polymer fibers, about 85% of the polymer fibers, about 90% of the polymer fibers, or about 95% of the polymer fibers. In other aspects of this embodiment, polymer fibers are removed by degradation extraction, where the extraction removes, e.g., at least 75% of the polymer fibers, at least 80% of the polymer fibers, at least 85% of the polymer fibers, at least 90% of the polymer fibers, or at least 95% of the polymer fibers. In aspects of this embodiment, polymer fibers are removed by degradation extraction, where the extraction removes, e.g., about 75% to about 90% of the polymer fibers, about 75% to about 95% of the polymer fibers, about 75% to about 100% of the polymer fibers, about 80% to about 90% of the polymer fibers, about 80% to about 95% of the polymer fibers, about 80% to about 100% of the polymer fibers, about 85% to about 90% of the polymer fibers, about 85% to about 95% of the polymer fibers, or about 85% to about 100% of the polymer fibers.

In still another embodiment, polymer fibers are removed by mechanical extraction, where the extraction removes substantially all the polymer fibers leaving a matrix defining an array of interconnected tunnels and/or channels. In aspects of this embodiment, polymer fibers are removed by mechanical extraction, where the extraction removes, e.g., about 75% of the polymer fibers, about 80% of the polymer fibers, about 85% of the polymer fibers, about 90% of the polymer fibers, or about 95% of the polymer fibers. In other aspects of this embodiment, polymer fibers are removed by mechanical extraction, where the extraction removes, e.g., at least 75% of the polymer fibers, at least 80% of the polymer fibers, at least 85% of the polymer fibers, at least 90% of the polymer fibers, or at least 95% of the polymer fibers. In aspects of this embodiment, polymer fibers are removed by mechanical extraction, where the extraction removes, e.g., about 75% to about 90% of the polymer fibers, about 75% to about 95% of the polymer fibers, about 75% to about 100% of the polymer fibers, about 80% to about 90% of the polymer fibers, about 80% to about 95% of the polymer fibers, about 80% to about 100% of the polymer fibers, about 85% to about 90% of the polymer fibers, about 85% to about 95% of the polymer fibers, or about 85% to about 100% of the polymer fibers.

The porous materials disclosed herein can be formed as a separate component or can be integrated into a base material. Such methods of making provide a novel way of producing porous material with novel characteristics and properties. Furthermore, the methods disclosed herein provide an alternative way to make porous materials previously made using methods employing porogen scaffolds. Examples of such methods are described in, e.g., Gates, et al., Materials Containing Voids with Void Size Controlled on the Nanometer Scale, U.S. Pat. No. 7,674,521; Hart, et al., Discrete Nano-Textured Structures in Biomolecular Arrays and Method of Use, U.S. Pat. No. 7,651,872; Xu and Grenz, Methods and Devices Using a Shrinkable Support for Porous Monolithic Materials, U.S. Pat. No. 7,651,762; van den Hoek, et al., VLSI Fabrication Processes for Introducing Pores into Dielectric Materials, U.S. Pat. No. 7,629,224; Murphy, et al., Tissue Engineering Scaffolds, U.S. Pat. No. 7,575,759; Swetlin, et al., Polyester Compositions, Methods of Manufacturing Said Compositions, and Articles Made Therefrom, U.S. Pat. No. 7,557,167; Goodner, et al., Formation of Interconnect Structures by Removing Sacrificial Material with Supercritical Carbon Dioxide, U.S. Pat. No. 7,466,025; Xu, Ultraporous Sol Gel Monoliths, U.S. Pat. No. 7,439,272; Todd, Apparatus, Precursors and Deposition Methods for Silicone-Containing Materials, U.S. Pat. No. 7,425,350; Flodin and Aurell, Method for Preparing an Open Porous Polymer Material and an Open Porous Polymer Material, U.S. Pat. No. 7,425,288; Watkins and Pai, Mesoporous Materials and Methods, U.S. Pat. No. 7,419,772; Connor, et al., Porous Composition of Matter, and Method of Making Same, U.S. Pat. No. 7,368,483; Lukas, et al., Porous Low Dielectric Constant Compositions and Methods for Making and Using Same, U.S. Pat. No. 7,332,445; Wu, et al., Methods for Producing Low Stress Porous Low-K Dielectric Materials Using Precursors with Organic Functional Groups, U.S. Pat. No. 7,241,704; Yuan and Ding, Functionalized Porous Poly(Aryl Ether Ketone) Materials and Their Use, U.S. Pat. No. 7,176,273; Gleason, et al., Porous Material Formation by Chemical Vapor Deposition onto Colloidal Crystal Templates, U.S. Pat. No. 7,112,615; Bruza, et al., Composition Containing a Cross-Linkable Matrix Precursor and a Poragen, and Porous Matrix Prepared Therefrom, U.S. Pat. No. 7,109,249; Huang, et al., Nitrogen-Containing Polymers as Porogens in the Preparation of Highly Porous, Low Dielectric Constant Materials, U.S. Pat. No. 7,087,982; Taboas, et al., Controlled Local/Global and Micro/Macro-Porous 3D Plastic, Polymer and Ceramic/Cement Composite Scaffold Fabrication and Applications Thereof, U.S. Pat. No. 7,087,200; Kloster, et al., Method of Forming a Selectively Converted Inter-Layer Dielectric Using A Porogen Material, U.S. Pat. No. 7,018,918; You, et al., Porous Materials, U.S. Pat. No. 6,998,148; Khanarian, et al., Porous Optical Materials, U.S. Pat. No. 6,967,222; Holmes and Cooper, Manufacturing Porous Cross-Linked Polymer Monoliths, U.S. Pat. No. 6,693,159; Ma, Reverse Fabrication of Porous Materials, U.S. Pat. No. 6,673,285; Kilaas, et al., Combined Liner and Matrix System, U.S. Pat. No. 6,672,385; Chaouk and Meijs, Hydratable Siloxane Comprising Porous Polymers, U.S. Pat. No. 6,663,668; Allen, et al., Porous Materials, U.S. Pat. No. 6,602,804; Hawker, et al., Porous Dielectric Material and Electronic Devices Fabricated Therewith, U.S. Pat. No. 6,541,865; Davankov, et al., Method of Making Bio compatible Polymeric Adsorbing Material for Purification of Physiological Fluids of Organism, U.S. Pat. No. 6,531,523; Shastri, et al., Three-Dimensional Polymer Matrices, U.S. Pat. No. 6,471,993; Yates, Photogenerated Nanoporous Materials, U.S. Pat. No. 6,380,270; Formum, Method for the Manufacture of Amino Group Containing Support Matrices, Support Matrices Prepared by the Method, and Use of the Support Matrices, U.S. Pat. No. 6,335,438; Chaouk, et al., Polymers, U.S. Pat. No. 6,225,367; Chaouk, et al., High Water Content Porous Polymer, U.S. Pat. No. 6,160,030; Hawker, et al., Dielectric Compositions and Method for Their Manufacture, U.S. Pat. No. 6,107,357; Li, et al., Polymeric Microbeads and Methods of Preparation, U.S. Pat. No. 6,100,306; Chaouk, et al., Process for Manufacture of A Porous Polymer by Use of A Porogen, U.S. Pat. No. 6,060,530; Li, et al., Polymeric Microbeads, U.S. Pat. No. 5,863,957; Frechet and Svec, Porous Polymeric Material with Gradients, U.S. Pat. No. 5,728,457; Frechet and Svec, Pore-Size Selective Modification of Porous Materials, U.S. Pat. No. 5,633,290; Yen, et al., Ion Exchange Polyethylene Membrane and Process, U.S. Pat. No. 5,531,899; Soria, et al., Membrane for a Filtration, Gas or Liquid Separation or Pervaporation Apparatus and A Manufacturing Method for Such Membrane, U.S. Pat. No. 5,066,398; Axisa, et al., Method of Fabricating A Porous Elastomer, U.S. Patent Publication 2010/0075056; Liljensten and Persoon, Biodegradable Osteochondral Implant, U.S. Patent Publication 2009/0164014; Favis, et al., Porous Nanosheath Networks, Method of Making and Uses Thereof, U.S. Patent Publication 2009/0087641; Hosoya, et al., Porous Polymer and Process For Producing the Same, U.S. Patent Publication 2009/0045119; Andersson, Chitosan Compositions, U.S. Patent Publication 2009/0022770; Xie, Three-Dimensional Hydrophilic Porous Structures for Fuel Cell Plates, U.S. Patent Publication 2008/0292939; Ratner and Marshall, Novel Porous Materials, U.S. Patent Publication 2008/0075752; Ma and Chen, Porous Materials having Multi-Sized Geometries, U.S. Patent Publication 2007/0036844; Ma, Reverse Fabrication of Porous Materials, U.S. Patent Publication 2002/0005600; Liu, et al., Porous Materials, Methods of Making and Uses; each of which is incorporated by reference in its entirety.

In yet another aspect, a method for making biocompatible implantable device comprising the step of: a) coating a mold or mandrel with a matrix material base; b) curing the matrix material base to form a base layer; c) coating the cured base layer with a matrix material base; d) pressing a plurality of polymer fibers at least partially into the matrix material base; e) treating the matrix material-coated polymer fibers mixture to cure or harden the matrix material base; and f) removing the polymer fibers, wherein polymer fiber removal results in a porous material, the porous material comprising a matrix defining an array of interconnected tunnels and channels as disclosed herein. In this method steps (c) and (d) can be repeated multiple times until the desired thickness of the material layer is achieved before performing step (e).

The present specification discloses, in part, preparing a surface of a device to receive porous material. Preparing a surface of a device to receive porous material can be accomplished by any technique that does not destroy the desired properties of the porous material or the device. As a non-limiting example, a surface of a device can be prepared by applying a bonding substance. Non-limiting examples of bonding substances include silicone adhesives, such as, e.g., RTV silicone and HTV silicone. The bonding substance is applied to the surface of a device, the porous material, or both, using any method known in the art, such as, e.g., cast coating, spray coating, dip coating, curtain coating, knife coating, brush coating, vapor deposition coating, and the like.

The present specification discloses, in part, attaching a porous material to a surface of a device. The porous material can be attached to the entire surface of the device, or only to portions of the surface of the device. As a non-limiting example, porous material is attached only to the front surface of the device or only the back surface of the device. Attachment of a porous material to a surface of a device can be accomplished by any technique that does not destroy the desired properties of the porous material or the device.

For example, attachment can occur by adhering an already formed porous material onto a surface of a device using methods known in the art, such as, e.g., gluing, bonding, melting. For instance, a dispersion of silicone is applied as an adhesive onto a surface of a device, a porous material sheet, or both, and then the two materials are placed together in a manner that allows the adhesive to attached the porous material to the surface of the device. The silicone adhesive is allowed to cure and then the excess material is cut off creating a uniform seam around the device. This process results in a device comprising a porous material disclosed herein.

Alternatively, attachment can occur by forming the porous material directly onto a surface of a device using methods known in the art, such as, e.g., cast coating, spray coating, dip coating, curtain coating, knife coating, brush coating, vapor deposition coating, and the like. For instance, a matrix material base is applied to a mandrel and cured to form a base layer of cured matrix material. The base layer is then initially coated with a matrix material base and then subsequently with polymer fibers are pressed into the material base to create a matrix material-coated polymer fiber mixture. This mixture is then treated as disclosed herein. The polymer fibers are then removed, leaving a layer of porous material on the surface of the device. The thickness of the porous material layer can be increased by repeated coatings of additional matrix material base and polymer fibers.

In another aspect of the invention, a method of making a porous material in a contoured shape is provided. The method generally comprises the steps of a) applying a matrix material to a contoured mold, applying a fibrous covering to the matrix material on the mold, treating the matrix material having the fibrous covering to cure or harden the matrix material on the mold, and removing the fibrous covering from the cured or hardened matrix material, wherein fibrous covering removal results in a porous material.

Figure 1B:
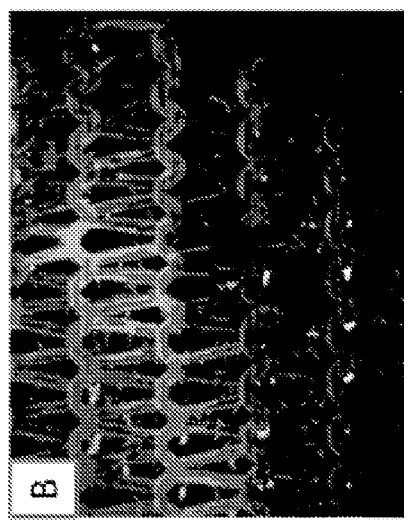
FIG. 1B is an optical microscopic image of the silicone elastomer with mesh removed.
Figure 1A:
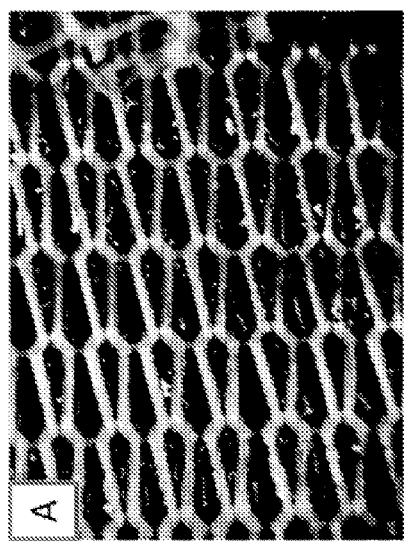
FIG. 1A is an optical microscopic image of a silicone elastomer with mesh embedded therein.
Figures 2A, 2B, 2C:
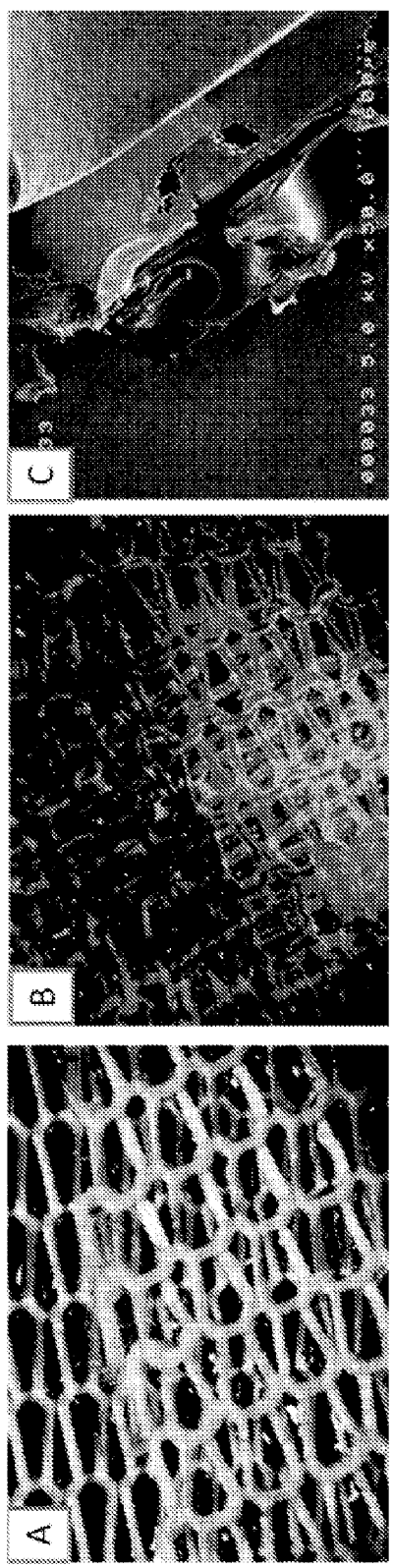
FIG. 2A is an optical microscopic image of a silicone elastomer with mesh embedded therein.
FIG. 2B is an optical microscopic image of the silicone elastomer with mesh removed.
FIG. 2C is a scanning electron microscope (SEM) image of the silicone elastomer in accordance with the invention.
Figure 3B:
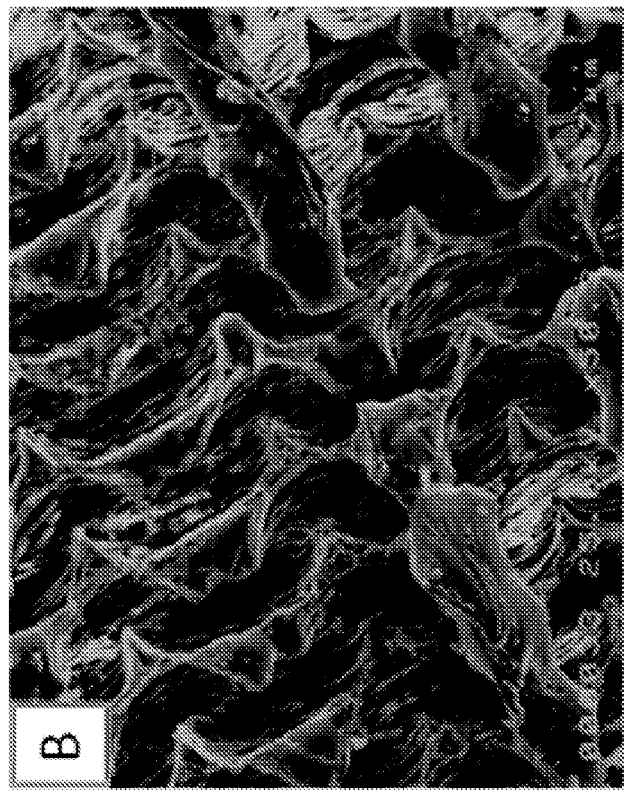
FIG. 3B is an SEM image of a silicone elastomer made with such a mesh.
Figure 3A:
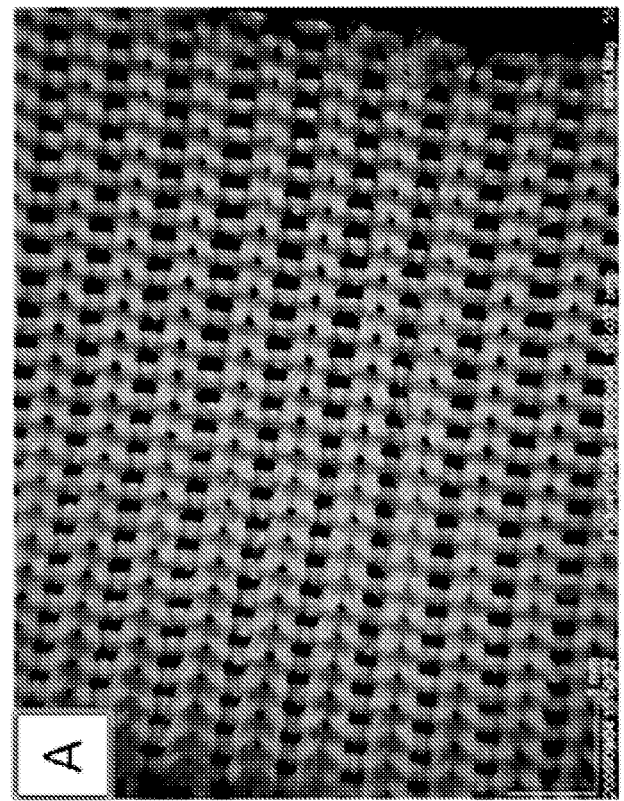
FIG. 3A is an optical microscopic image of an exemplary mesh useful in making porous materials of the invention.
Figure 4B:
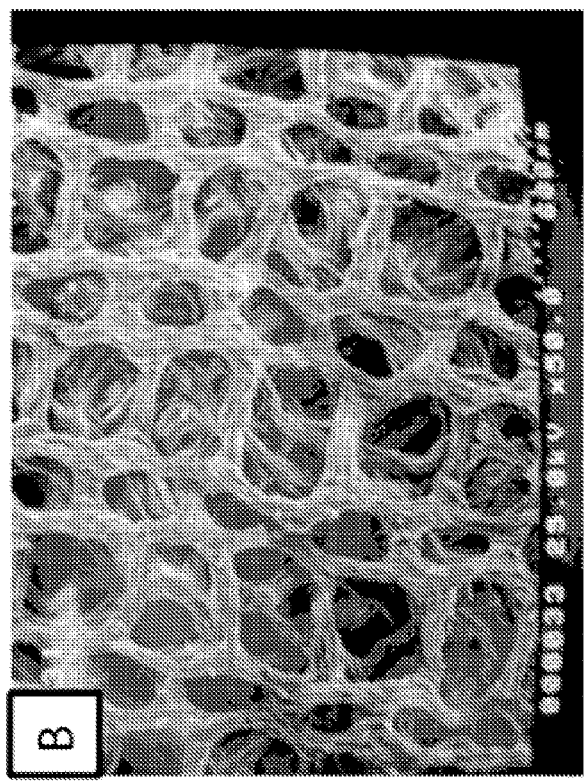
FIG. 4B is an SEM image of the same.
Figure 4A:
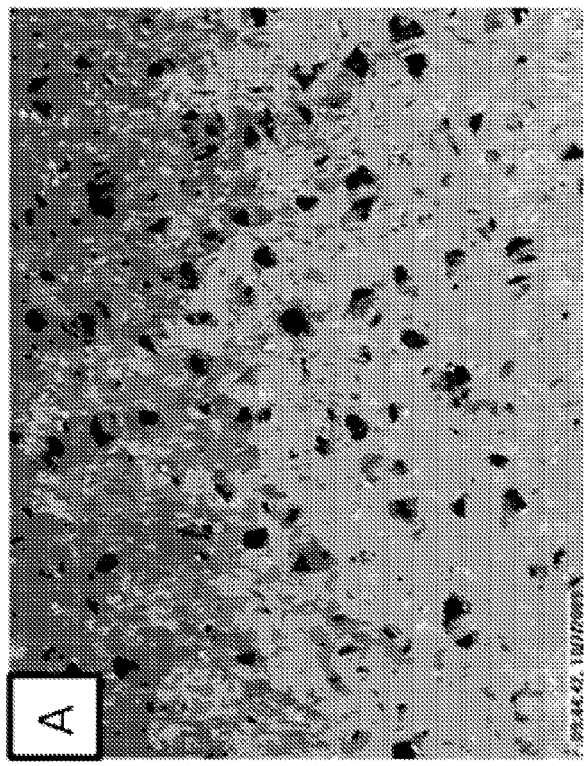
FIG. 4A is an optical microscopic image of a silicone texture imprinted by multiple mesh layers.

FIGS. 1A through 1C illustrate, respectively, a fiber assemblage contacted with a silicone dispersion, a cured silicone elastomer with mesh removed, and a SEM image of the porous material made in accordance with methods of the invention herein disclosed. FIGS. 2A through 2C illustrate similar views of the making of another porous material in accordance with the invention. FIG. 3A is an optical microscopic image of an exemplary fibrous mesh useful in making porous materials of the invention as described elsewhere herein. FIG. 3B is an SEM image of a porous silicone elastomer of the invention made with such an exemplary mesh. FIG. 4A is an optical microscopic image of a silicone texture imprinted by multiple mesh layers. FIG. 4B is an SEM image of the same.

Figure 5B:
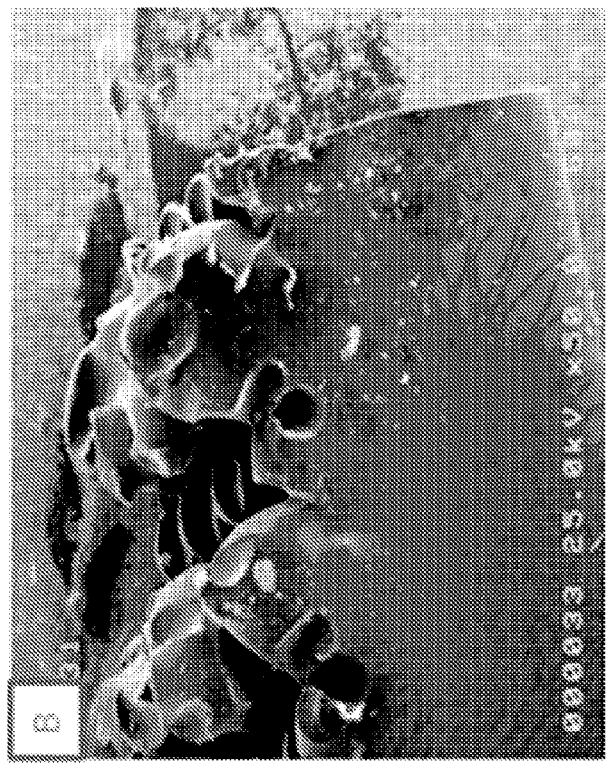
FIG. 5B is a cross sectional view of the same.
Figure 5A:
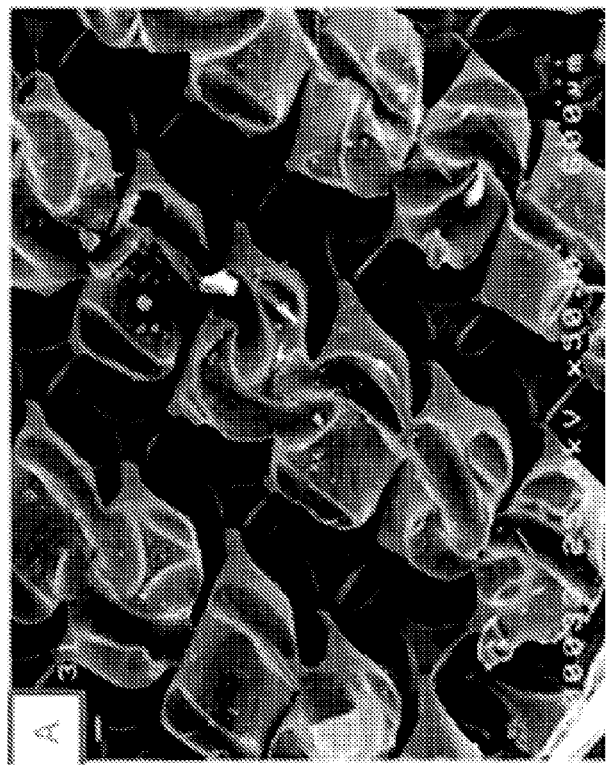
FIG. 5A is an SEM image of a silicone texture imprinted by multiple polycaprolactone mesh layers.

FIG. 5A is an SEM image of a silicone texture imprinted by multiple polycaprolactone mesh layers. FIG. 5B is a cross sectional view of the same.

The fibrous covering may comprise a fiber assemblage that is generally in the shape of a three-dimensional covering, for example, shape having an open end for fitting onto a mold, and a closed end. The fibrous covering may be in the form of, for example, a tube, or a sock, or other shape corresponding to the shape of a contoured mold.

Figure 6A:
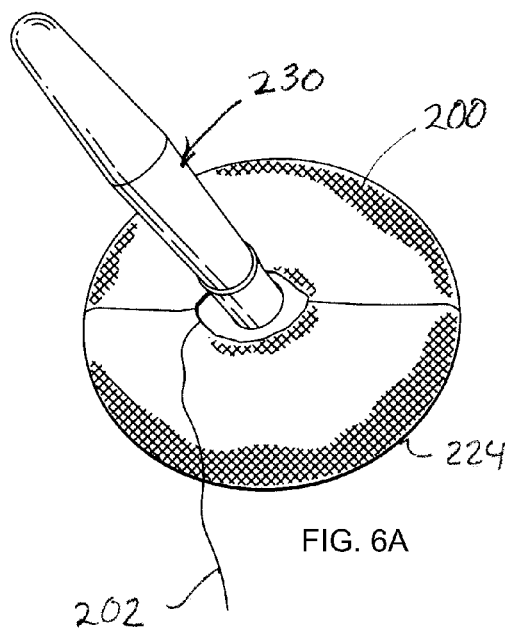
FIGS. 6A-6C show steps useful in accordance with certain methods of the present invention which include the provision of a three-dimensional mesh sock to form a textured surface of a molded article in accordance with the invention.
Figure 6B:
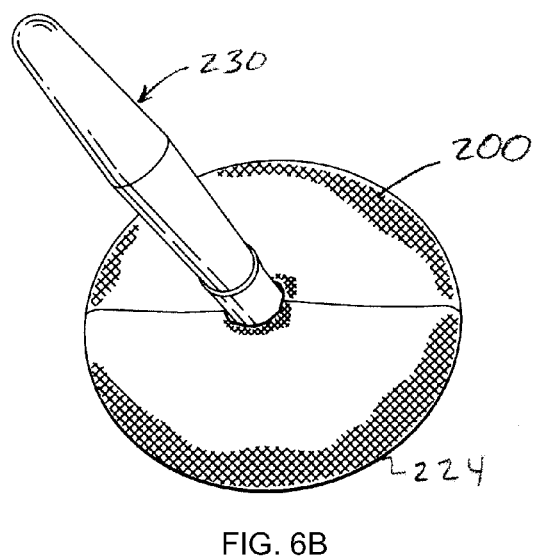
Figure 6C:
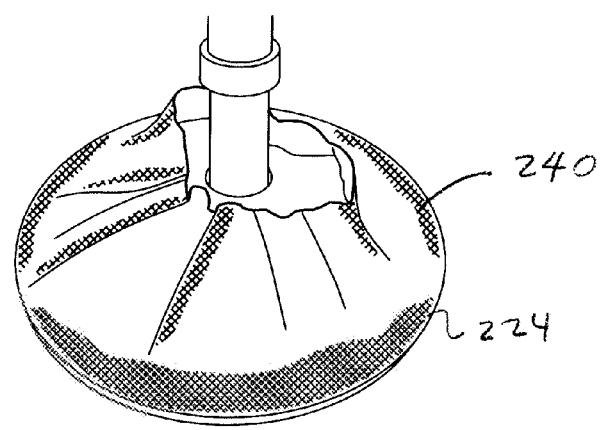

For example, as shown in FIGS. 6A and 6B, the fibrous covering 200 may be in the form of a mesh "sock" with a cinch or string 202 or other suitable means for cinching or tightening the sock onto a contoured mold surface 224 of a mold assembly 230. Alternatively, a relatively less fitted sock 240, without a cinch, may be simply wrapped around the mold surface 224 as shown in FIG. 6C. The fiber assemblage can be a woven structure made of any of the materials described elsewhere herein which can be removed from the matrix material.

The essence of this embodiment is that porous materials, for example, silicone materials with porous structures, are created by using one or more layers, for example, multilayers, of removable polymeric socks. The process for making porous silicone, with a base layer, may include the steps of 1) wrapping multilayers of polymer socks onto a molding surface with a silicone base layer, 2) dipping the molding surface, with wrapped socks, with silicone dispersion, 3) curing the silicone, and 4) removing the socks by solvent dissolution. This process allows creation of an integral 3D silicone shell with the characteristics such as being relatively easy to fabricate in a desired shape without involving any lamination or adhesion process.

For example, a textured article may be made on a mandrel, using multilayers of polymer socks, e.g. socks comprising woven fibers of poly(L-Lactic acid), PLLA. The bare mandrel, prior to any application of silicone dispersion, is wrapped with a layer of PLLA sock, which is tightened by a thread at the neck of the sock. A second layer of PLLA sock is put onto the first layer of sock and tightened. The wrapping of socks is repeated until multilayer of socks are assembled. (It is to be appreciated that although in this example, the socks are applied to a bare mandrel, in other embodiments, the mandrel may first be contacted with or coated with a silicone dispersion prior to application of the socks.)

The mandrel which is assembled with multilayer of PLLA socks is then dipped into silicone dispersion, e.g. 25 wt % of PN-3206-1 in xylene, and placed on a mandrel stand to allow xylene to evaporate. The mandrel with silicone-coated multilayer socks is placed into an oven at a certain temperature for predetermined time to cure the silicone. The socks are then removed by soaking the cured silicone-socks composite into an organic solvent, e.g. methylene chloride, chloroform, acetone, or tetrahydrofuran.

The porosity, pore size, and pore interconnections are controlled by the parameters of meshes or socks, e.g. mesh open pore size and filament thickness, and the means of stacking meshes. Parallel stacking socks will create a channel-like porous structure, random stacking, however, will create a more randomly interconnected porous material. Generally, parallel stacking of multilayers of meshes creates a channel-like silicone material. Random stacking meshes of multilayers of meshes creates a more interconnected material.

Regardless of the method of attachment, or whether the porous material is made in the shape of a textured shell of an article or device, the porous material can be applied to or define the entire surface of a device, or only to portions of the surface of a device. In some embodiments, a porous material is attached to a surface of a device by bonding gluing, bonding, or otherwise attaching the porous material to a surface of a device.

In another aspect of this embodiment, forming a porous material on a surface of a device comprises coating a cured matrix material base layer with a matrix material base and then pressing polymer fibers into the uncured matrix material base to form a matrix material-coated polymer fiber mixture. In other aspects of this embodiment, coating a cured matrix material base layer with an uncured matrix material base and then pressing polymer fibers into the uncured matrix material base to form a matrix material-coated polymer fibers mixture can be repeated, e.g., at least once, at least twice, at least three times, at least four times, at least five times, at least six times, at least seven times, at least eight times, at least nine times, or at least ten times, before the mixture is treated.

EXAMPLES

The following examples illustrate representative embodiments now contemplated, but should not be construed to limit the disclosed porous materials or methods of forming such porous materials.

Example 1

Method of Making a Porous Material Using One Layer of Polymer Fibers

To add a matrix material base to a mold, 20 mL of 36% (w/w) HTV silicone in xylene (MED 6400; NuSil Technology LLC, Carpinteria, Calif.) was added to a 3"×3" square mold. The silicone containing mold was placed into a fume hood for 8 hours to allow the xylene to evaporate. To press a plurality of polymer fibers at least partially into the matrix material base, a 3"×3" sheet of osteoprene mesh, poly(L-lactic acid)-co-trimethylenecarbonate mesh, (Poly Med Inc., Anderson, S.C.) having a mean eye area of 485 μm×195 μm and a fiber thickness of 285 μm, was placed on the surface of the devolitalized silicone base and a flat spatula was used to push the mesh to uncured silicone. To treat the matrix material-coated polymer fibers mixture, the silicone-coated osteoprene mesh was cured at a heating profile of 75° C. for 45 minutes, 150° C. for 2 hours, and 165° C. for 30 minutes. To remove the polymer fibers, the silicone-coated osteoprene mesh was removed from the mold and placed into methylene chloride solution to dissolve the mesh. The resulting silicone porous material comprising a matrix defining an array of interconnected tunnels and channels was placed in a fume hood for about two hours and then heated at 126° C. for 1 hour. The porous material was examined by optical microscope and SEM. FIG. 1A is an optical microscopic image of the silicone-coated osteoprene mesh. FIG. 1B is optical microscopic image of the porous material after the osteoprene mesh was removed. FIG. 1C is an SEM image of the resulting porous material surface texture.

Example 2

Method of Making a Porous Material Using Two Layer of Polymer Fibers

The materials and method are as described in Example 1, except that two layers of osteoprene mesh were used to create a porous material having greater thickness and a more sophisticated texture. The porous material was examined by optical microscope and SEM. FIGS. 2A, 2B and 2C are optical microscopic and SEM images of the porous material created using two layers of osteoprene mesh. FIG. 2A is an optical microscopic image of the silicone-coated osteoprene mesh. FIG. 2B is an optical microscopic image of the porous material after osteoprene mesh was removed. FIG. 2C is an SEM image of a cross section of the resulting porous material comprising a matrix defining an array of interconnected tunnels and channels.

Example 3

Method of Making a Porous Material Using One Layer of Polymer Fibers

The materials and method are as described in Example 1, except that the osteoprene mesh had an eye size, 252 µm×156 µm and filament thickness of 400 µm. FIG. 3A is an optical microscopic image of the silicone-coated osteoprene mesh. FIG. 3B is an SEM image of the porous material comprising a matrix defining an array of interconnected tunnels and channels after the osteoprene mesh was removed.

Example 4

Method of Making a Porous Material Using Multiple Layers of Polymer Fibers

To add a matrix material base to a mold, 20 mL of 36% (w/w) HTV silicone in xylene (MED 6400; NuSil Technology LLC, Carpinteria, Calif.) was added to a 3"×3" square mold. The silicone containing mold was placed into a fume hood for 8 hours to allow the xylene to evaporate. To press a plurality of polymer fibers at least partially into the matrix material base, four 2"×2" sheets of osteoprene mesh, having a mean eye area of 485 µm×195 µm and a fiber thickness of 285 µm, was placed on the surface of the devolitalized silicone base. Alternatively 3, 5, 6, 7, 8, 9, 10, or more sheets of osteoprene mesh may be placed on the surface of the devolitalized silicone base. Pressure was applied using a flat spatula to push the mesh into uncured silicone and allow the four layers to attach tightly. About 4 mL of xylene were added to the silicone-coated mesh to allow the silicone to wet the mesh and the xylene was allowed to evaporate. To treat the matrix material-coated polymer fibers mixture, the silicone-coated osteoprene mesh was cured at a heating profile of 75° C. for 45 minutes, 150° C. for 2 hours, and 165° C. for 30 minutes. To remove the polymer fibers, the silicone-coated osteoprene mesh was removed from the mold and placed into methylene chloride solution to dissolve the mesh. The resulting silicone porous material comprising a matrix defining an array of interconnected tunnels and channels was placed in a fume hood for about two hours and then heated at 126° C. for 1 hour. The porous material was examined by optical microscope and SEM. FIG. 4A is optical microscopic image of the porous material after the osteoprene mesh was removed. FIG. 4B is an SEM image of the resulting porous material surface texture.

Example 5

Preparation of Silicone Texture Imprinted by Poly(Caprolactone) Mesh

The materials and method are as described in Example 1, except that the layer of polycaprolactone mesh having an eye area of 539 µm×625 µm and fiber diameter of 340 µm were used to create a porous material having greater thickness and a more sophisticated texture. FIG. 5A is optical microscopic image of the porous material after the osteoprene mesh was removed. FIG. 5B is an SEM image of the resulting porous material surface texture.

To increase the thickness of the porous material, multiple layers of polycaprolactone mesh may be pressed into the matrix material as described in Example 4.

Example 6

A Method of Making a Porous Material Comprising a Carbon-Based Elastomer

This example illustrates how to make a porous material comprising a rubber as disclosed herein.

To add a matrix material base to a mold, 20 mL of a carbon-based elastomer base, such as, e.g., poly(isoprene), poly(butadiene), poly(isobutylene isoprene), poly(butadiene acrylonitrile), and poly(chloroprene), is added to a 20 cm×20 cm square mold coated with a non-stick surface. Alternatively, a greater or lesser amount of matrix base may be added depending on the desired thickness of the porous material. To press a plurality of polymer fibers at least partially into the matrix material base, a 20 cm×20 cm sheet of osteoprene mesh, poly(L-lactic acid)-co-trimethylenecarbonate mesh, (Poly Med Inc., Anderson, S.C.) having a mean eye area of 485 µm×195 µm and a fiber thickness of 285 µm, is placed on the surface of the carbon-based elastomer base heated at 70° C. to soften the rubber and a flat spatula is used to push the mesh to uncured base. Alternatively, a plurality of mesh sheets, such as, e.g., 2, 3, 5, 6, 7, 8, 9, 10, or more sheets of osteoprene mesh, may be placed on the surface of the uncured base. To treat the matrix material-coated polymer fibers mixture, the carbon-based elastomer base-coated osteoprene mesh was cured by adding sulfur and zinc oxide, and heating this mixture to 126° C. for 75 minutes. To remove the polymer fibers, the cured carbon-based elastomer-coated osteoprene mesh is removed from the mold and immersed into methylene chloride solution. After 30 minutes, the methylene chloride solution is removed and fresh methylene chloride solution is added. After 30 minutes, the methylene chloride solution is removed and the resulting 20 cm×20 cm×1.5 mm sheet of porous material is air dried at ambient temperature. This process results in a porous material sheet as disclosed herein. A sample from the sheet of porous material can be characterized by microCT analysis and/or scanning electron microscopy (SEM). The porous material may be further engineered for different applications.

Example 7

A Method of Making a Porous Material Comprising a Poly(Vinyl)-Based Thermoplastic This example illustrates how to make a porous material comprising a thermoplastic as disclosed herein.

To add a matrix material base to a mold, 20 mL of a poly(vinyl)-based thermoplastic, such as, e.g., poly(vinyl chloride), poly(vinylidene fluoride), poly(vinyl fluoride), poly(vinyl nitrate), and poly-(4-vinylphenol), is added to a 20 cm×20 cm square mold coated with a non-stick surface. Alternatively, a greater or lesser amount of matrix base may be added depending on the desired thickness of the porous material. To press a plurality of polymer fibers at least partially into the matrix material base, a 20 cm×20 cm sheet of osteoprene mesh, poly(L-lactic acid)-co-trimethylenecarbonate mesh, (Poly Med Inc., Anderson, S.C.) having a mean eye area of 485 µm×195 µm and a fiber thickness of 285 µm, is placed on the surface of the poly(vinyl)-based thermoplastic heated at 90° C. to soften the matrix material base and a flat spatula is used to push the mesh to uncured base. Alternatively, a plurality of mesh sheets, such as, e.g., 2, 3, 5, 6, 7, 8, 9, 10, or more sheets of osteoprene mesh, may be placed on the surface of the uncured base. To treat the matrix material-coated polymer fibers mixture, the poly(vinyl)-based thermoplastic base-coated osteoprene mesh is cooled to room temperature to allow hardening of the poly(vinyl)-based thermoplastic. To remove the polymer fibers, the hardened poly(vinyl)-based thermoplastic-coated osteoprene mesh is removed from the mold and immersed into methylene chloride solution. After 30 minutes, the methylene chloride solution is removed and fresh methylene chloride solution is added. After 30 minutes, the methylene chloride solution is removed and the resulting 20 cm×20 cm×1.5 mm sheet of porous material is air dried at ambient temperature. This process results in a porous material sheet as disclosed herein. A sample from the sheet of porous material can be characterized by microCT analysis and/or scanning electron microscopy (SEM). The porous material may be further engineered for different applications.

Example 8

A Method of Making a Porous Material Comprising Thermoplastic Elastomer

This example illustrates how to make a porous material comprising a thermoplastic elastomer as disclosed herein.

To add a matrix material base to a mold, 20 mL of a thermoplastic elastomer, such as, e.g., poly(styrene-co-butadiene-polystyrene) (SBS), is added to a 20 cm×20 cm square mold coated with a non-stick surface. Alternatively, a greater or lesser amount of matrix base may be added depending on the desired thickness of the porous material. To press a plurality of polymer fibers at least partially into the matrix material base, a 20 cm×20 cm sheet of osteoprene mesh, poly(L-lactic acid)-co-trimethylenecarbonate mesh, (Poly Med Inc., Anderson, S.C.) having a mean eye area of 485 µm×195 µm and a fiber thickness of 285 µm, is placed on the surface of the thermoplastic elastomer and a flat spatula is used to push the mesh to uncured base. Alternatively, a plurality of mesh sheets, such as, e.g., 2, 3, 5, 6, 7, 8, 9, 10, or more sheets of osteoprene mesh, may be placed on the surface of the uncured base. To treat the matrix material-coated polymer fibers mixture, the thermoplastic elastomer base-coated osteoprene mesh is heated at a temperature of 90° C., and then at 120° C. for 30 minutes. To remove the polymer fibers, the cured thermoplastic elastomer-coated osteoprene mesh is removed from the mold and immersed into methylene chloride solution. After 30 minutes, the methylene chloride solution is removed and fresh methylene chloride solution is added. After 30 minutes, the methylene chloride solution is removed and the resulting 20 cm×20 cm×1.5 mm sheet of porous material is air dried at ambient temperature. This process results in a porous material sheet as disclosed herein. A sample from the sheet of porous material can be characterized by microCT analysis and/or scanning electron microscopy (SEM). The porous material may be further engineered for different applications.

Example 9

A Method of Making a Porous Material Comprising a Thermoset Elastomer

This example illustrates how to make a porous material comprising a thermoset elastomer as disclosed herein.

To add a matrix material base to a mold, 20 mL of a poly(urethane) is added to a 20 cm×20 cm square mold coated with a non-stick surface. Alternatively, a greater or lesser amount of matrix base may be added depending on the desired thickness of the porous material. To press a plurality of polymer fibers at least partially into the matrix material base, a 20 cm×20 cm sheet of osteoprene mesh, poly(L-lactic acid)-co-trimethylenecarbonate mesh, (Poly Med Inc., Anderson, S.C.) having a mean eye area of 485 µm×195 µm and a fiber thickness of 285 µm, is placed on the surface of the poly(urethane) and a flat spatula is used to push the mesh to uncured base. Alternatively, a plurality of mesh sheets, such as, e.g., 2, 3, 5, 6, 7, 8, 9, 10, or more sheets of osteoprene mesh, may be placed on the surface of the uncured base. To treat the matrix material-coated polymer fibers mixture, the poly(urethane) base-coated osteoprene mesh is heated at a temperature of 126° C. for 75 minutes. To remove the polymer fibers, the cured poly(urethane)-coated osteoprene mesh is removed from the mold and immersed into methylene chloride solution. After 30 minutes, the methylene chloride solution is removed and fresh methylene chloride solution is added. After 30 minutes, the methylene chloride solution is removed and the resulting 20 cm×20 cm×1.5 mm sheet of porous material is air dried at ambient temperature. This process results in a porous material sheet as disclosed herein. A sample from the sheet of porous material can be characterized by microCT analysis and/or scanning electron microscopy (SEM). The porous material may be further engineered for different applications.

Example 10

Preparation of a 3D Silicone Porous Material Using 3 Layers of Poly(L-Lactic Acid) (PLLA) Socks A three dimensional elastomeric textured device, was made as follows.

Procedures:

A conventional contoured mold was dipped with 35% silicone and cured at 126° C. for 1 hour and 25 minutes. The mold with cured silicone was dipped again with 35 wt % silicone, then placed into a fume hood to allow xylene to evaporate.

Three layers of PLLA socks are applied, one-by-one, onto the mandrel with silicone base layer. The PLLA socks had open pore size of about 500 µm×500 µm and filament thickness of about 500 µm.

The mold with the multilayer of PLLA socks was dipped with 25% 3206 silicone, followed by cured at 126° C. for one hour and 25 minutes. The mold was allowed to cool to room temperature. Then it was dipped with 15% 3206 silicone, and cured at 126° C. for 1 hour and 25 minutes. Silicone PN-3206-1 is available in available in 35 wt % of xylene dispersions from Nucil NuSil Technology, Carpinteria, USA. The dispersion of silicone is diluted with xylene to get a concentration of 25 wt %, 20 wt %, and 15 wt % respectively.

The mold with cured silicone-PLLA sock composite was soaked in chloroform for one time, then in methylene chloride twice, and finally dried in the fume hood.

Figure 7A:
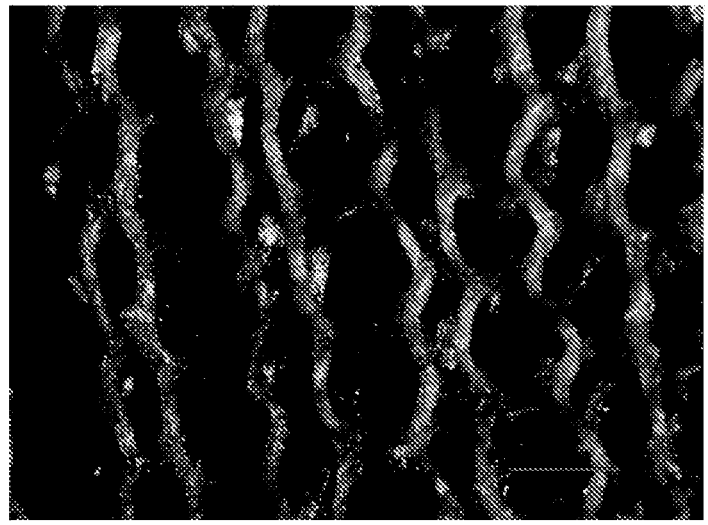
FIGS. 7A-10B are SEM images of porous materials made in accordance with various methods of the invention.
Figure 7B:
Figure 7C:
Figure 7D:
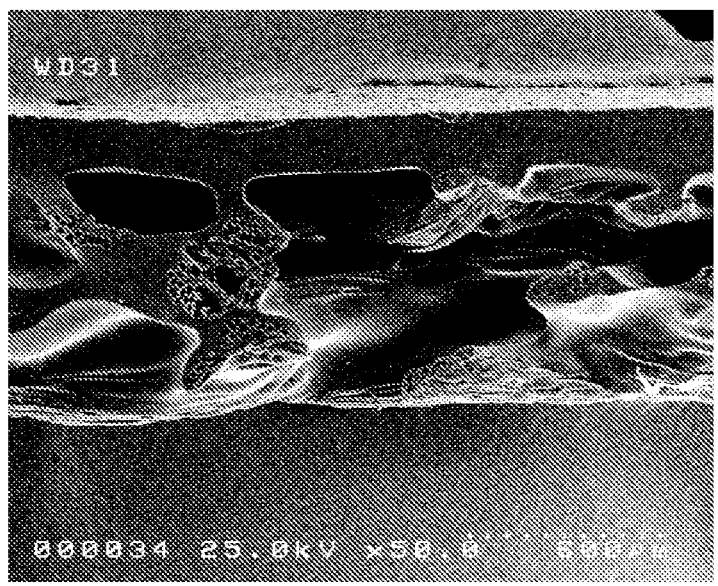

Optical microscopic images of the resulting silicone porous material are shown in FIGS. 7A and 7B. Optical microscopic images of silicone: (A) 20×, (B) 30× (open pore, 500×500 µm; thickness, 500 µm). SEM images of the porous material are shown in FIGS. 7C and 7D, top view and cross section respectively.

Example 11

Preparation of a 3D Silicone Porous Material Using 6 Layers of Poly(L-Lactic Acid) (PLLA) Socks The same materials and procedure are followed as in Example 14, except instead of three layers of PLLA socks, 6 layers of PLLA socks are applied to the mandrel.

Figure 8A:
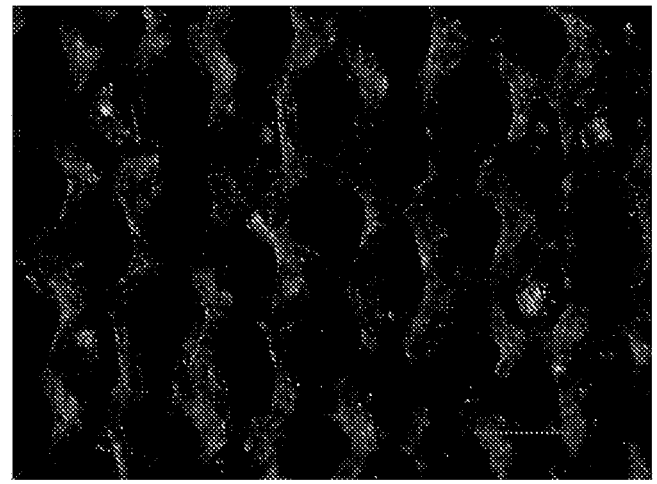
Figure 8B:
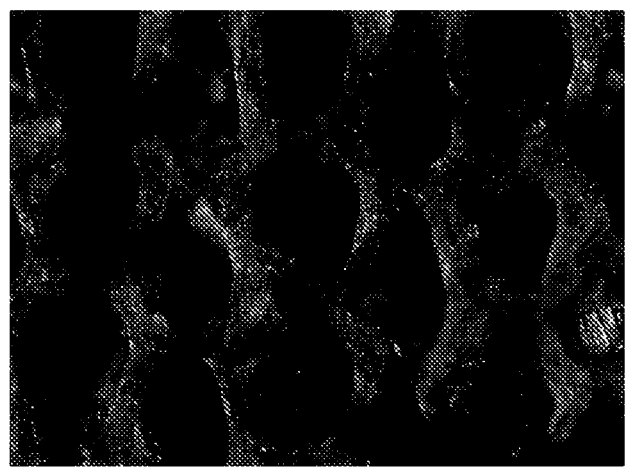
Figure 8C:
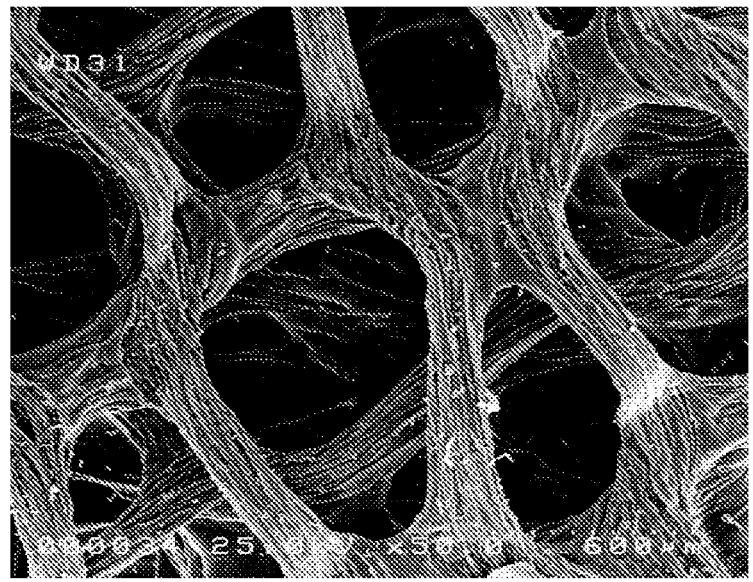
Figure 8D:
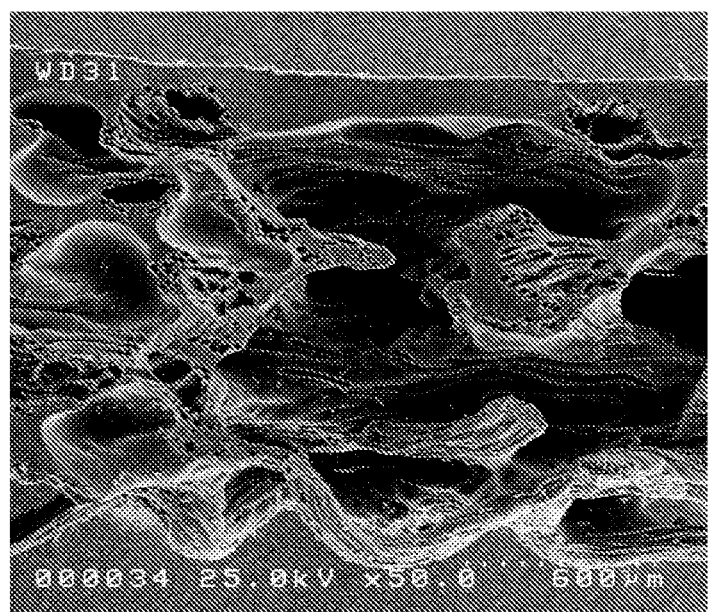

Optical microscopic images of the resulting silicone porous material are shown in FIGS. 8A and 8B. SEM images of the porous material are shown in FIGS. 8C and 8D, top view and cross section respectively.

Example 12

Preparation of Flat Silicone Foam-Like Material with a Silicone Base Layer by Osteoprene Mesh (Poly(L-Lactic Acid)-Co-Trimethylenecarbonate Mesh)

Osteoprene mesh (poly(L-lactic acid)-co-trimethylene carbonate mesh having pore size 484×508 µm; filament thickness, 335 µm was made by Poly-Med Inc. 6309 Highway 187, Anderson, S.C. 29625.

Silicone PN-3206-1 is available in 35 wt % of xylene dispersions from NuSil Technology, Carpinteria, USA. The dispersion of silicone is diluted with xylene to get a concentration of 25 wt %, 20 wt %, and 15 wt % respectively.

A few round pieces of osteoprene mesh (485×195) with a diameter of 110 mm were cut, stacked, layer by layer, and placed into a positive pressure filter. About ml of 35% PN-3206-1 was poured onto the top layer of the stacked meshes. Positive air pressure to remove excessive amount of silicone was applied. The silicone-coated meshes were placed onto an uncured silicone base layer and placed into an oven.

The silicone was cured at 80° C. for 4 hrs and 126° C. for 1 hour and 25 minutes to get silicone-mesh composite. The mesh was removed by soaking the composite into methylene chloride, with solvent change for three times. The silicone foams were dried in a fume hood.

Figure 9A:
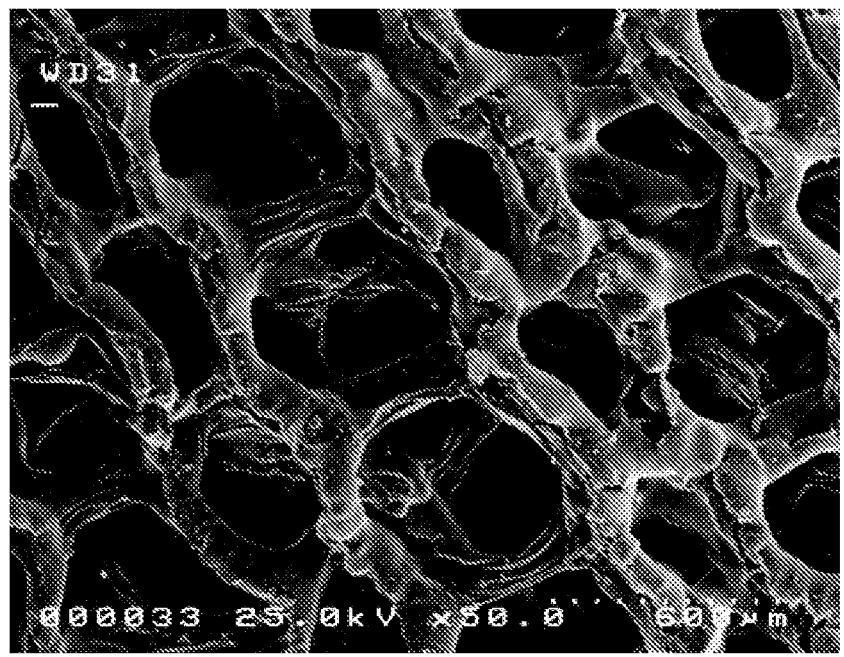
Figure 9B:
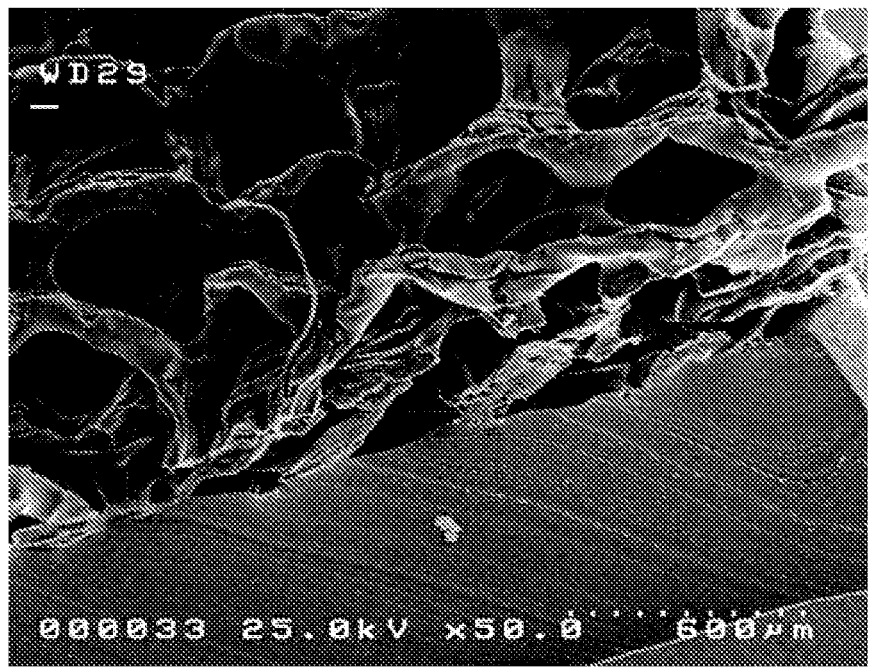

FIGS. 9A and 9B are SEM images, top view and cross sectional view, respectively, of the resulting porous silicone material made as described in this example, the materials having a thickness of about 600 µm.

Example 13

Preparation of Flat Silicone Foam-Like Material Using Osteoprene Mesh (Poly(L-Lactic Acid)-Co-Trimethylenecarbonate Mesh)

Figure 10A:
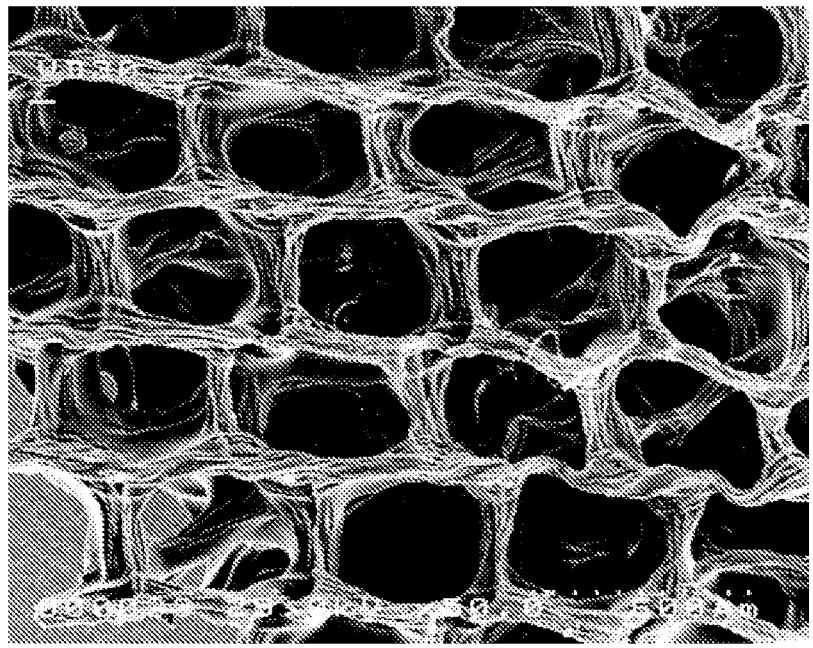
Figure 10B:
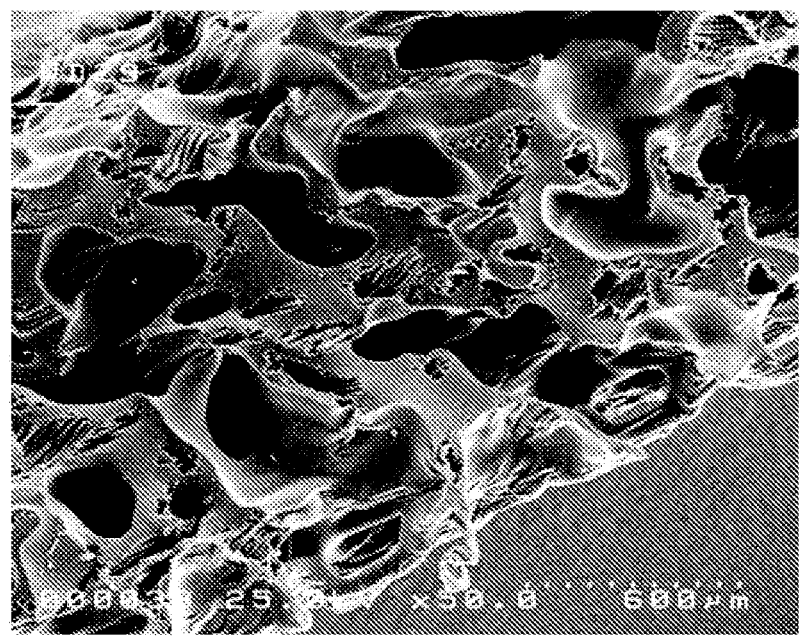

The procedure for preparing a flat silicone foam is identical to Example 16 except that the materials were prepared in a free-standing form and no base layer was used. FIGS. 10A and 10B are SEM images, top view and cross sectional view, respectively, of the resulting porous silicone material, the material having a thickness of about 1500 µm.

In closing, it is to be understood that although aspects of the present specification have been described with reference to the various embodiments, one skilled in the art will readily appreciate that the specific examples disclosed are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of the present invention, which is defined solely by the claims. Accordingly, the present invention is not limited to that precisely as shown and described.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing quantities of ingredients, properties such as molecular weight, reaction conditions, and so forth used in the specification and claims are to be understood as being modified in all instances by the term "about." As used herein, the term "about" means that the item, parameter or term so qualified encompasses a range of plus or minus ten percent above and below the value of the stated item, parameter or term. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

All patents, patent publications, and other publications referenced and identified in the present specification are individually and expressly incorporated herein by reference in their entirety for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A method for forming an elastomeric porous material, the method comprising the steps of:
   a) applying a silicone elastomer matrix material to a contoured mold having the shape of a breast implant;
   b) applying a fibrous covering to the silicone elastomer matrix material on the contoured mold wherein the fibrous covering comprises polymer fibers having an average thickness between about 100 µm and 1000 µm;
   c) treating the silicone elastomer matrix material having the fibrous covering to cure the silicone elastomer matrix material on the mold; and
   d) removing the fibrous covering from the cured silicone elastomer matrix material, wherein fibrous covering removal results in a porous silicone elastomer material defining an array of interconnected tunnels and channels, the porous silicone elastomer material having a thickness of at least 300 µm, and the porous silicone elastomer material is in the form of a breast implant shell.

2. The method of claim 1, wherein the polymer fibers comprise poly(L-lactic acid-co-trimethylcarbonate), polycaprolactone, poly(methylmethacrylate), poly(L-lactic acid), poly(lactic-co-glycolic acid), poly(ethylene-vinylacetate), poly(hydroxybutyrate-co-valerate), polydioxanone, polyorthoester, polyanhydride, poly(glycolic acid), poly(D,L-lactic acid), poly(glycolic acid-co-trimethylene carbonate), polyphosphoester, polyphosphoester urethane, poly(amino acids), cyanoacrylates, poly(trimethylene carbonate), poly(iminocarbonate), copoly(ether-esters), polyalkylene oxalates, polyphosphazenes, fibrin, fibrinogen, cellulose, starch, collagen hyaluronic acid, or combinations thereof.

3. The method of claim 1, wherein the fibrous covering comprises a fiber assemblage including a plurality of eyes having a mean area of about 50 µm² to about 2000 µm².

4. The method of claim 3, wherein the fiber assemblage comprises a plurality of layers.

5. The method of claim 4, wherein the fiber assemblage is a mesh or a felt.

6. The method of claim 1, wherein steps (a) and (c) are repeated at least once before step (d) is performed.

7. The method of claim 1, wherein steps (a), (b), and (c) are repeated at least once before step (d) is performed.

8. The method of claim 1, wherein step (b) is repeated at least once before step (d) is performed.

9. The method of claim 1, wherein the fibrous covering comprises poly(L-lactic acid).

10. The method of claim 1, wherein step (b) is done before step (a).

* * * * *

UNITED STATES PATENT AND TRADEMARK OFFICE
CERTIFICATE OF CORRECTION

PATENT NO. : 9,044,897 B2
APPLICATION NO. : 13/247535
DATED : June 2, 2015
INVENTOR(S) : Nicholas J. Manesis et al.

It is certified that error appears in the above-identified patent and that said Letters Patent is hereby corrected as shown below:

In the specification

In column 2, line 10, delete "radiation, and." and insert -- radiation. --, therefor.

In column 5, line 49, delete "aram ides" and insert -- aramides --, therefor.

In column 5, line 49, delete "poly(am ides));" and insert -- poly(amides)); --, therefor.

In column 6, line 53, delete "tem term" and insert -- term --, therefor.

In column 34, line 5, delete "60°" and insert -- 60° C. --, therefor.

In column 37, line 24, delete "Bio compatible" and insert -- Biocompatible --, therefor.

In column 37, line 29, delete "Formum," and insert -- Fonnum, --, therefor.

In column 45, line 7, delete "Nucil NuSil" and insert -- NuSil --, therefor.

Signed and Sealed this
Twenty-fourth Day of November, 2015

Michelle K. Lee
*Director of the United States Patent and Trademark Office*